(12) United States Patent
Carvajal et al.

(10) Patent No.: US 9,437,117 B2
(45) Date of Patent: Sep. 6, 2016

(54) BIRTHING SIMULATION DEVICES, SYSTEMS, AND METHODS

(71) Applicant: Gaumard Scientific Company, Inc., Miami, FL (US)

(72) Inventors: Miguel Carvajal, Miami Springs, FL (US); Victor Fernandez, Miami, FL (US); Jeffrey Karpf, Miami, FL (US); Yojans Lurbe, Miami, FL (US); Lazaro Morales, Miami, FL (US); Alberto Rodriguez, Miami, FL (US)

(73) Assignee: GAUMARD SCIENTIFIC COMPANY, INC., Miami, FL (US)

( * ) Notice: Subject to any disclaimer, the term of this patent is extended or adjusted under 35 U.S.C. 154(b) by 170 days.

(21) Appl. No.: 14/213,932

(22) Filed: Mar. 14, 2014

(65) Prior Publication Data

US 2014/0272876 A1    Sep. 18, 2014

Related U.S. Application Data

(60) Provisional application No. 61/801,714, filed on Mar. 15, 2013.

(51) Int. Cl.
*G09B 23/28* (2006.01)

(52) U.S. Cl.
CPC .................. *G09B 23/281* (2013.01)

(58) Field of Classification Search
USPC ............. 434/262, 267, 272, 273, 274, 275; 446/295, 296, 390, 391
See application file for complete search history.

(56) References Cited

U.S. PATENT DOCUMENTS

| 3,822,486 A | * | 7/1974 | Knapp | G09B 23/281 434/273 |
| 3,824,709 A | * | 7/1974 | Knapp | G09B 23/281 434/273 |

(Continued)

FOREIGN PATENT DOCUMENTS

KR    10-2004-0023627    3/2004

OTHER PUBLICATIONS

International Search Report and Written Opinion received in Patent Cooperation Treaty Application No. PCT/US2014/029147, dated Jul. 15, 2014, 13 pages.

*Primary Examiner* — Kurt Fernstrom
(74) *Attorney, Agent, or Firm* — Haynes and Boone, LLP

(57) ABSTRACT

Devices, systems, and methods appropriate for use in medical training are disclosed. In some instances, a patient simulator system is provided that includes a maternal patient simulator and a fetal patient simulator. The maternal patient simulator includes an internal chamber sized to receive the fetal patient simulator and a birthing mechanism disposed within the internal chamber configured to translate and rotate the fetal patient simulator with respect to the maternal patient simulator to simulate a birth. In some instances, the fetal patient simulator an internal support structure that includes a head, spinal components, left arm components, right arm components, left leg components, and right leg components with a continuous silicon skin layer covering the internal support structure.

19 Claims, 76 Drawing Sheets

(56) References Cited

U.S. PATENT DOCUMENTS

| | | | | |
|---|---|---|---|---|
| 3,826,019 A * | 7/1974 | Knapp | G09B 23/281 | 434/273 |
| 6,071,169 A * | 6/2000 | Cook | A63H 3/28 | 446/295 |
| 6,503,087 B1 * | 1/2003 | Eggert | G09B 23/28 | 434/262 |
| 6,604,980 B1 * | 8/2003 | Jurmain | A63H 3/001 | 434/238 |
| 6,749,433 B2 * | 6/2004 | Kassai | G09B 23/30 | 434/262 |
| 6,957,961 B1 * | 10/2005 | Owens | G09B 23/30 | 434/267 |
| 7,241,145 B2 * | 7/2007 | Riener | G09B 23/32 | 434/262 |
| 7,632,100 B2 * | 12/2009 | Allen | G09B 23/281 | 434/273 |
| 7,857,626 B2 * | 12/2010 | Toly | G09B 23/28 | 434/262 |
| 8,152,532 B2 | 4/2012 | Eggert et al. | | |
| 8,197,259 B2 * | 6/2012 | Allen | G09B 23/281 | 434/273 |
| 8,517,740 B2 * | 8/2013 | Trotta | G09B 23/281 | 434/267 |
| 8,678,831 B2 * | 3/2014 | Trotta | B29C 39/006 | 434/273 |
| 9,123,261 B2 * | 9/2015 | Lowe | G09B 23/30 | |
| 2007/0117077 A1 * | 5/2007 | Gordon | G09B 23/28 | 434/262 |
| 2012/0214144 A1 | 8/2012 | Trotta et al. | | |

\* cited by examiner

BIRTHING SIMULATION DEVICES, SYSTEMS, AND METHODS

CROSS-REFERENCE TO RELATED APPLICATIONS

The present application claims priority to and the benefit of U.S. Provisional Patent Application No. 61/801,714 filed Mar. 15, 2013, which is hereby incorporated by reference in its entirety.

BACKGROUND

As medical science has progressed, it has become increasingly important to provide non-human interactive formats for teaching patient care. While it is desirable to train medical personnel in patient care protocols before allowing contact with real patients, textbooks and flash cards lack the important benefits to students that can be attained from hands-on practice. On the other hand, allowing inexperienced students to perform medical procedures on actual patients that would allow for the hands-on practice cannot be considered a viable alternative because of the inherent risk to the patient. Non-human interactive devices and systems can be used to teach the skills needed to successfully identify and treat various patient conditions without putting actual patients at risk.

For example, patient care education has often been taught using medical instruments to perform patient care activity on a simulator, such as a manikin. Such training devices and systems can be used by medical personnel and medical students to teach and assess competencies such as patient care, medical knowledge, practice based learning and improvement, systems based practice, professionalism, and communication. The training devices and systems can also be used by patients to learn the proper way to perform self-examinations.

While existing simulators have been adequate in many respects, they have not been adequate in all respects. Therefore, what is needed is an interactive education system for use in conducting patient care training sessions that is even more realistic and/or includes additional simulated features.

SUMMARY

Devices, systems, and methods appropriate for use in medical training using a patient simulator are disclosed. In some instances, a patient simulator system is provided that includes a maternal patient simulator and a fetal patient simulator. The maternal patient simulator includes an internal chamber sized to receive the fetal patient simulator and a birthing mechanism disposed within the internal chamber configured to translate and rotate the fetal patient simulator with respect to the maternal patient simulator to simulate a birth. In some instances, the fetal patient simulator an internal support structure that includes a head, spinal components, left arm components, right arm components, left leg components, and right leg components with a continuous silicon skin layer covering the internal support structure.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

The accompanying drawings illustrate embodiments of the devices and methods disclosed herein and together with the description, serve to explain the principles of the present disclosure.

Each of FIGS. 22-25 provides a perspective view of a structural framework of the maternal patient simulator of FIGS. 1-5 along with the birthing mechanism of FIGS. 14-19 according to an embodiment of the present disclosure.

Each of FIGS. 26-29 provides a perspective view of the structural framework FIGS. 22-25 with an additional sub-layer engaged therewith according to an embodiment of the present disclosure.

Figure 30:
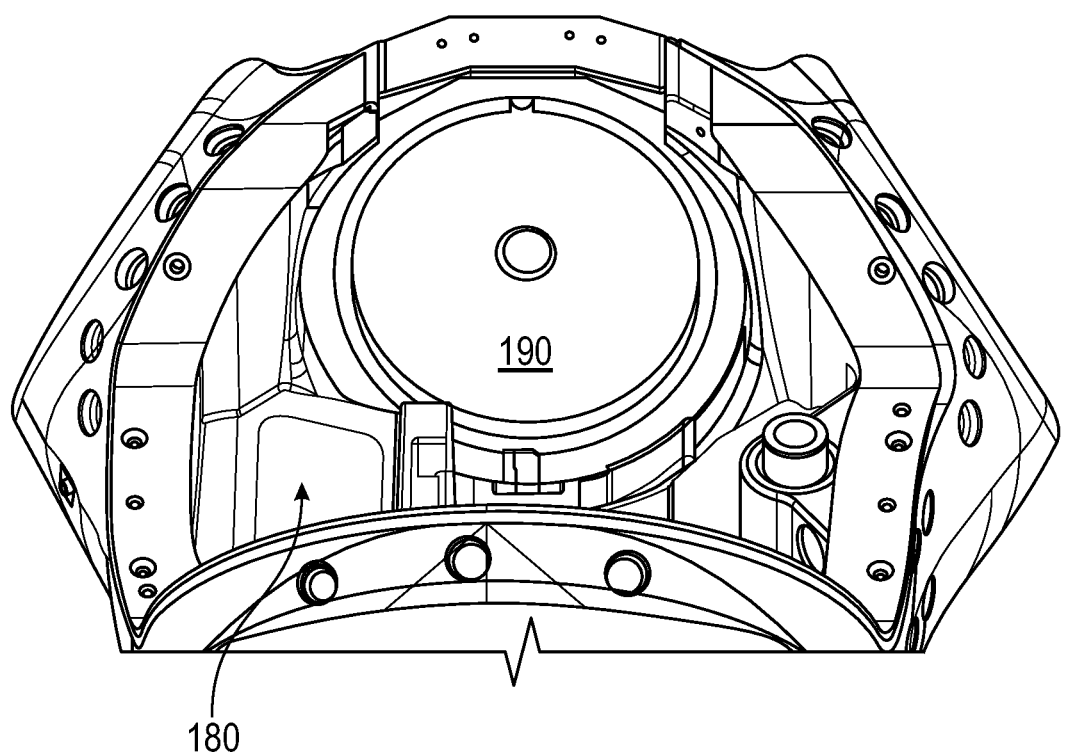

FIG. 30 is a perspective view of a chamber of the maternal patient simulator having an internal cover and cervix according to an embodiment of the present disclosure.

Figure 31:
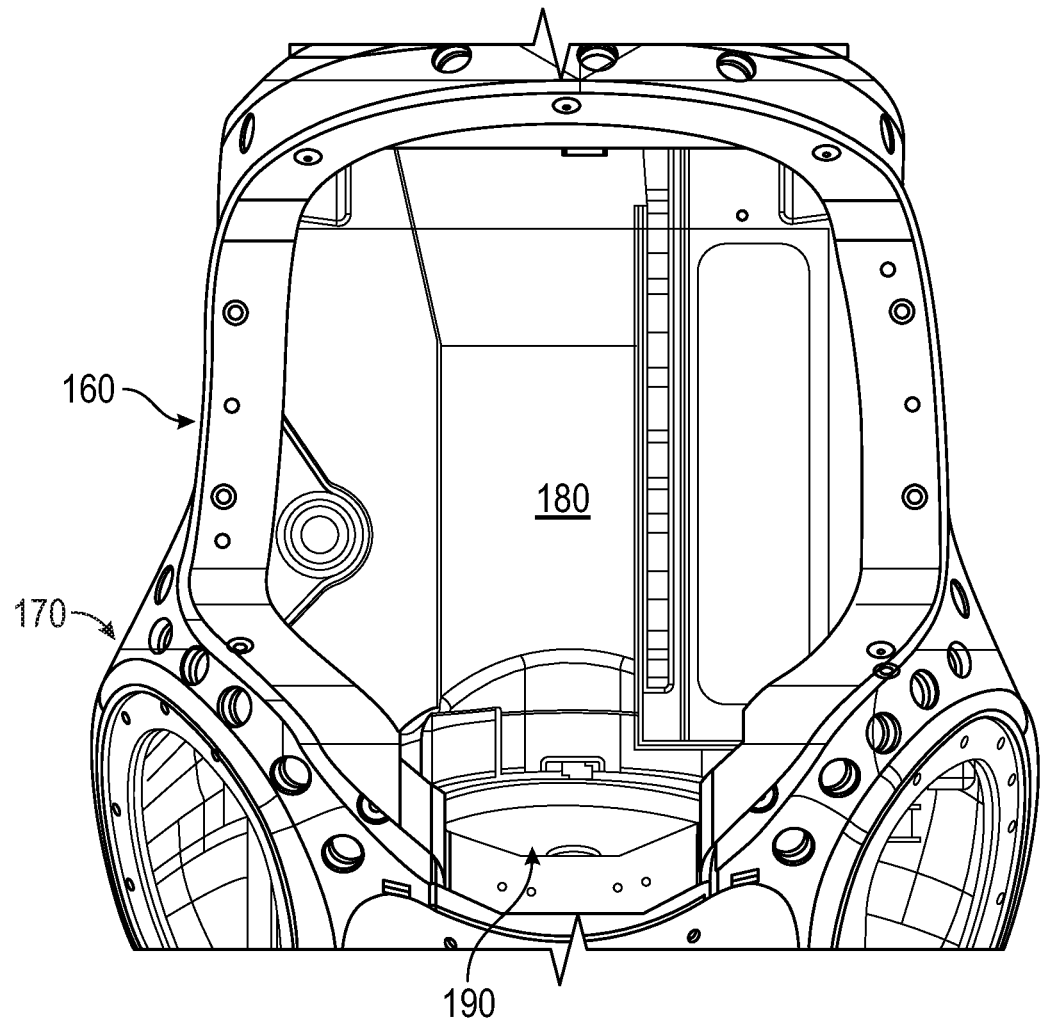

FIG. 31 is a top view of the chamber of the maternal patient simulator having an internal cover and cervix of FIG. 30.

Figure 32:
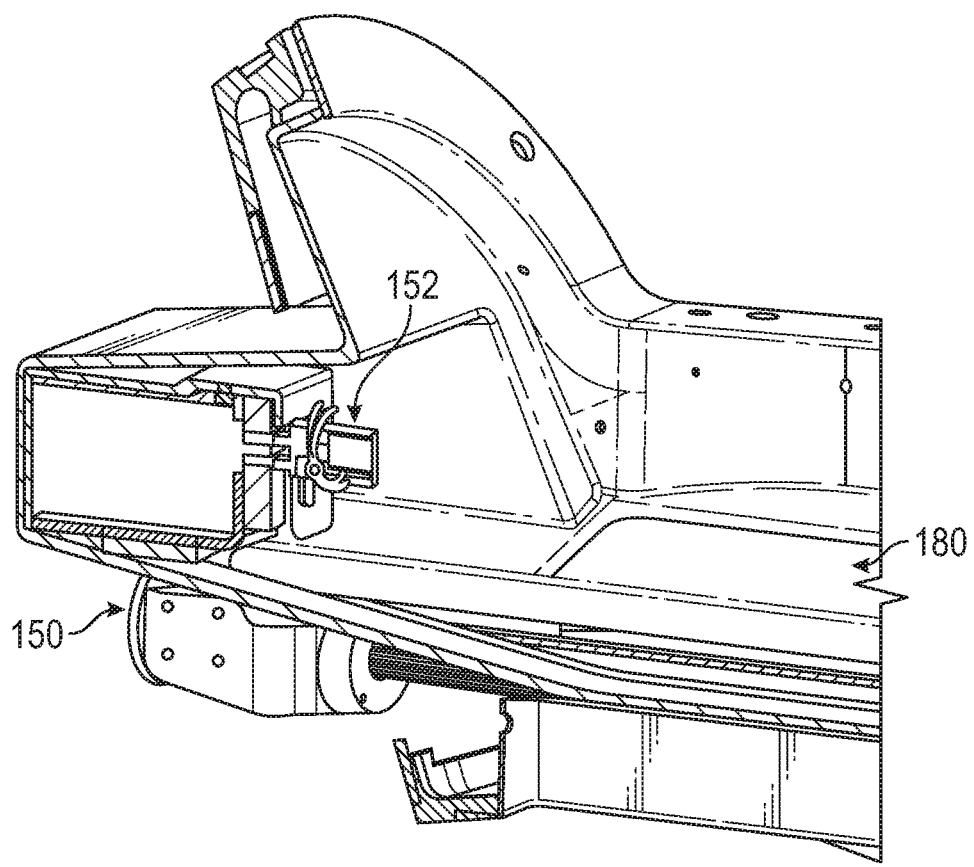

FIG. 32 is a cross-sectional side view of a chamber of the maternal patient simulator having an internal cover according to an embodiment of the present disclosure.

Figure 33:
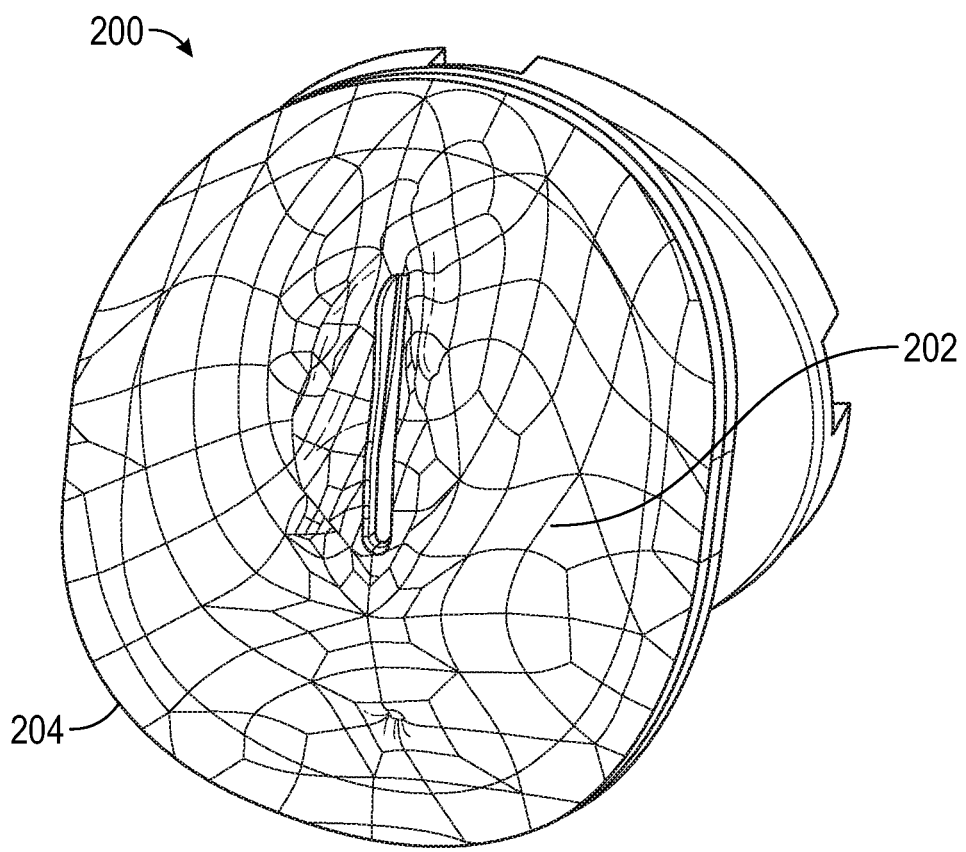

FIG. 33 is a perspective view of a birth canal of the maternal patient simulator according to an embodiment of the present disclosure.

Figure 34:
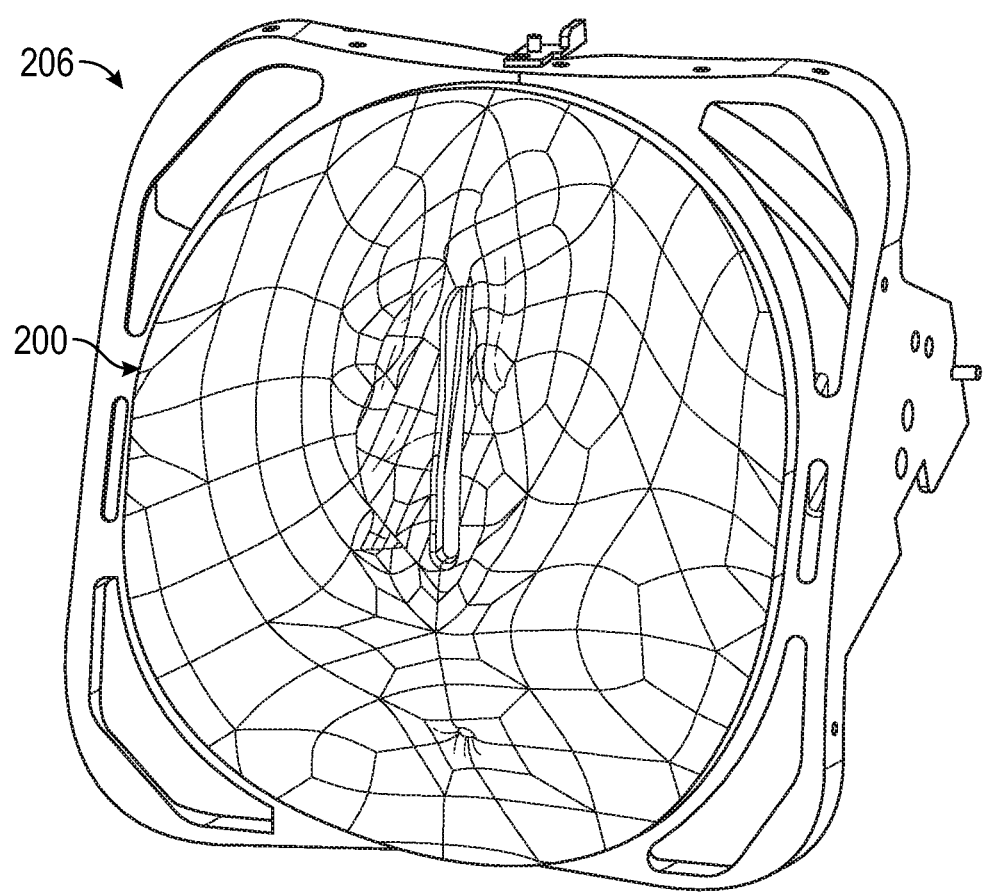

FIG. 34 is a perspective view of the birth canal of FIG. 33 coupled to an attachment structure according to an embodiment of the present disclosure.

Figure 35:
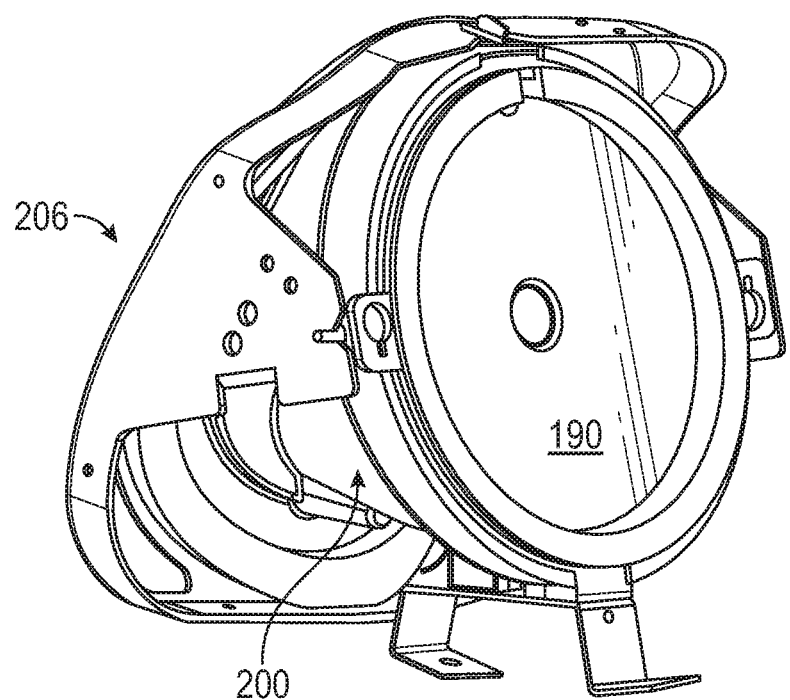

FIG. 35 is a perspective view of a cervix coupled to the birth canal and attachment structure of FIG. 34 according to an embodiment of the present disclosure.

Figure 36:
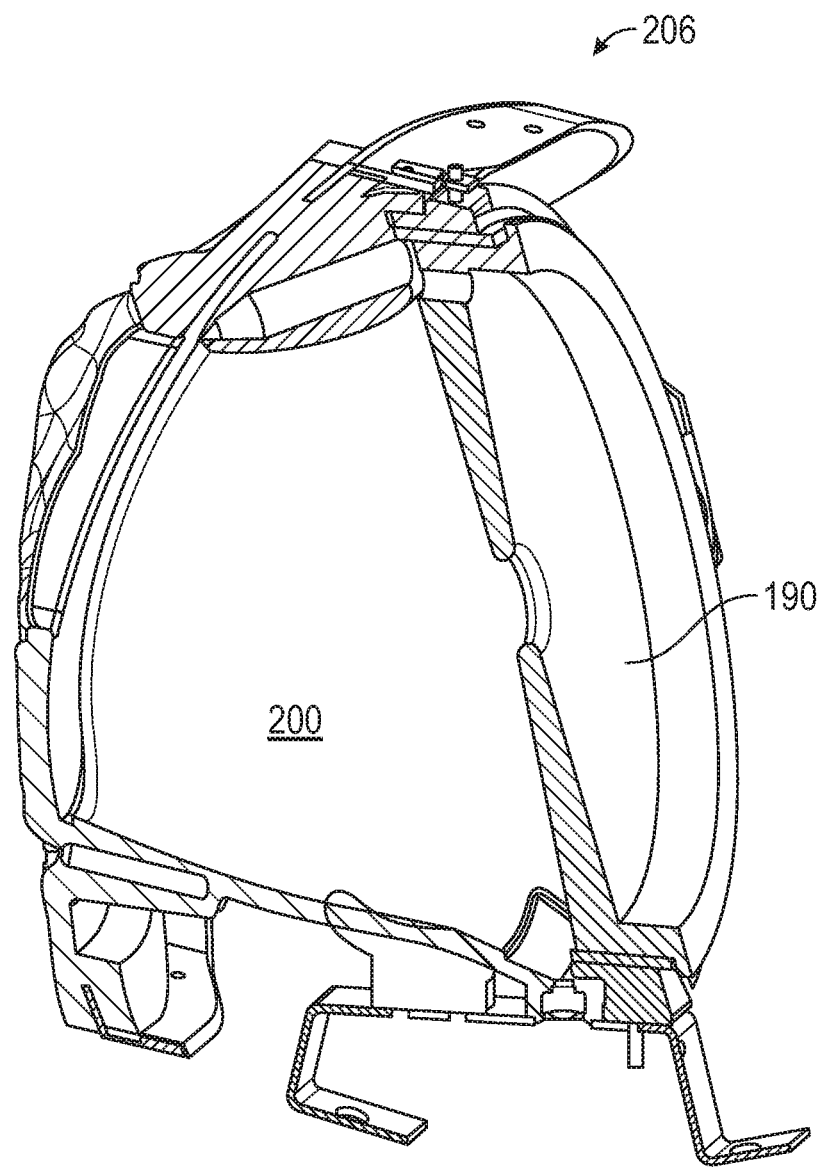

FIG. 36 is a cross-sectional side view of the cervix, birth canal, and attachment structure of FIG. 35.

Figure 37:
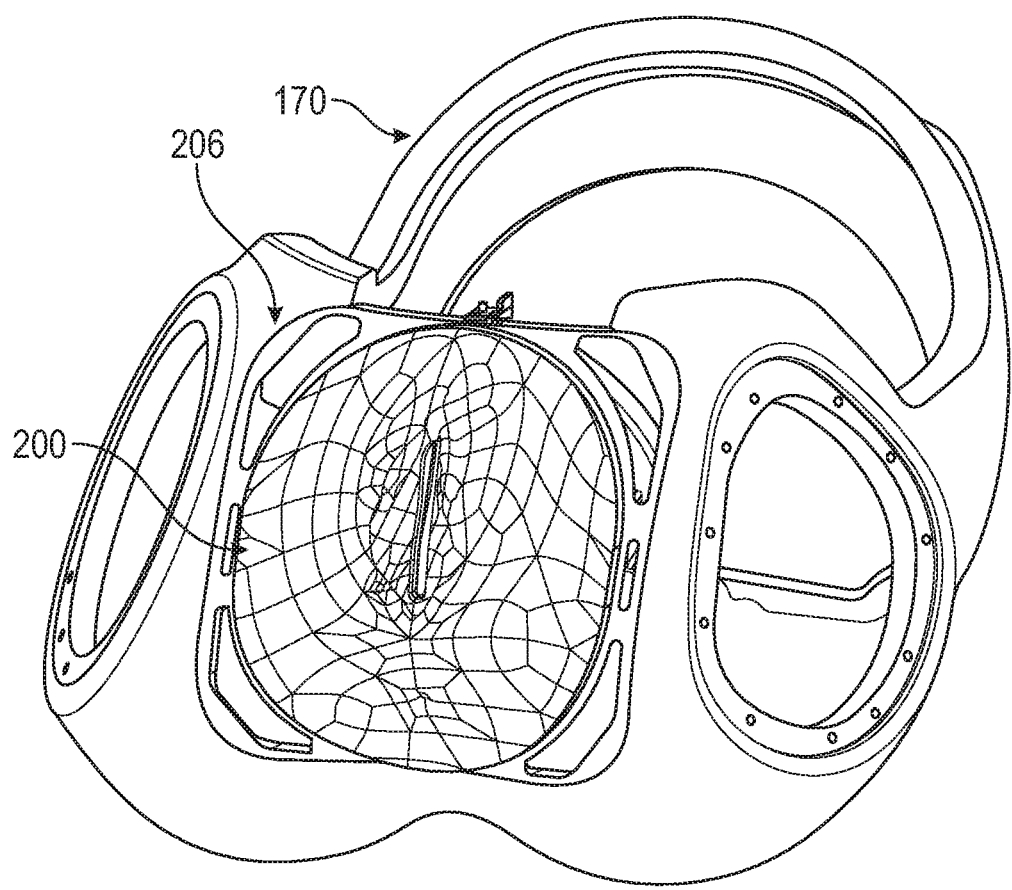

FIG. 37 is a perspective view of the cervix, birth canal, and attachment structure of FIGS. 35 and 36 shown in position relative to a torso of the maternal patient simulator according to an embodiment of the present disclosure.

Figure 38:
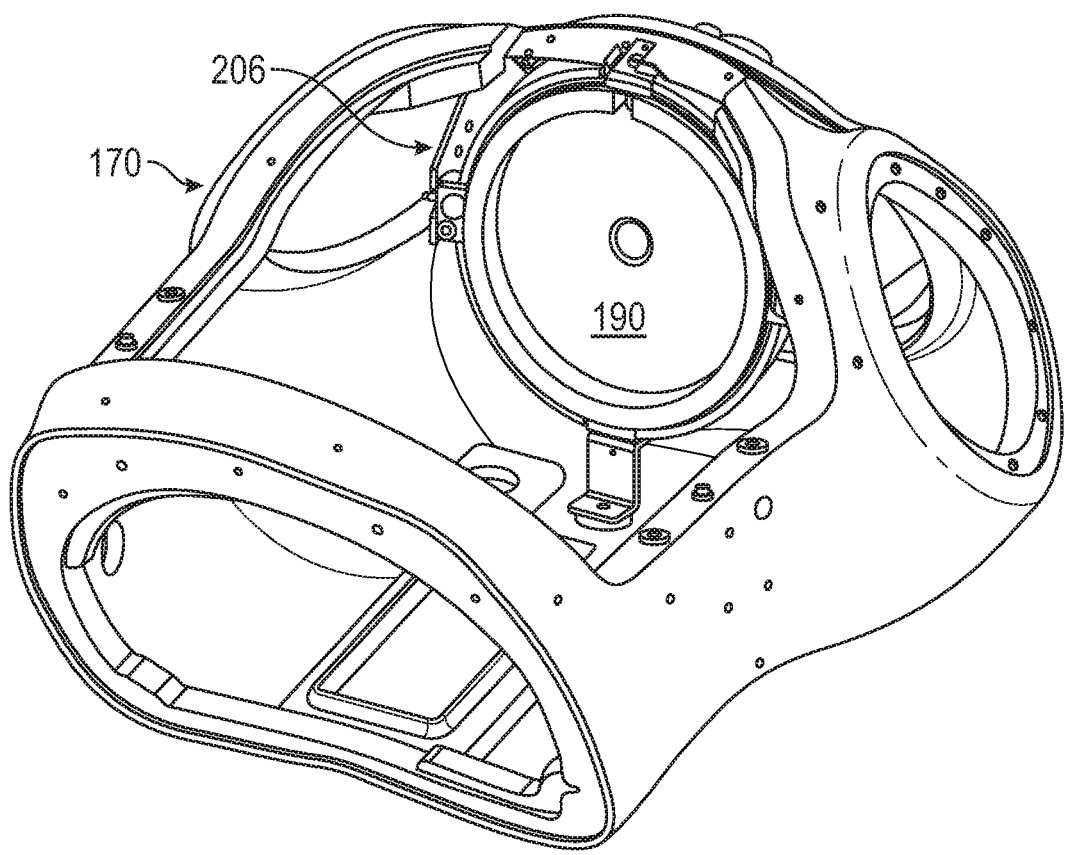

FIG. 38 is a perspective view of the cervix, birth canal, and attachment structure of FIGS. 35 and 36 shown in position relative to a torso of the maternal patient simulator according to an embodiment of the present disclosure.

Figure 39:
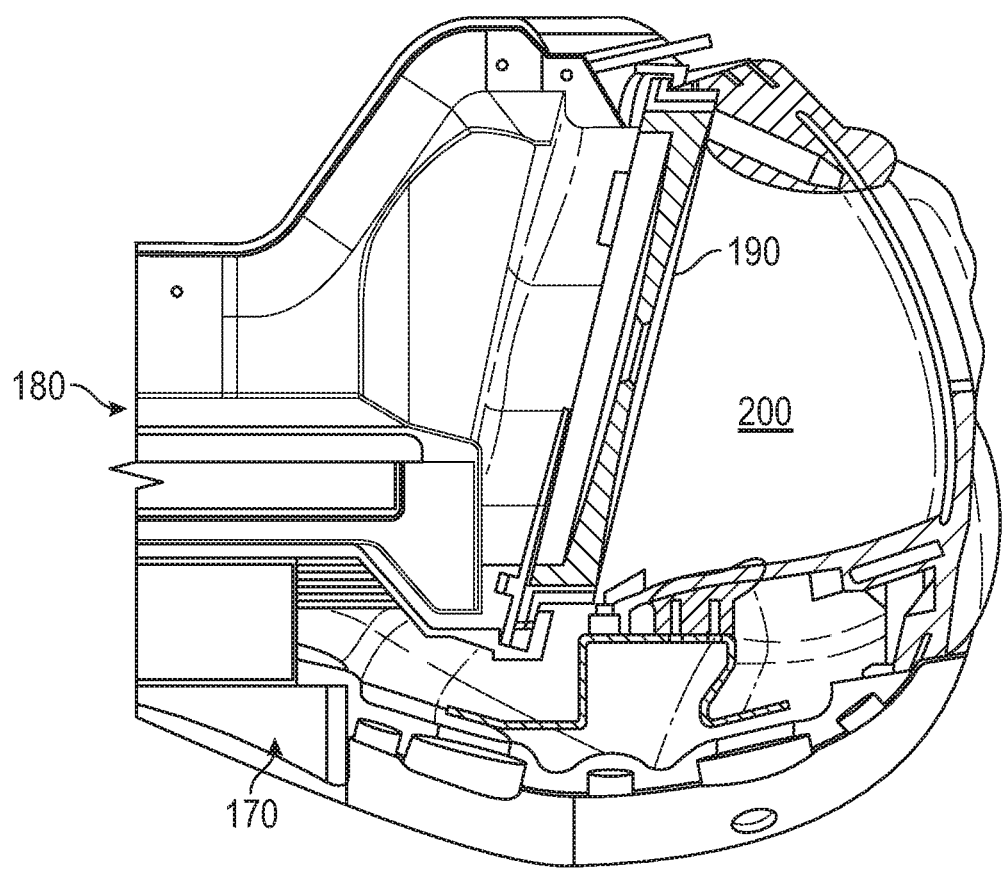

FIG. 39 is a cross-sectional side view of the cervix, birth canal, and attachment structure of FIGS. 35 and 36 coupled to a torso of the maternal patient simulator according to an embodiment of the present disclosure.

Figure 40:
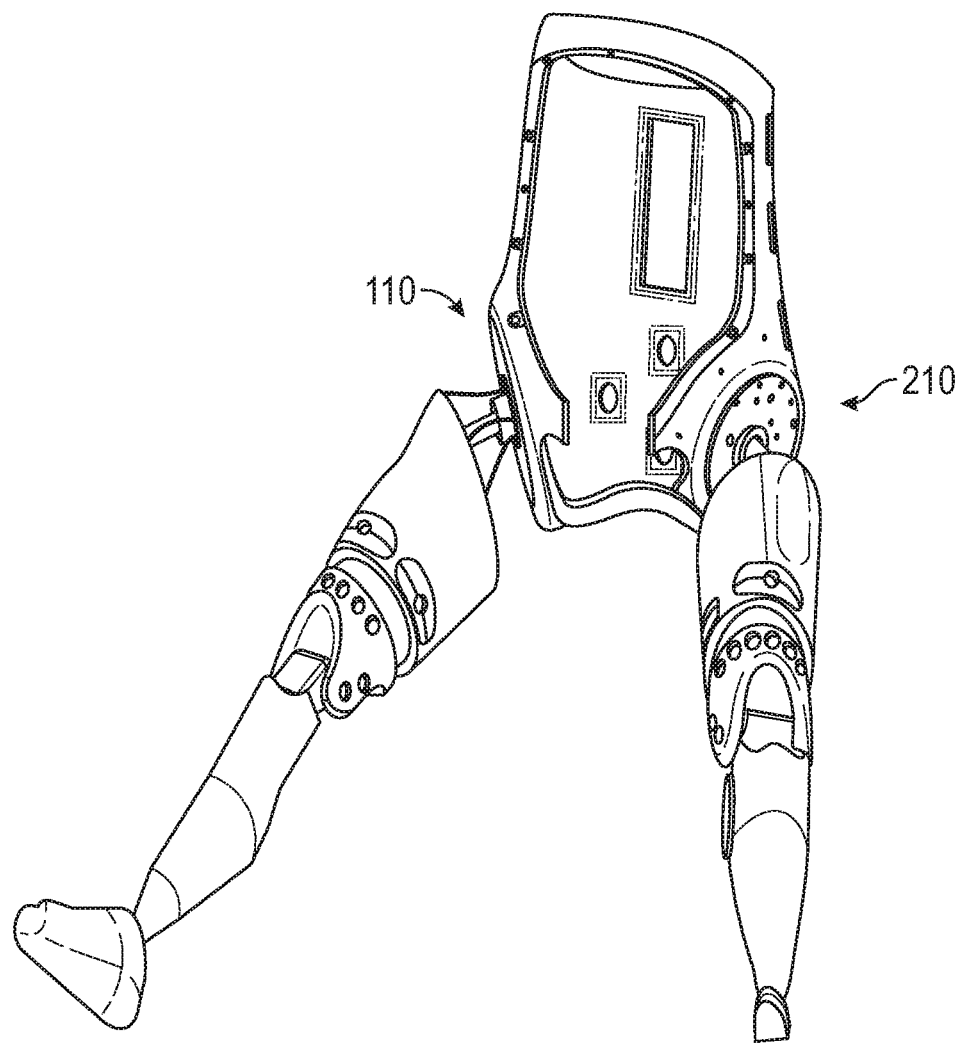

FIG. 40 is a perspective view of a torso and leg portions of the maternal patient simulator according to an embodiment of the present disclosure.

Figure 41:
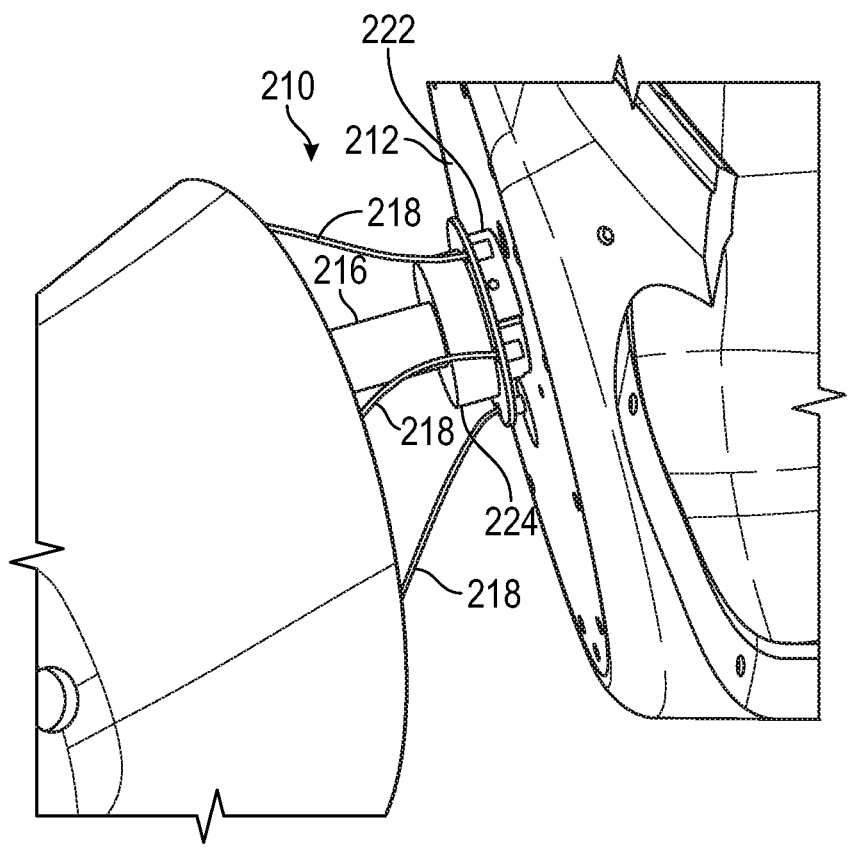

FIG. 41 is a close-up perspective view of a hip joint of the maternal patient simulator according to an embodiment of the present disclosure.

Figure 42:
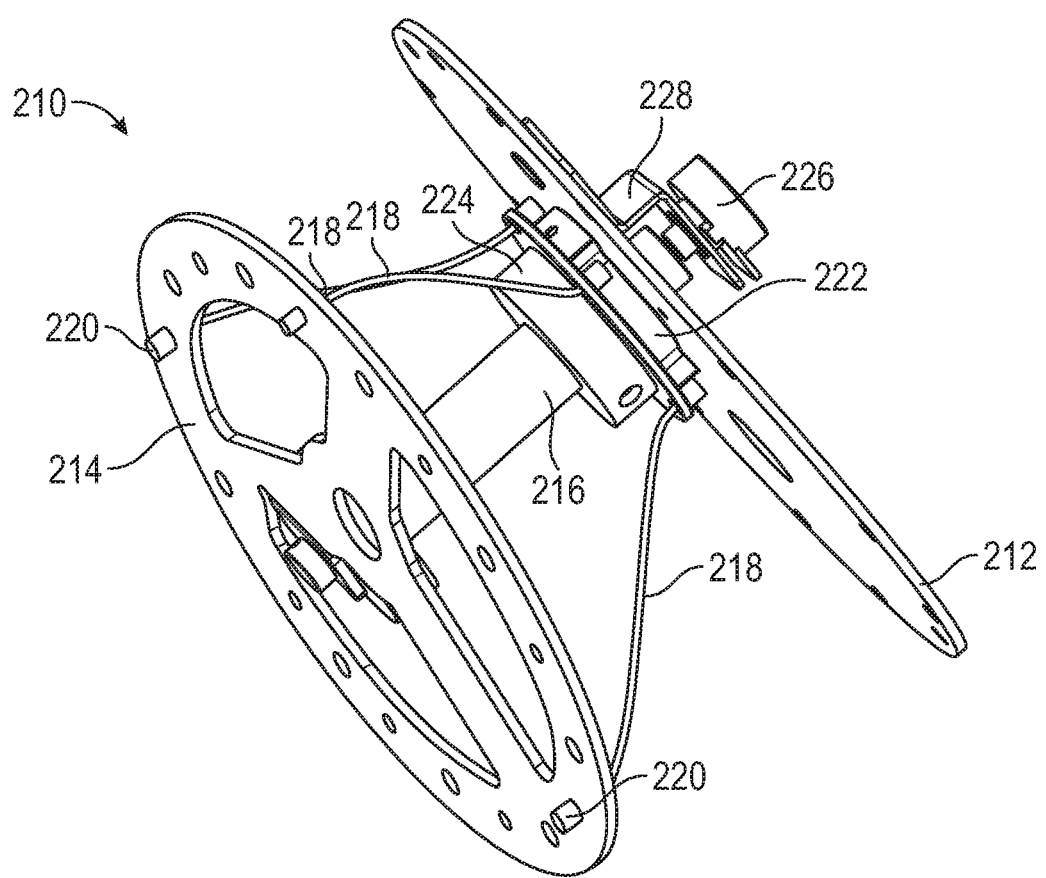

FIG. 42 is a perspective view of a hip joint mechanism according to an embodiment of the present disclosure.

Figure 43:
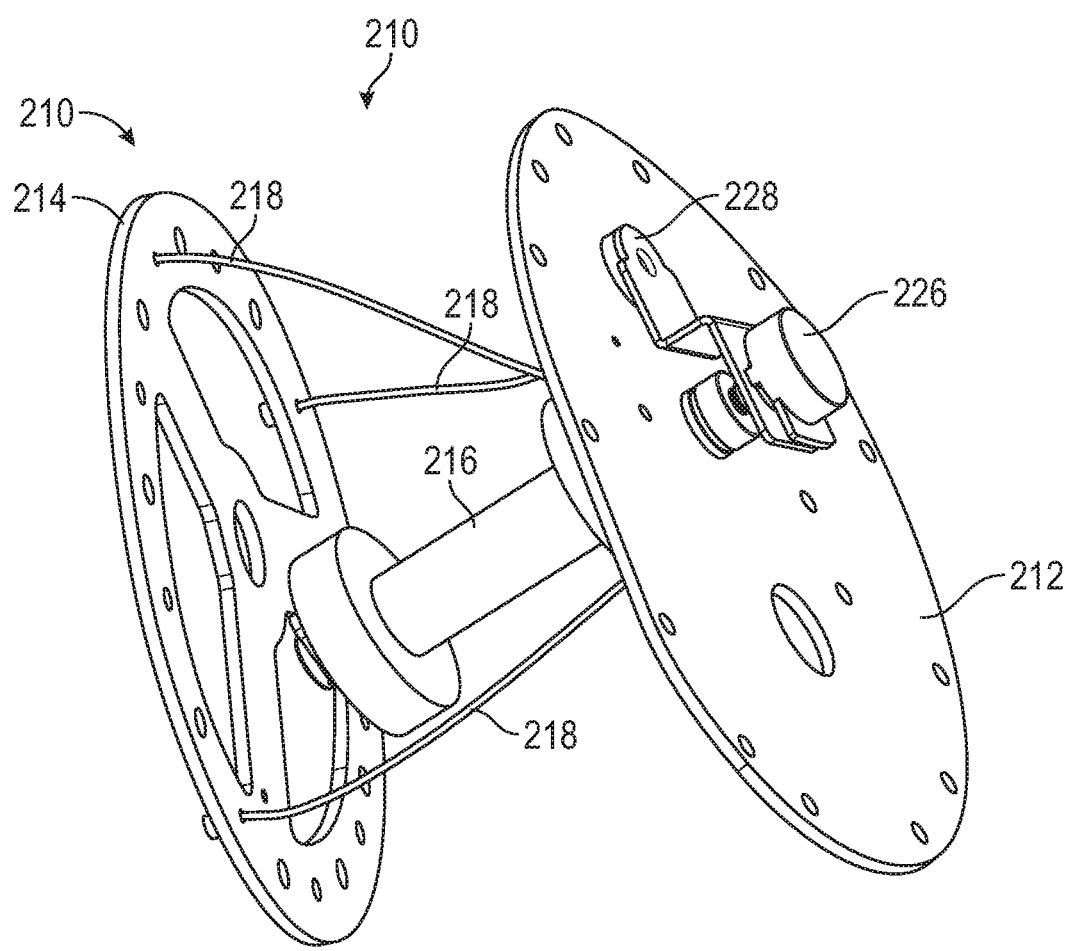

FIG. 43 is an alternative perspective view of the hip joint mechanism of FIG. 42.

Figure 44:
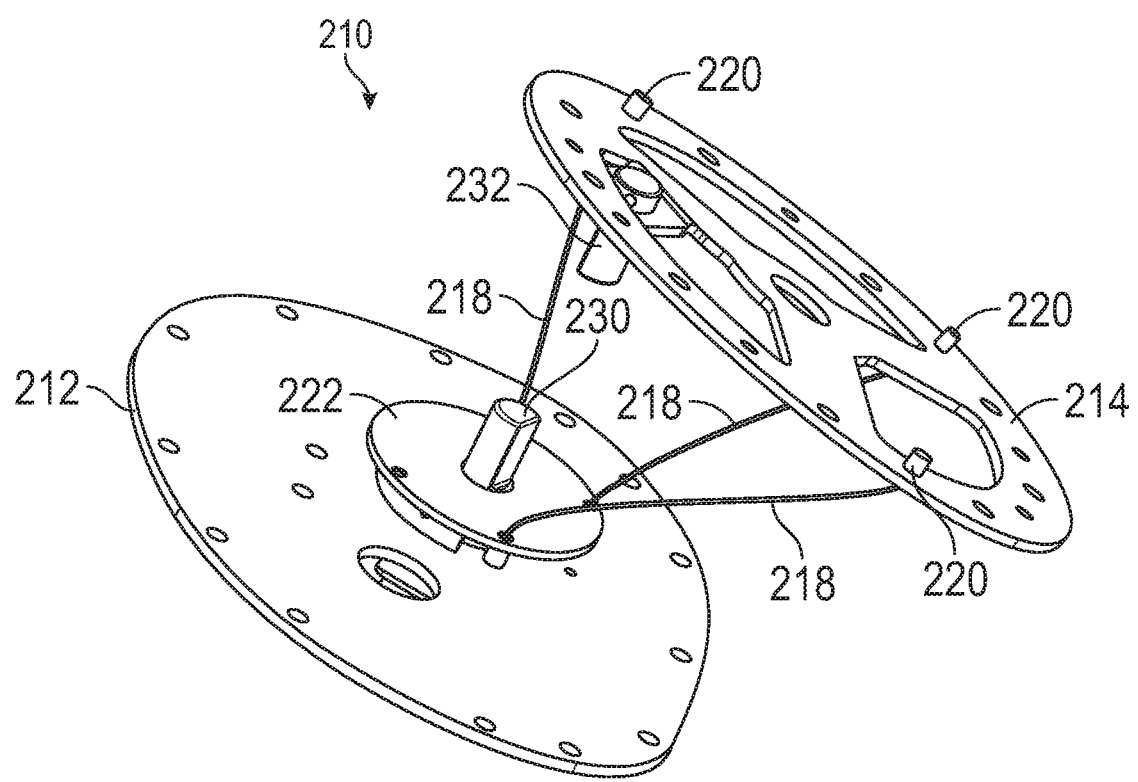

FIG. 44 is a perspective view of components of the hip joint mechanism of FIGS. 42 and 43.

Figure 45:
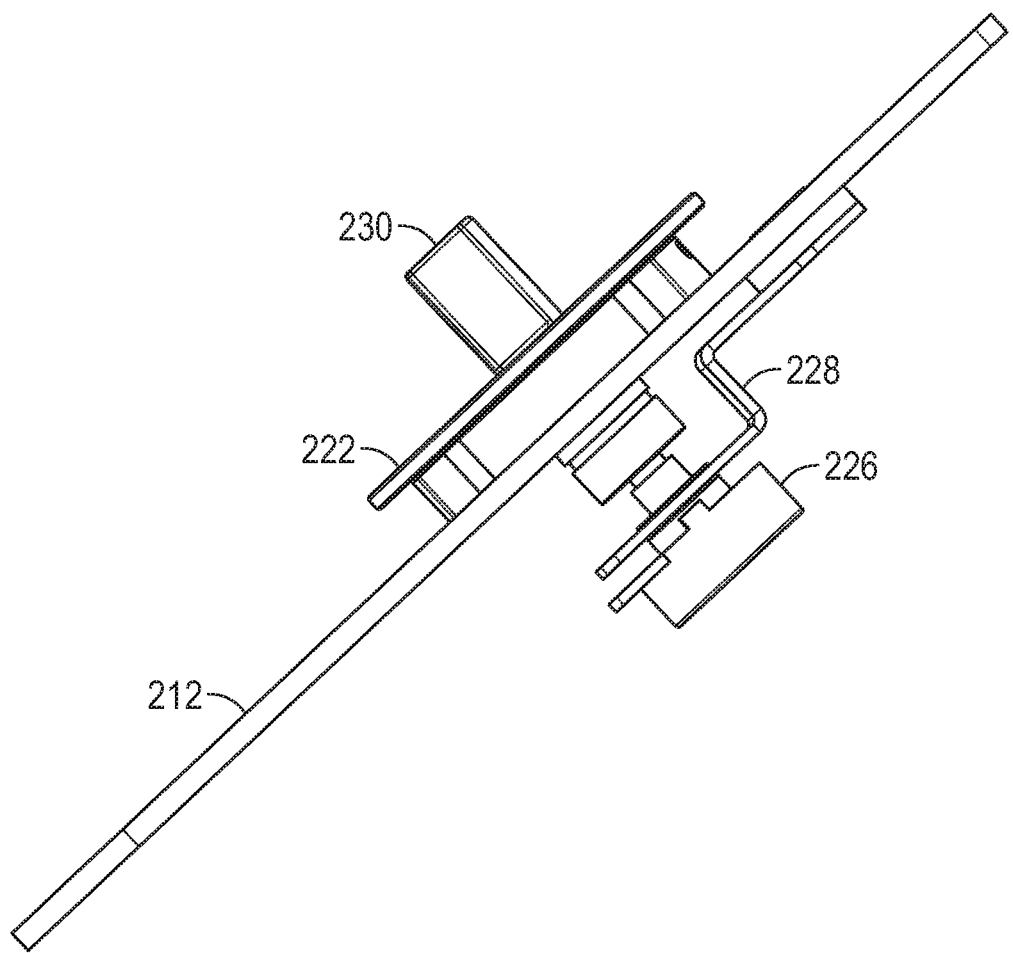

FIG. 45 is a perspective view of components of the hip joint mechanism of FIGS. 42 and 43.

Figure 46:
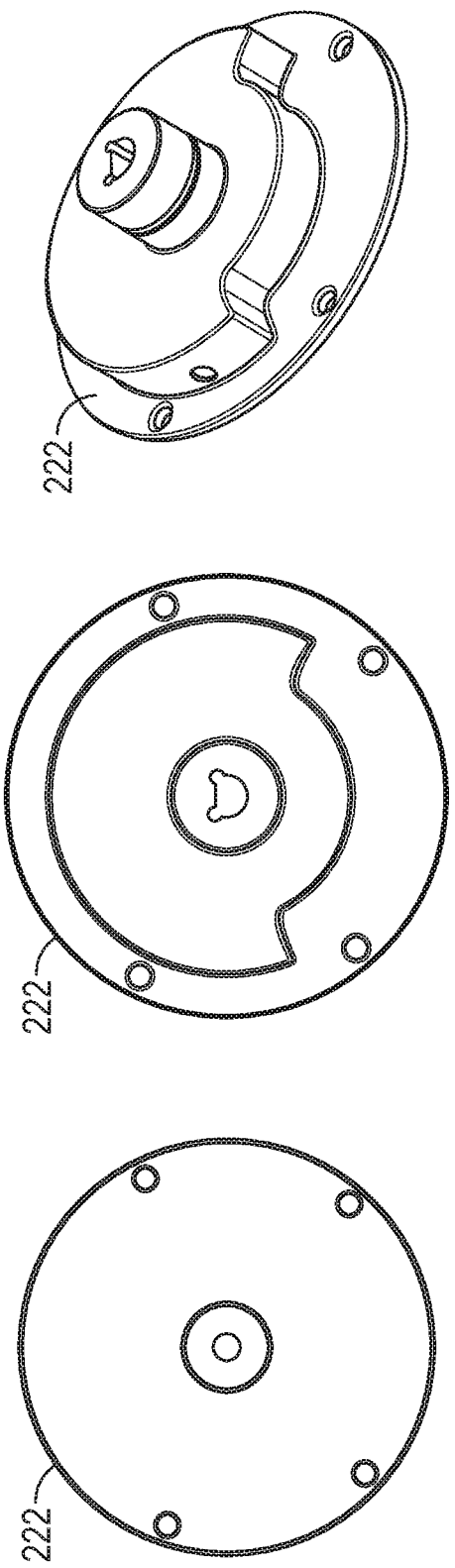

FIG. 46 provides a top view, bottom view, and perspective view of a component of the hip joint mechanism of FIGS. 42 and 43.

Figure 47:
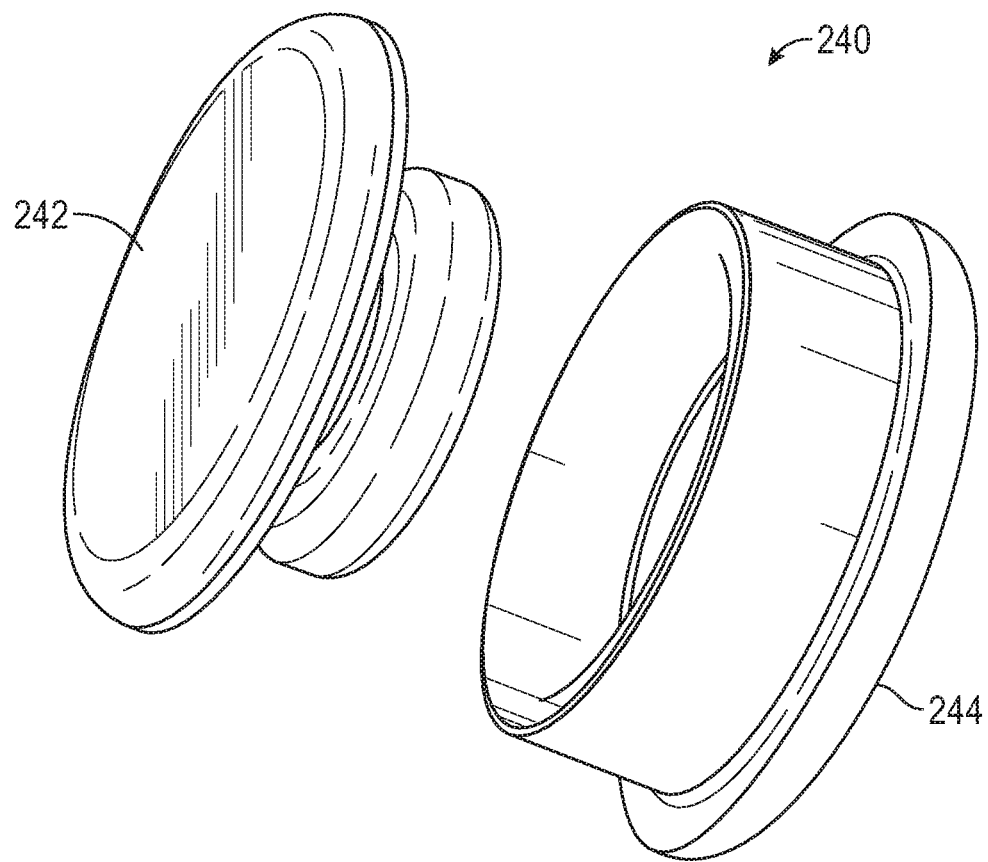

FIG. 47 is a perspective view of a snap structure according to an embodiment of the present disclosure.

Figure 48:
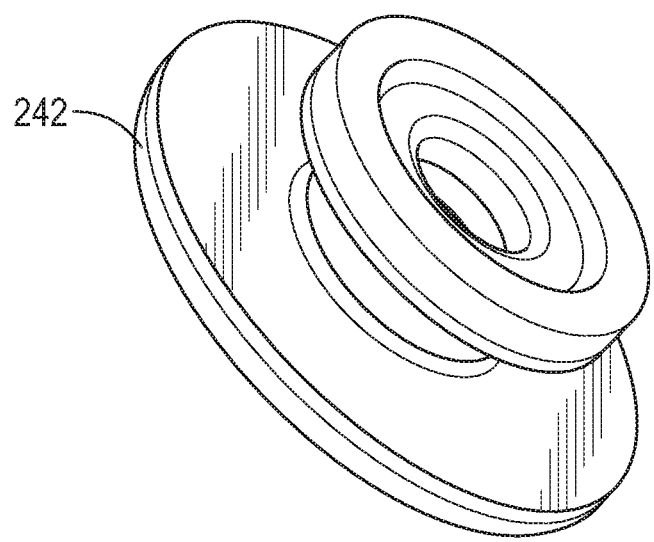

FIG. 48 is a perspective view of a male component of the snap structure of FIG. 47.

Figure 49:
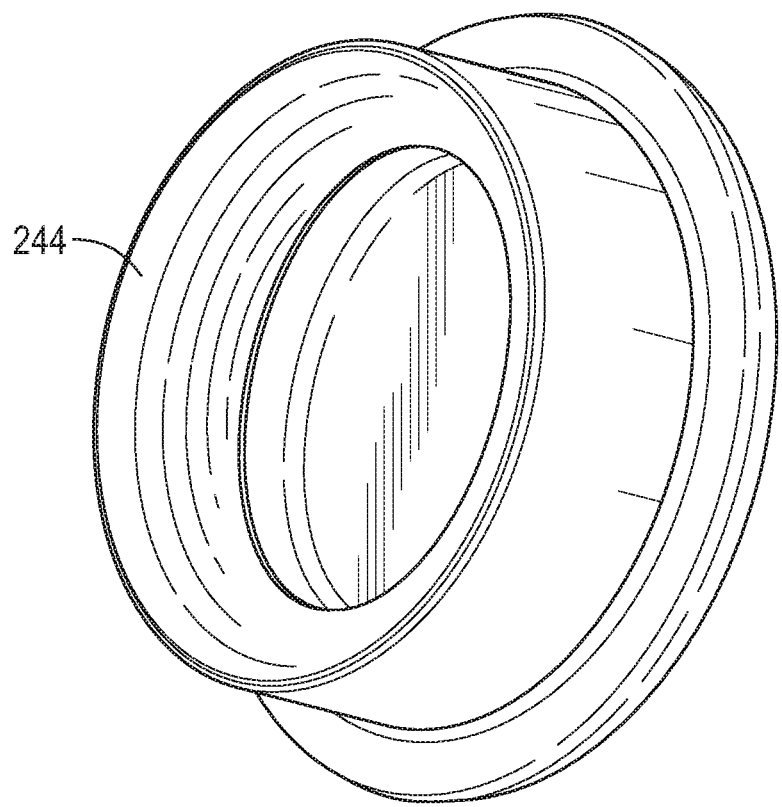

FIG. 49 is a perspective view of a female component of the snap structure of FIG. 47.

Figure 50:
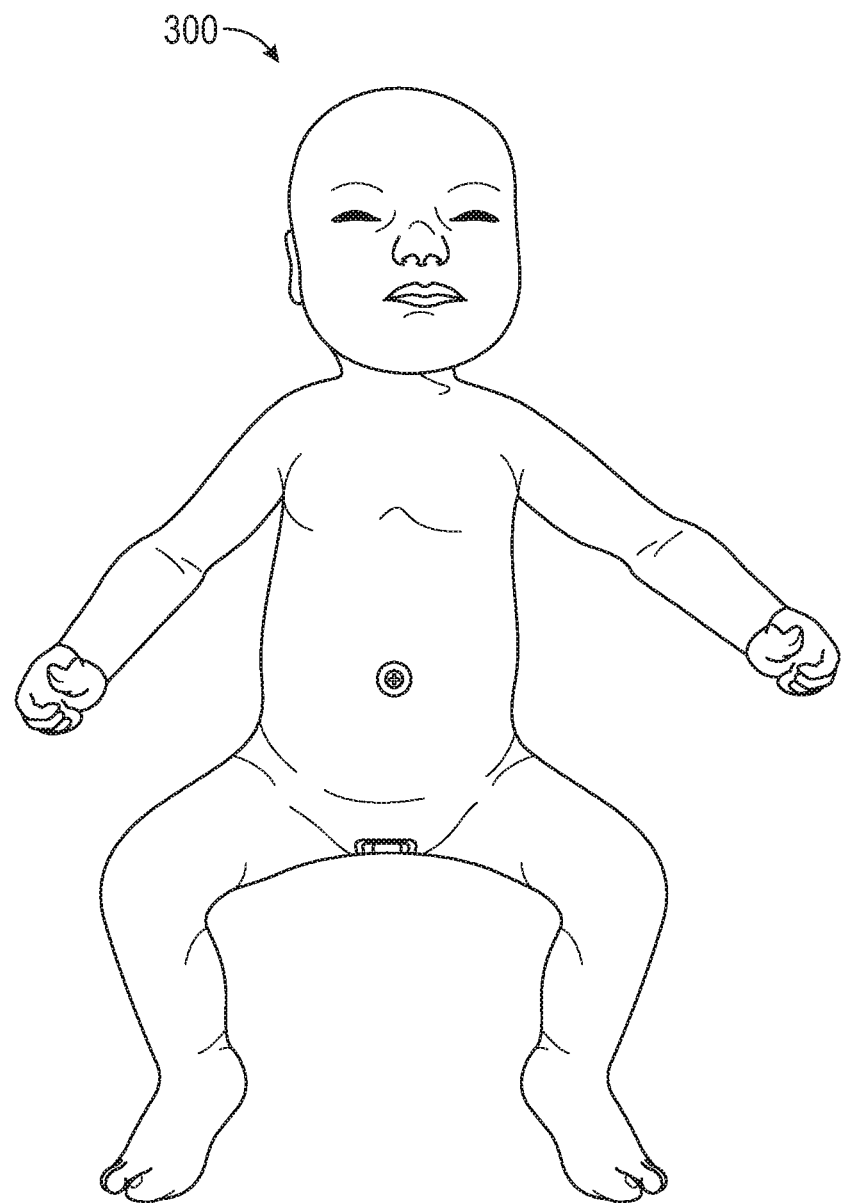

FIG. 50 is a front view of a fetal patient simulator according to an embodiment of the present disclosure.

Figure 51:
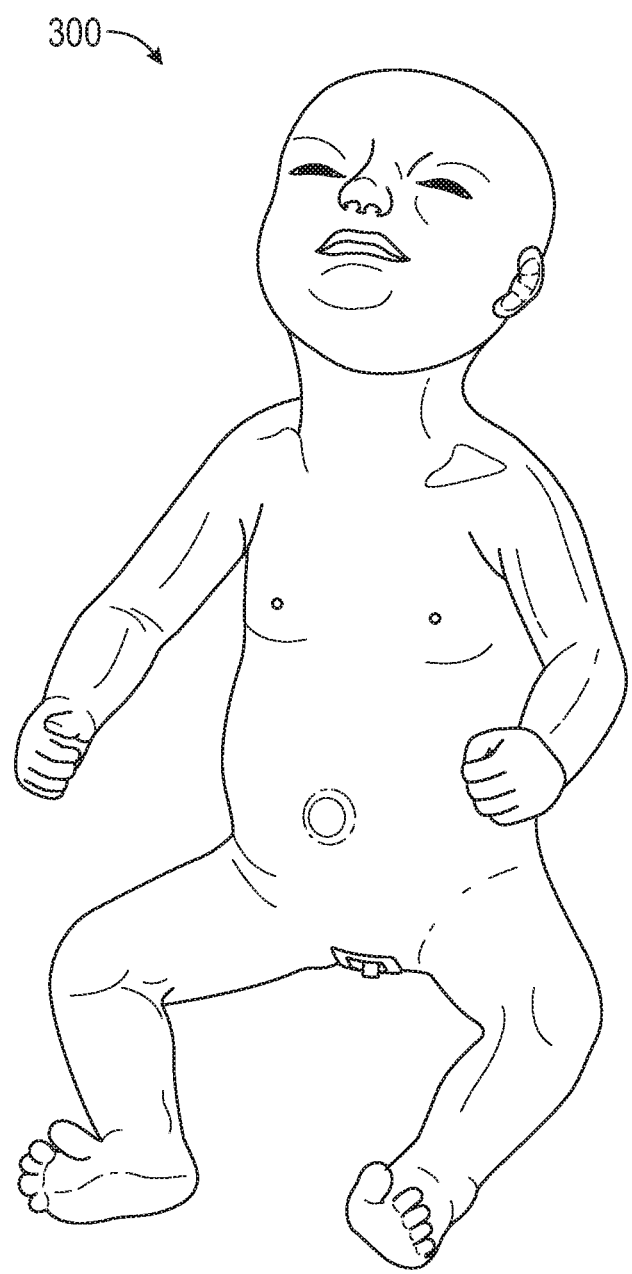

FIG. 51 is a perspective view of the fetal patient simulator of FIG. 50.

Figure 52:
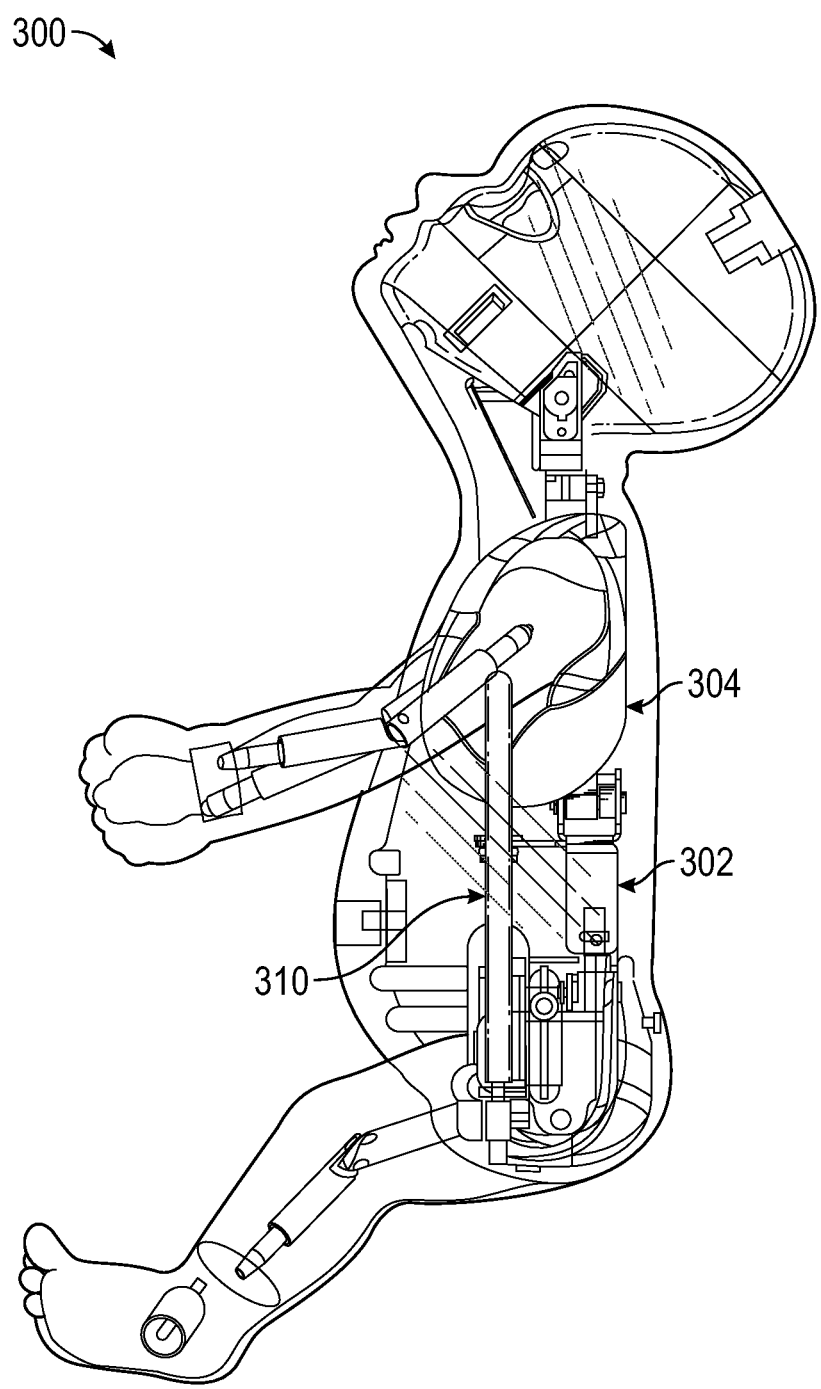

FIG. 52 is a side, partially transparent view of the fetal patient simulator of FIGS. 50 and 51.

Figure 53:
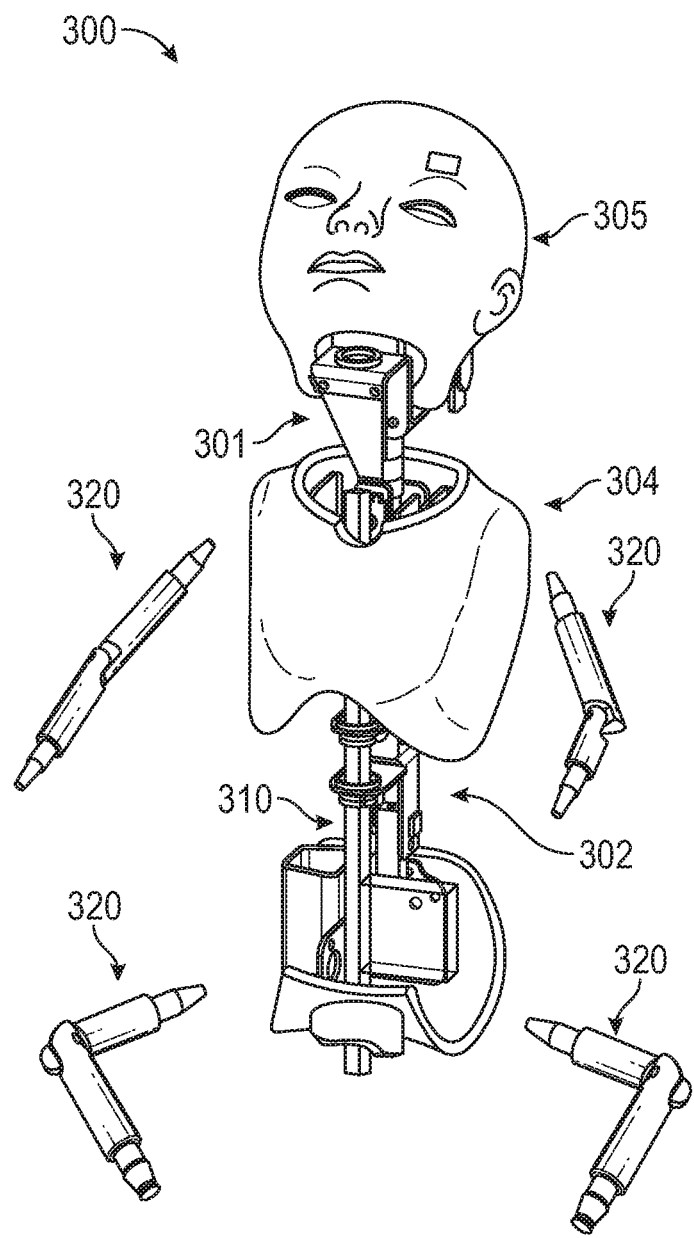

FIG. 53 is a perspective view of inner components of the fetal patient simulator of FIGS. 50-52.

Figure 54:
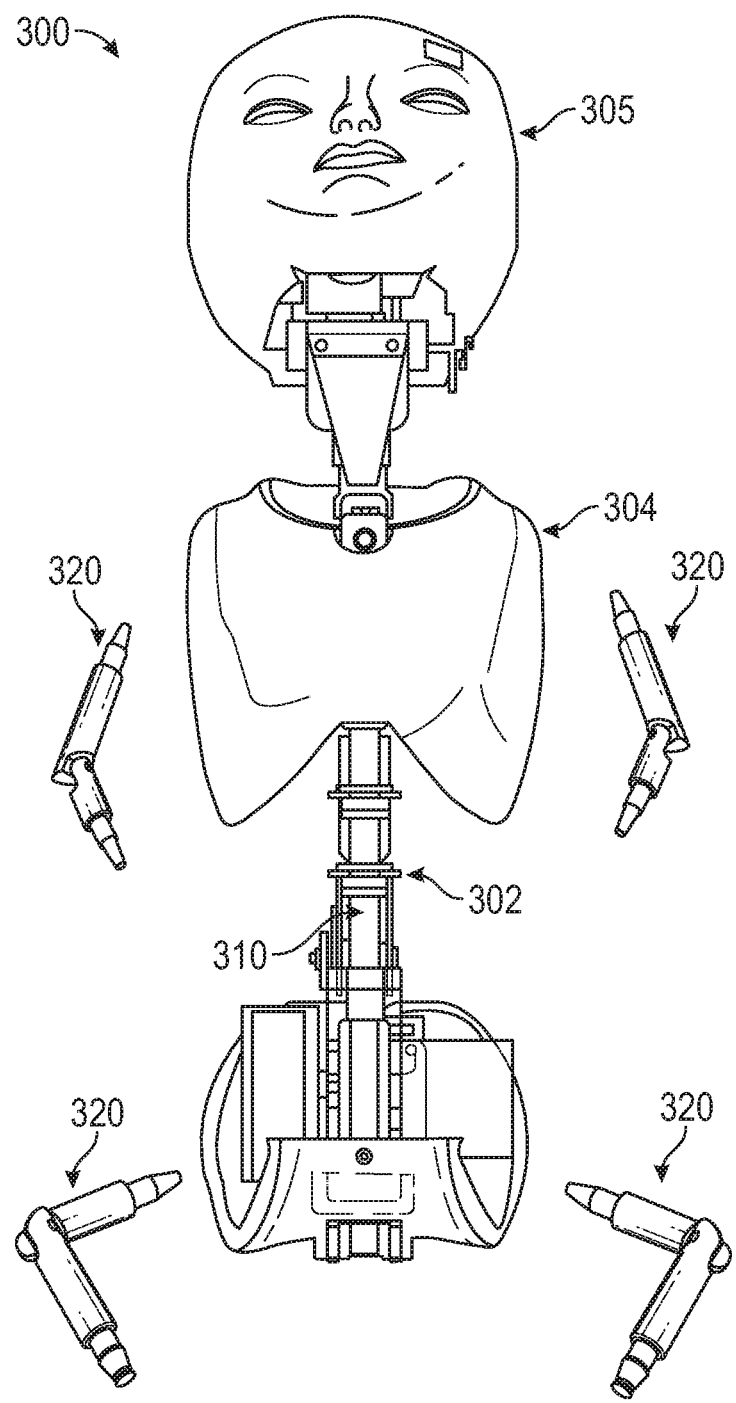

FIG. 54 is a front view of the inner components of the fetal patient simulator shown in FIG. 53.

Figure 55:
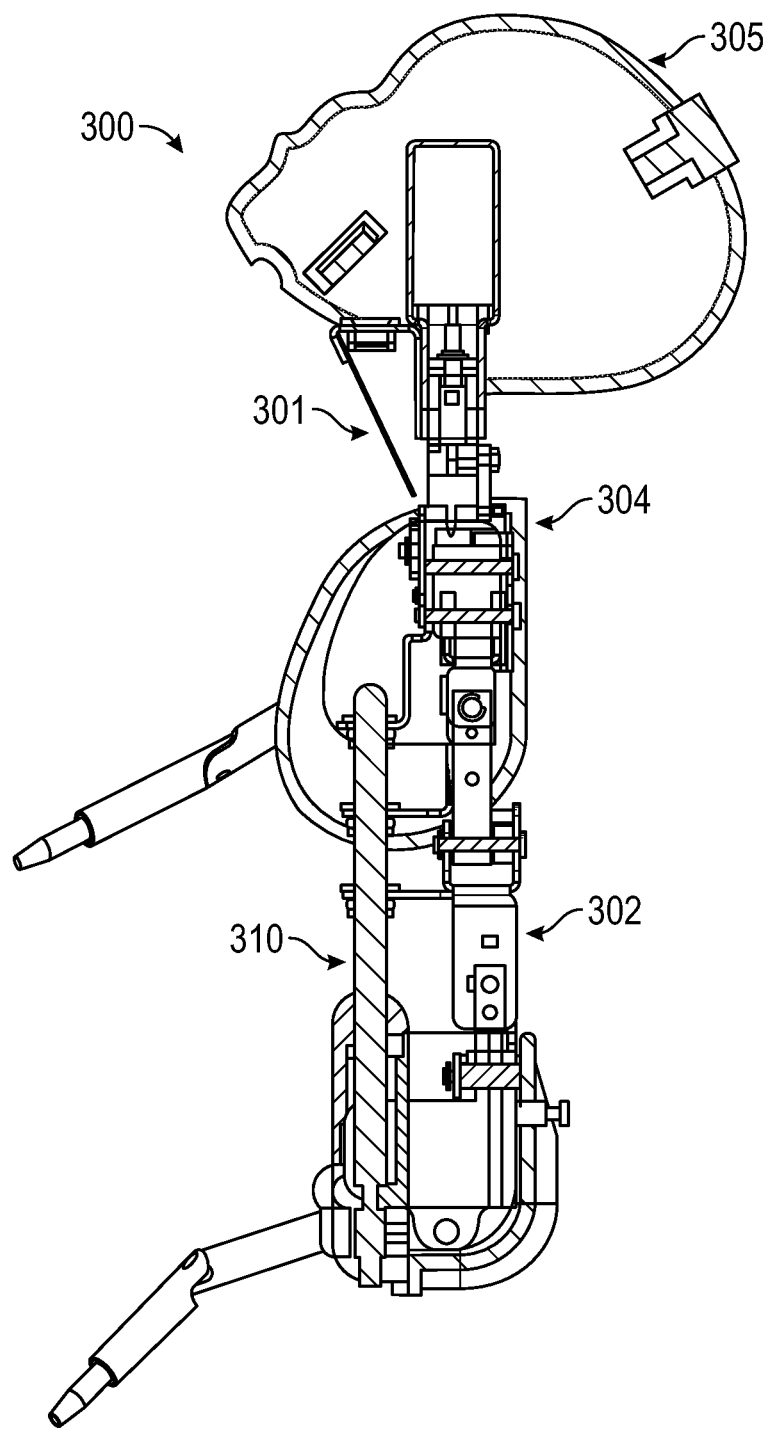

FIG. 55 is a cross-sectional side view of the inner components of the fetal patient simulator shown in FIGS. 53 and 54.

Figure 56:
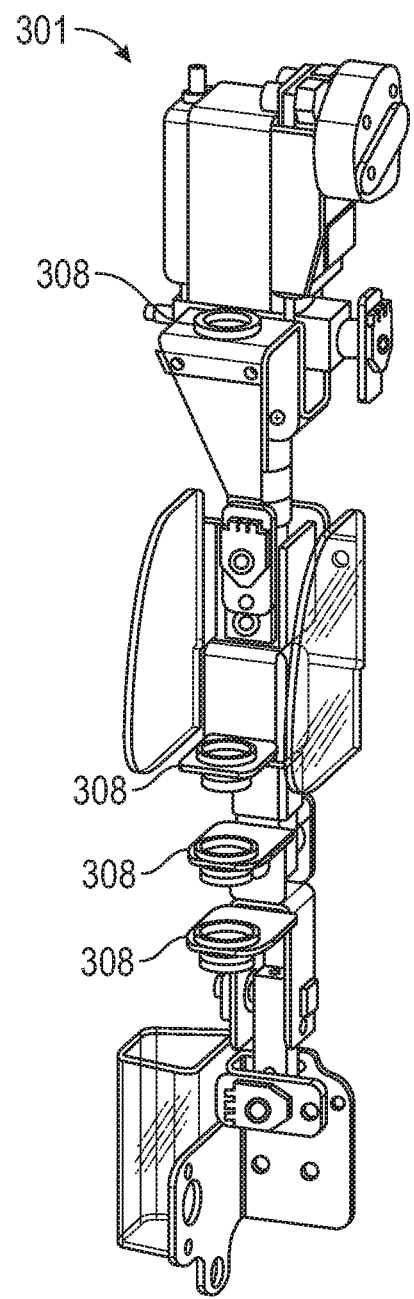

FIG. 56 is a perspective view of a spinal structure of the fetal patient simulator of FIGS. 50-55 according to an embodiment of the present disclosure.

Figure 57:
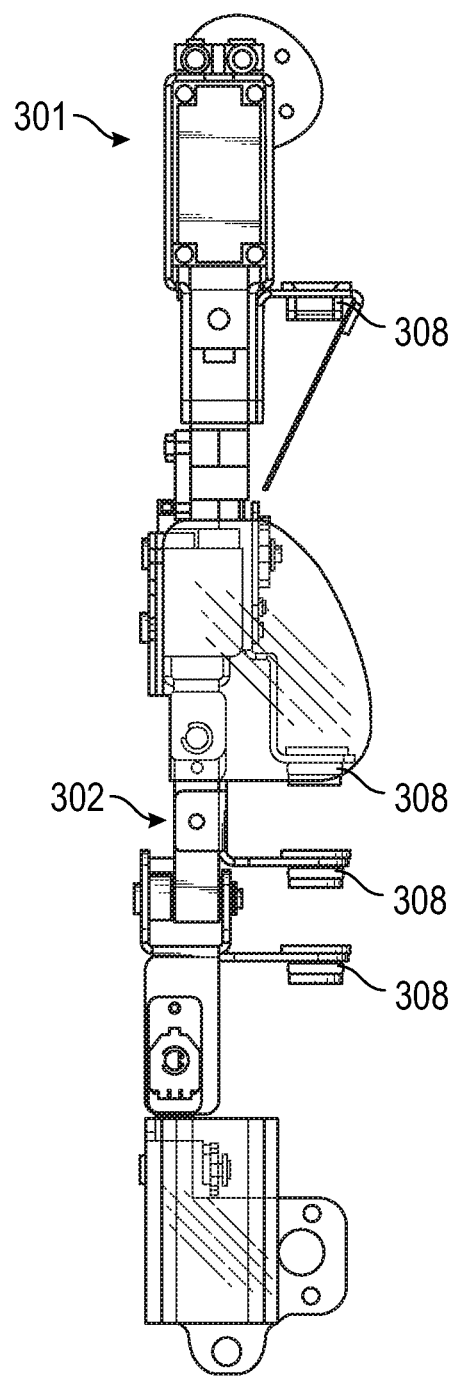

FIG. 57 is a side view of the spinal structure of FIG. 56.

Figure 58:
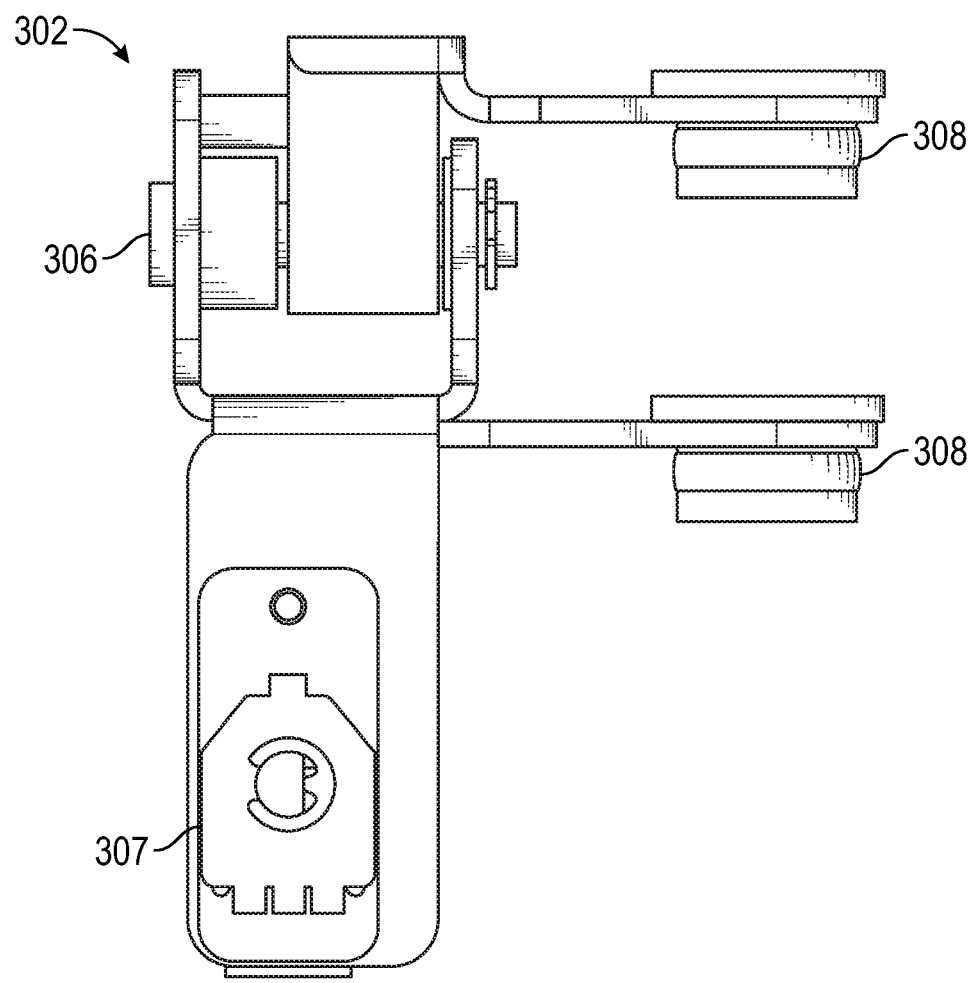

FIG. 58 is a front view of a joint of the spinal structure of FIGS. 56 and 57 that includes an encoder.

Figure 59:
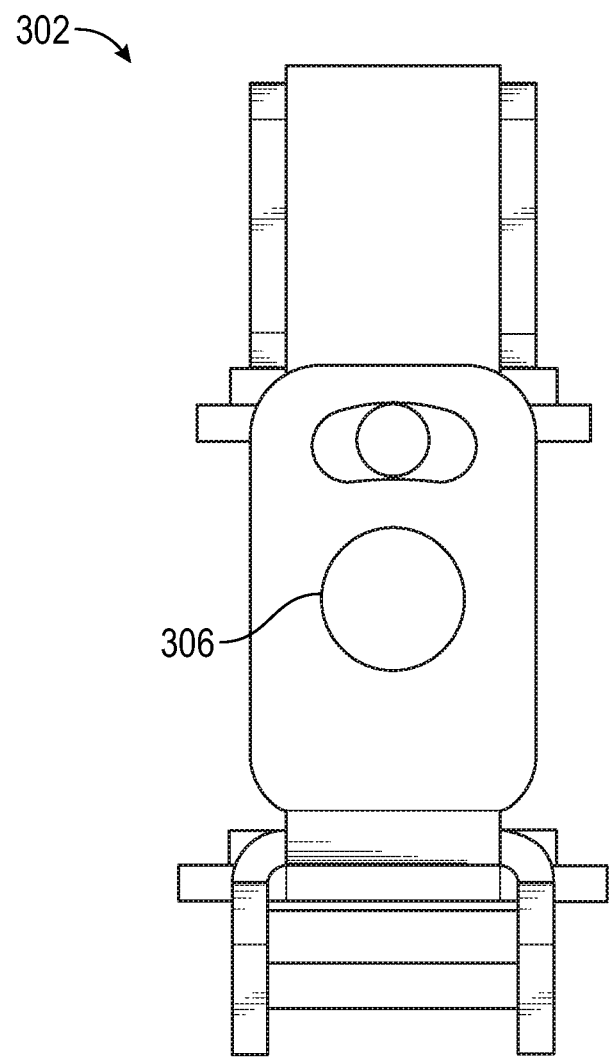

FIG. 59 is a front view of a joint of the spinal structure of FIGS. 56 and 57 that does not include an encoder.

Figure 60:
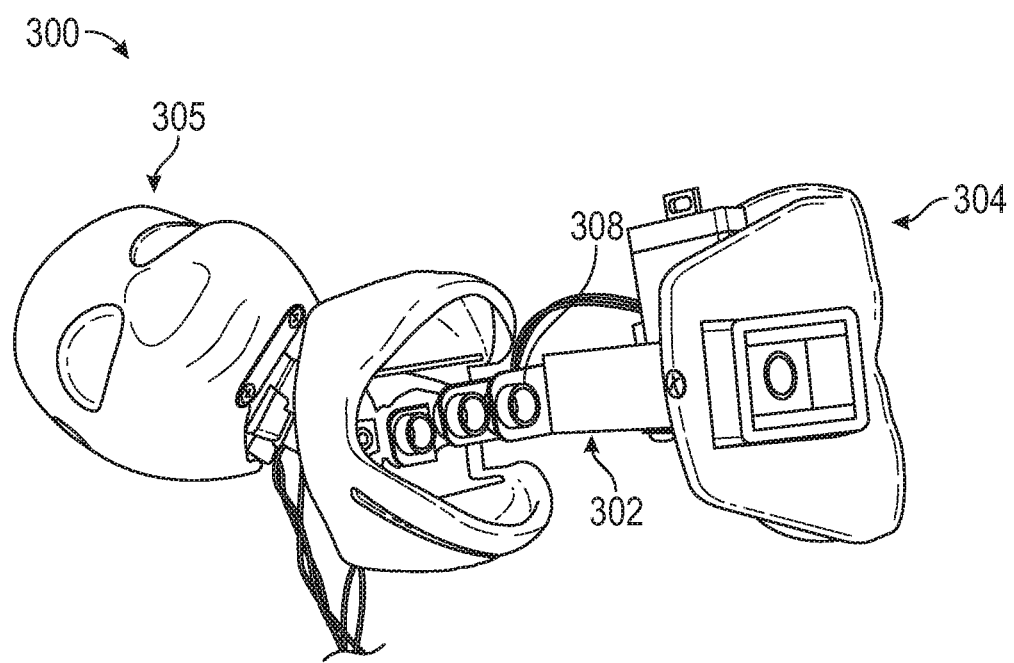

FIG. 60 is a perspective view of a partially assembled fetal patient simulator according to an embodiment of the present disclosure.

Figure 61:
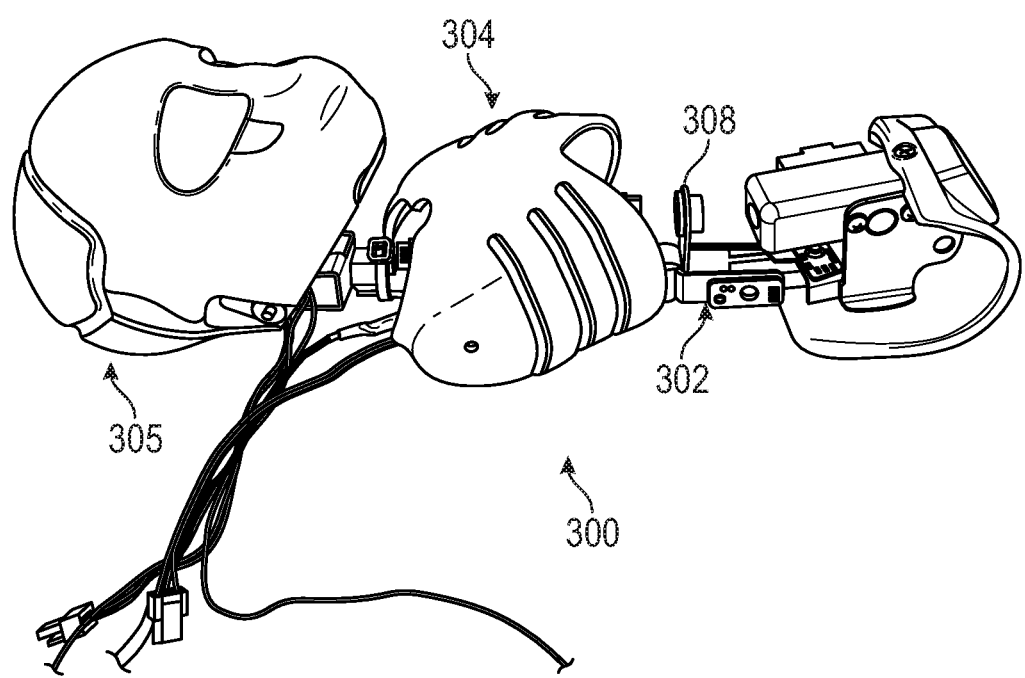

FIG. 61 is another perspective view of the partially assembled fetal patient simulator of FIG. 60.

Figure 62:
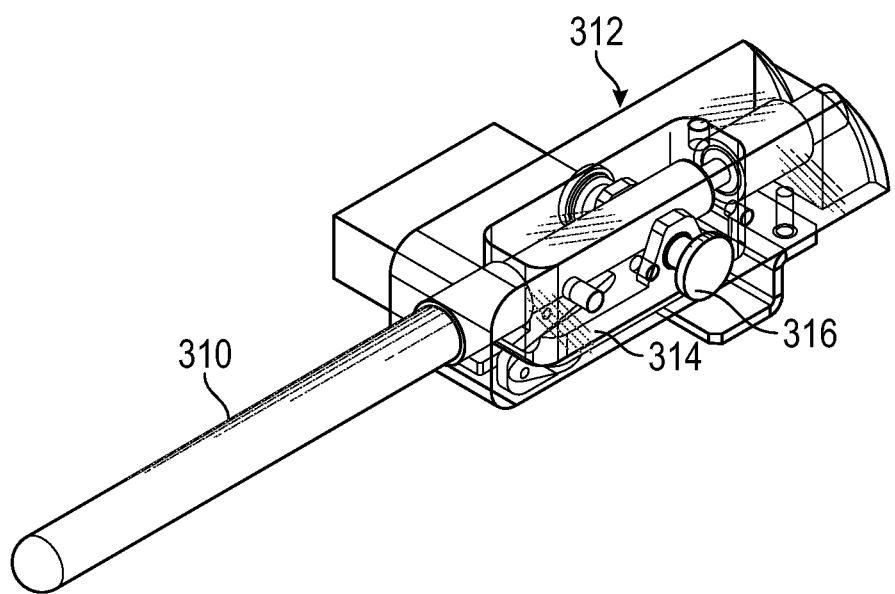

FIG. 62 is a perspective, partially transparent view of a locking mechanism of the fetal patient simulator of FIGS. 50-55 engaged with a stiffening rod according to an embodiment of the present disclosure.

Figure 63:
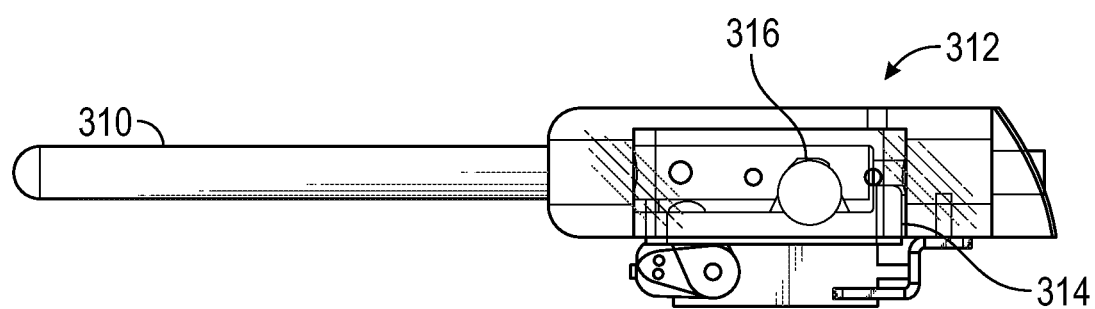

FIG. 63 is a side, partially transparent view of the locking mechanism and stiffening rod of FIG. 62.

Figure 64:
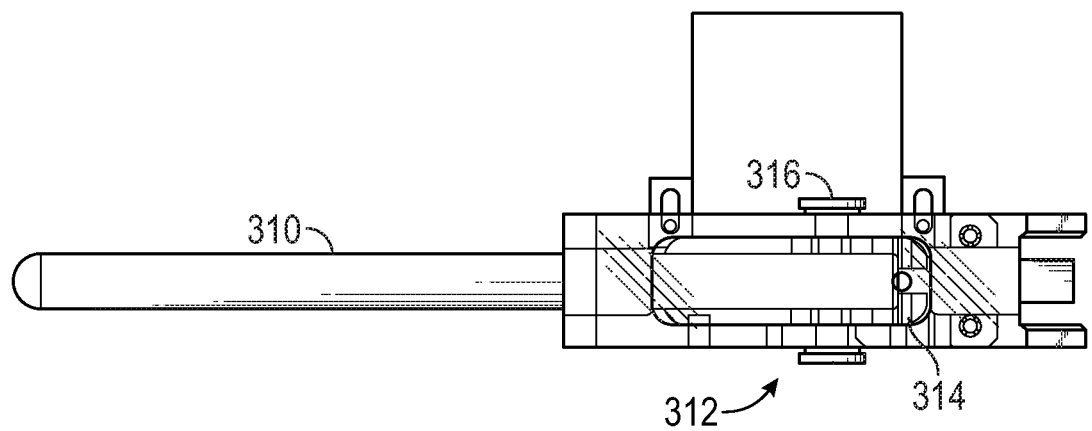

FIG. 64 is a top, partially transparent view of the locking mechanism and stiffening rod of FIGS. 62 and 63.

Figure 65:
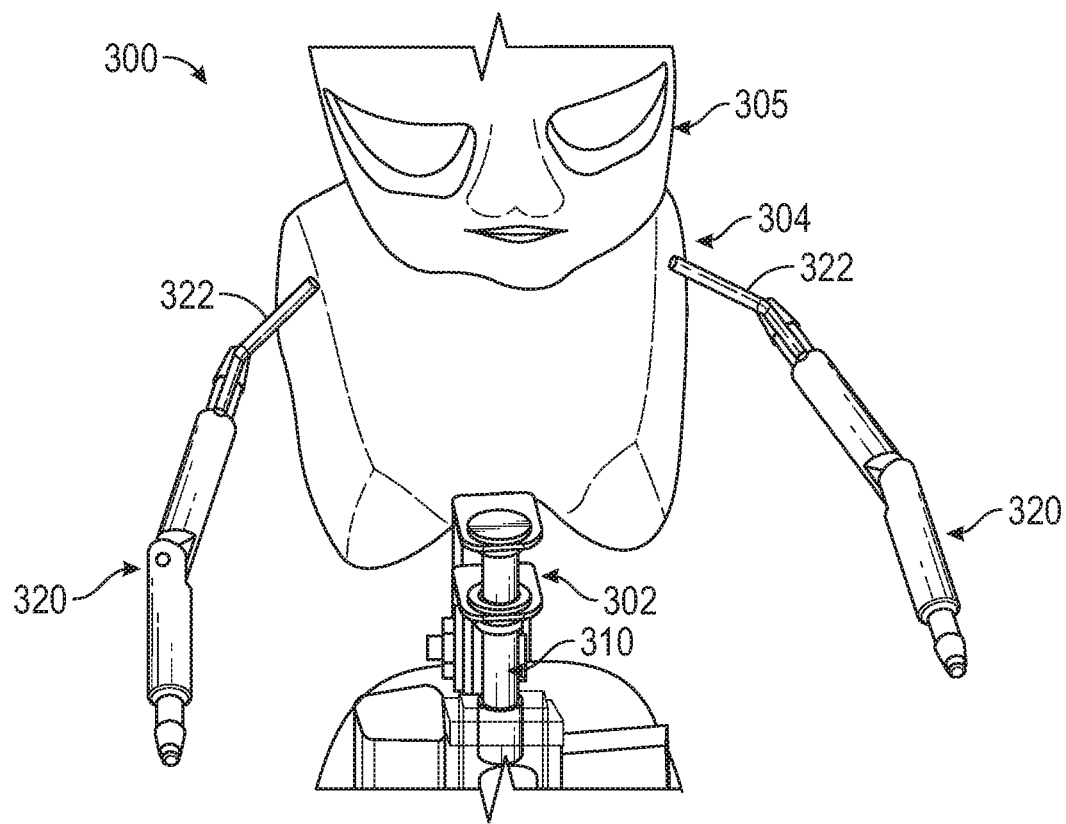

FIG. 65 is a perspective view of a section of inner components of the fetal patient simulator of FIGS. 50-55 showing aspects of the arms of the fetal patient simulator according to an embodiment of the present disclosure.

Figure 66:
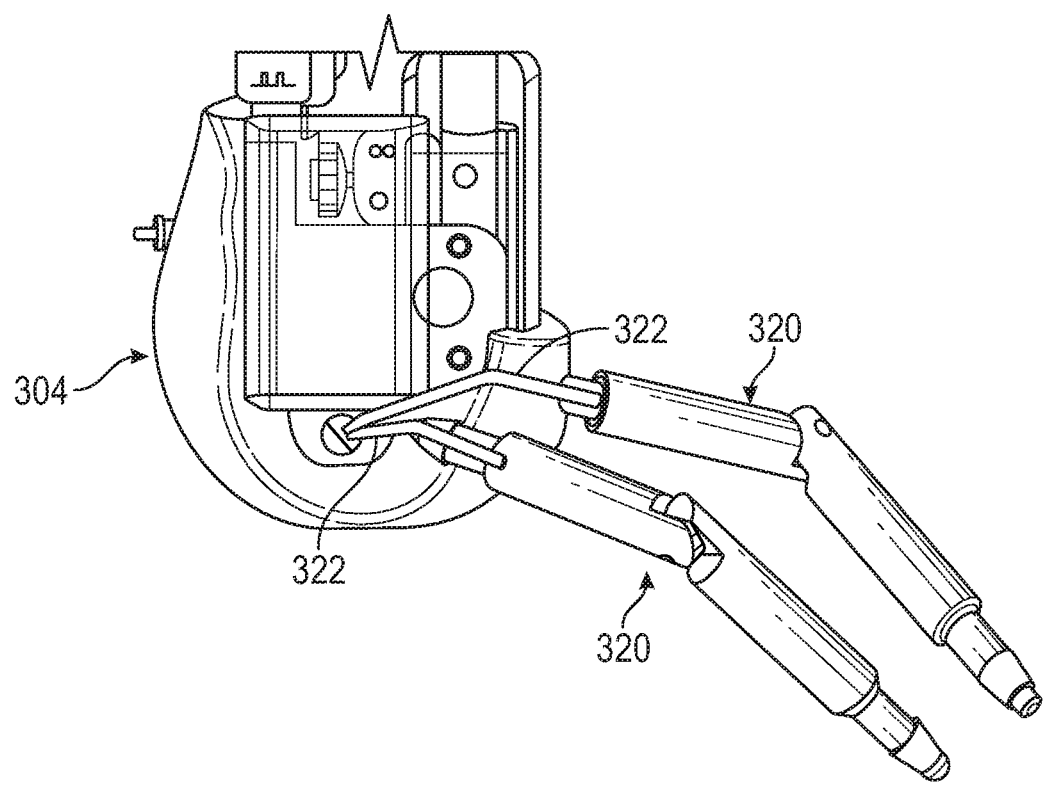

FIG. 66 is a perspective view of a section of inner components of the fetal patient simulator of FIGS. 50-55 showing aspects of the legs of the fetal patient simulator according to an embodiment of the present disclosure.

Figure 67:
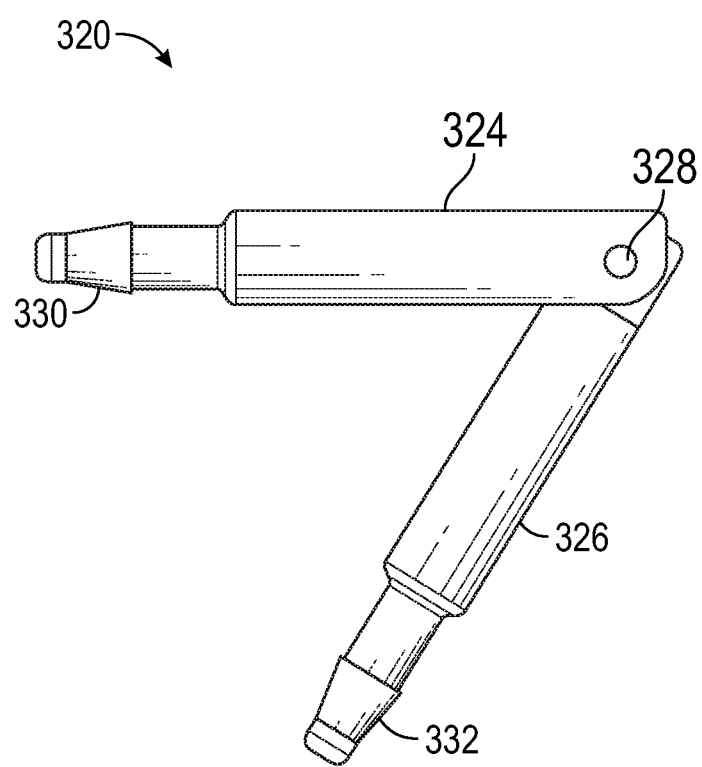

FIG. 67 is a perspective view of an elbow or knee joint of a fetal patient simulator according to an embodiment of the present disclosure.

Figure 68:
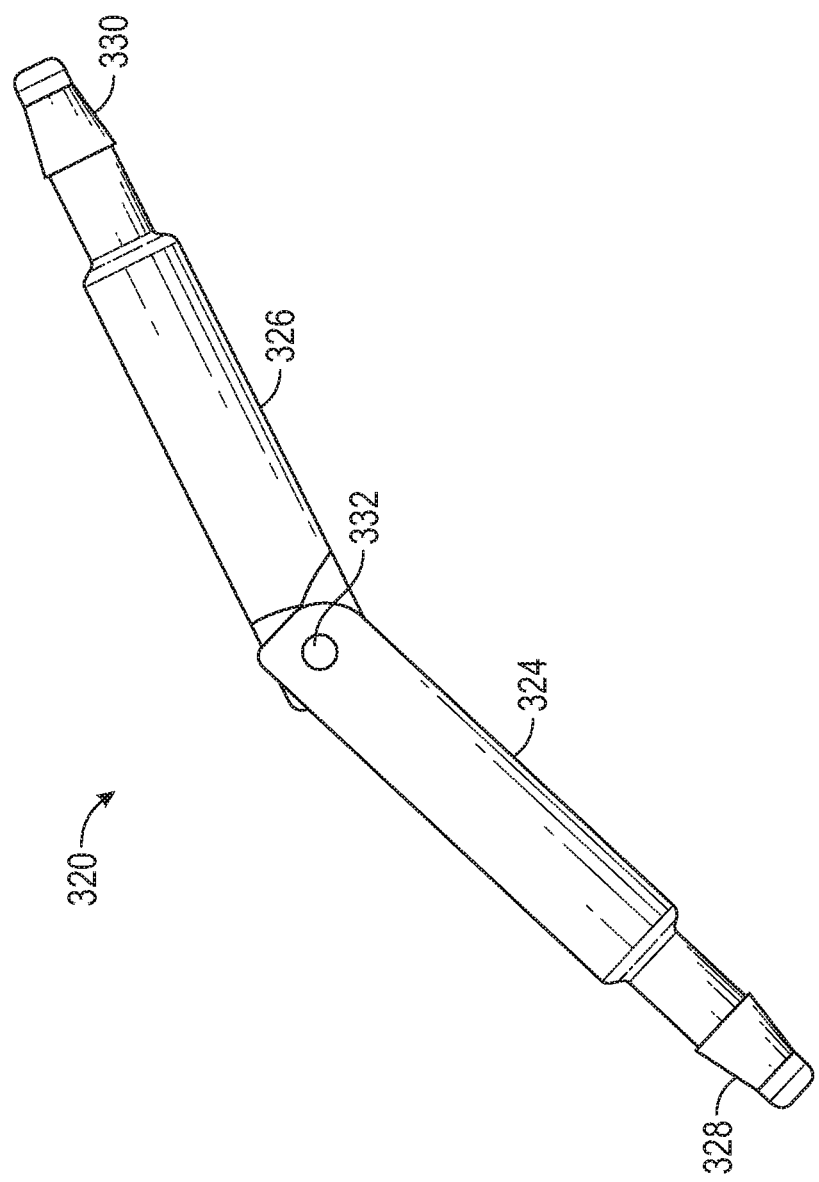

FIG. 68 is a perspective view of the elbow or knee joint of FIG. 67 shown in an extended configuration.

Figure 69:
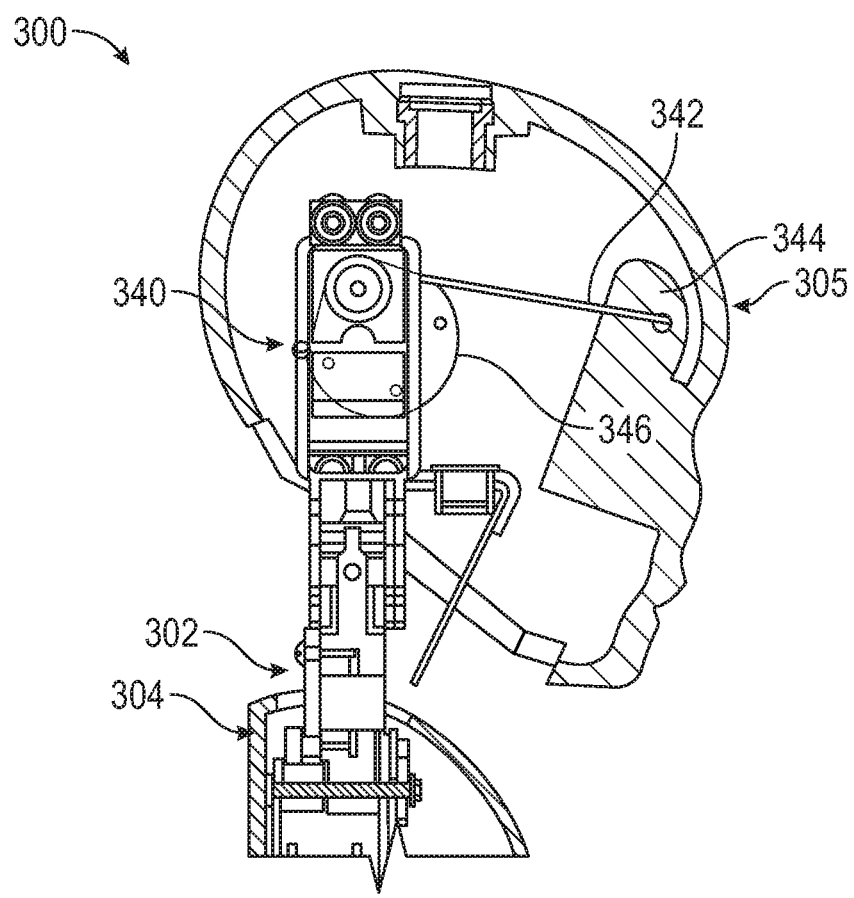

FIG. 69 is a side, cross-sectional view of a head of the fetal patient simulator of FIGS. 50-55 with the head in a neutral position.

Figure 70:
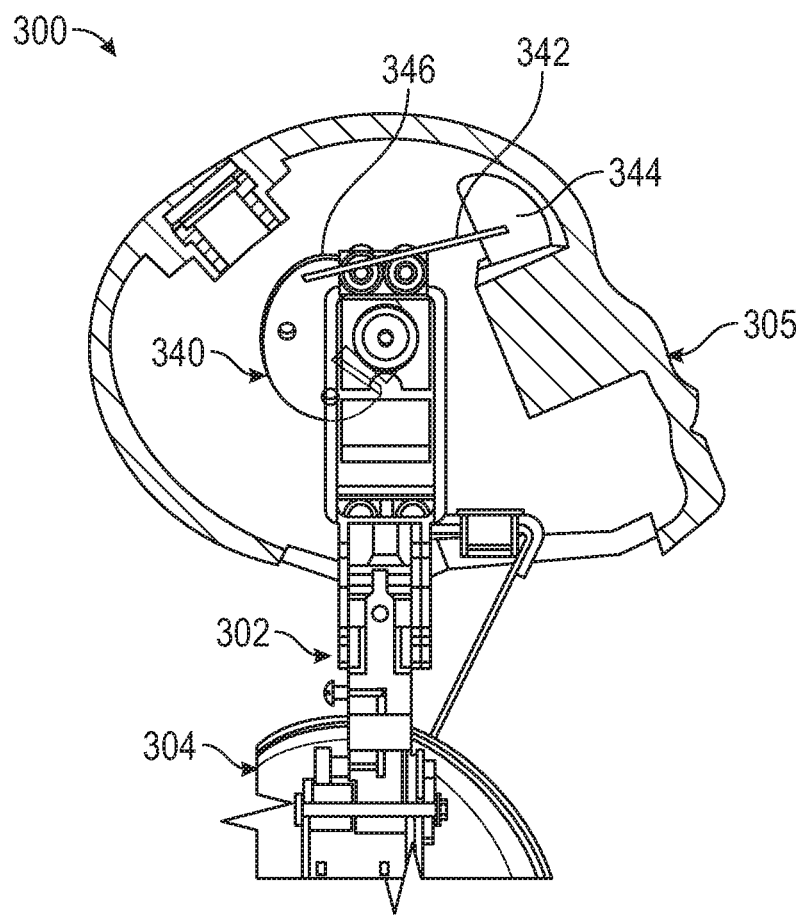

FIG. 70 is a side, cross-sectional view of the head of FIG. 69, but showing the head in a raised position.

Figure 71:
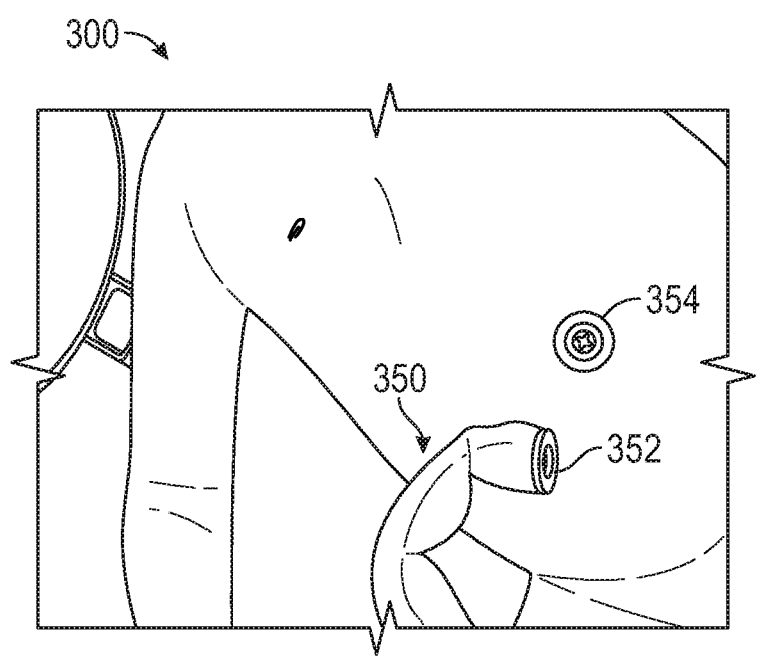

FIG. 71 is a perspective view of a torso of the fetal patient simulator of FIGS. 50-55 shown with an umbilical cord configured to be attached to a belly button of the fetal patient simulator according to an embodiment of the present disclosure.

Figure 72:
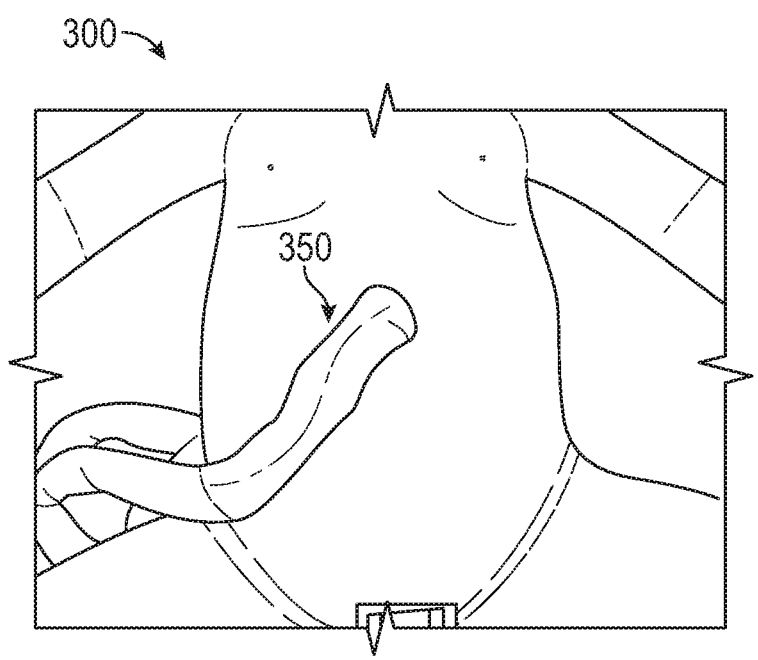

FIG. 72 is a perspective view of the torso and umbilical cord of FIG. 71, but with the umbilical attached to the belly button of the fetal patient simulator.

Figure 73:
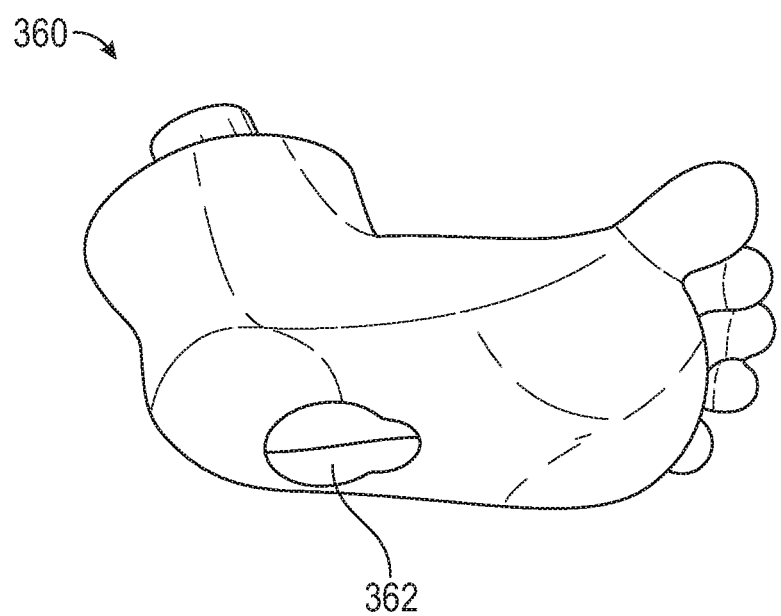

FIG. 73 is a perspective view of a foot of the fetal patient simulator of FIGS. 50-55 according to an embodiment of the present disclosure.

Figure 74:
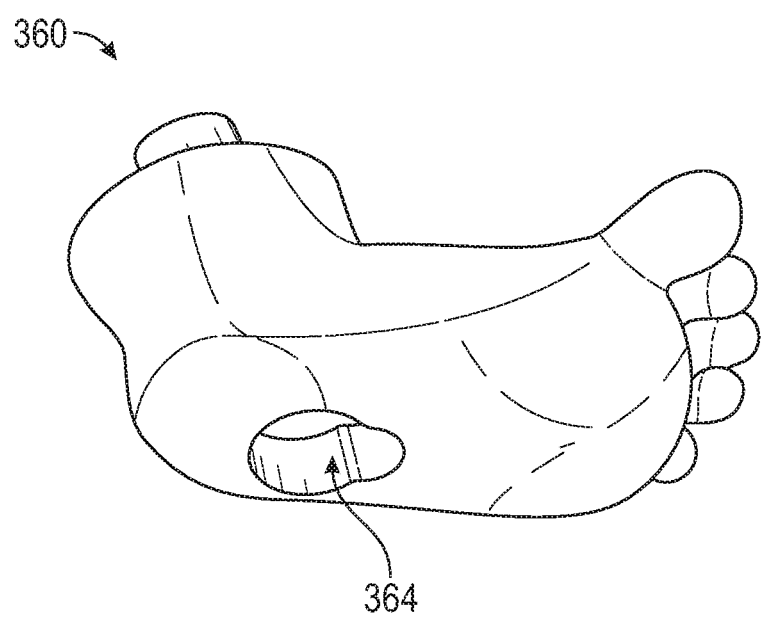

FIG. 74 is a perspective view of the foot of FIG. 73 with a plug cover removed.

Figure 75:
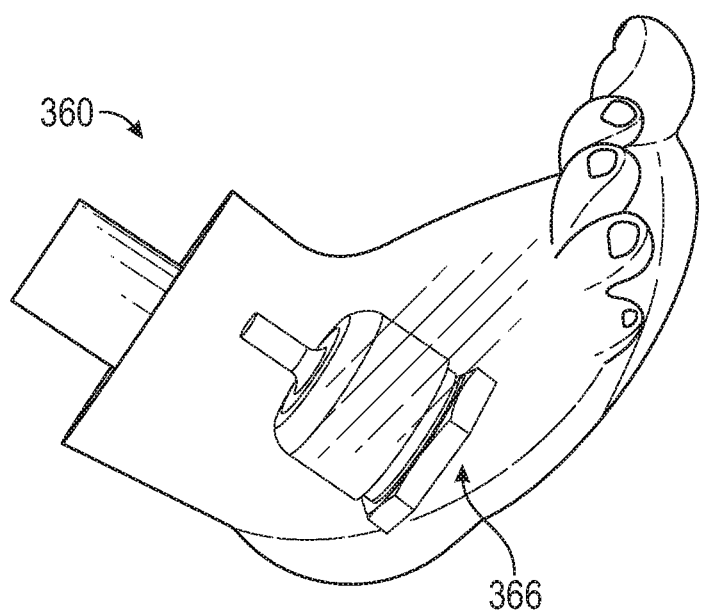

FIG. 75 is a perspective, partially transparent view of the foot of FIGS. 73 and 74 showing a communication and/or power port disposed therein according to an embodiment of the present disclosure.

Figure 76:
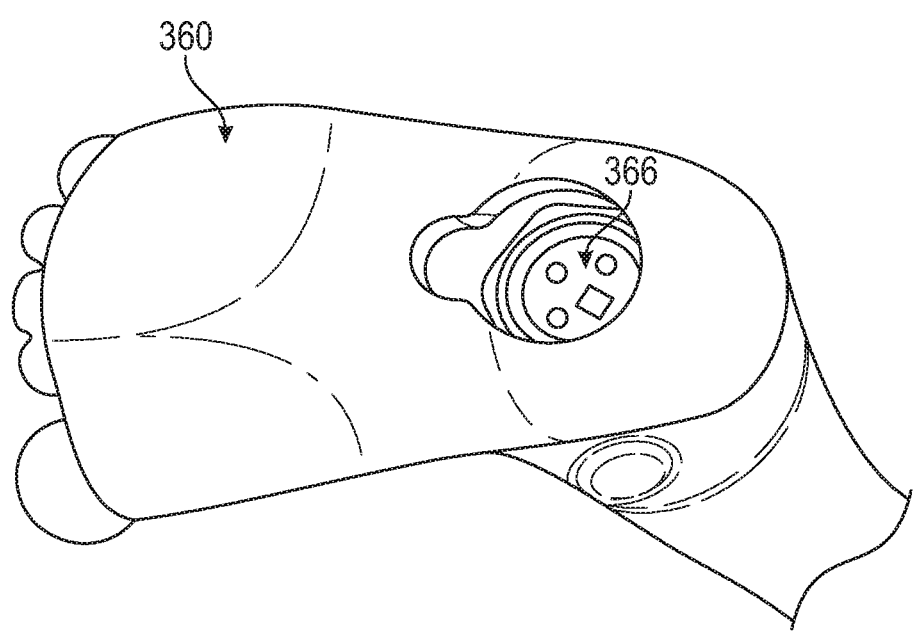

FIG. 76 is a bottom view of the foot of FIGS. 73-75 with the plug cover removed to provide access to the communication and/or power port.

DETAILED DESCRIPTION OF PREFERRED EMBODIMENTS

For the purposes of promoting an understanding of the principles of the present disclosure, reference will now be made to the embodiments illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately. For simplicity, in some instances the same reference numbers are used throughout the drawings to refer to the same or like parts.

One of the aims of healthcare simulation is to establish a teaching environment that closely mimics key clinical cases in a reproducible manner. The introduction of high fidelity tetherless simulators, such as those available from Gaumard Scientific Company, Inc., over the past few years has proven to be a significant advance in creating realistic teaching environments. The present disclosure is directed to a patient simulator system that expands the functionality of the simulators by increasing the realism of the look, feel, and functionality of the simulators that can be used to train medical personnel in a variety of clinical situations. The patient simulator systems disclosed herein offers a training platform on which team-building scenarios can be performed for the development of medical treatment skills and the advancement of patient safety.

In particular, the patient simulator system disclosed herein includes a maternal patient simulator and associated fetal patient simulator that have improved realism and functionality compared to previously available simulators. Some of the various features that facilitate the improved realism and functionality are described in detail below. The patient simulator systems of the present disclosure allow users to practice a range of different simulated birthing scenarios. Thus, the patient simulator system facilitates the training of user's across the range of birthing scenarios and corresponding assessment of the user's response to the different simulated birthing scenarios. Accordingly, the user's medical treatment skills can be obtained and/or improved in a simulated environment without endangering a live patient.

Moreover, the patient simulator system allows for multiple users to simultaneously work with the patient simulator during a particular birthing scenario, thereby facilitating team training and assessment in a realistic, team-based environment. By allowing multiple users to simultaneously interact with the patient simulator system, the system facilitates the real-time training and assessment of the cooperative efforts of an OB/GYN team in a wide variety of birthing scenarios and patient safety scenarios, such as, by way of non-limiting example, a fire in the hospital. In some embodiments, the patient simulator system provides for pre-operative care simulation as well as post-operative care simulation, thereby allowing users to experience, address, and assess pre-operative and post-operative management, including pre-operative acquisition of the patient history and management of post-operative complications.

For example, in some embodiments, the patient simulator system allows for the realistic reception and transport of the patient simulator through a hospital (e.g., from an emergency room to an operating room) during operation of a particular birthing scenario. In addition, the patient simulator systems can be used to conduct patient safety drills in an actual hospital or other medical setting.

In some embodiments, the patient simulator system includes features designed to enhance the educational experience. For example, in some embodiments, the system includes a processing module to simulate different medical and/or surgical scenarios during operation of the patient simulator system. In some embodiments, the system includes a camera system that allows visualization of the procedure for real-time video and log capture for debriefing purposes. In some embodiments, the patient simulator system is provided with a workbook of medical scenarios that are pre-programmed in an interactive software package, thereby providing a platform on which team-building scenarios can be performed for the development of medical treatment skills and general patient safety. Thus, the patient simulator system disclosed herein provides a system that is readily expandable and updatable without large expense and that enables users to learn comprehensive medical and surgical skills through "hands-on" training, without sacrificing the experience gained by users in using standard surgical instruments in a simulated patient treatment situation.

Figure 1:
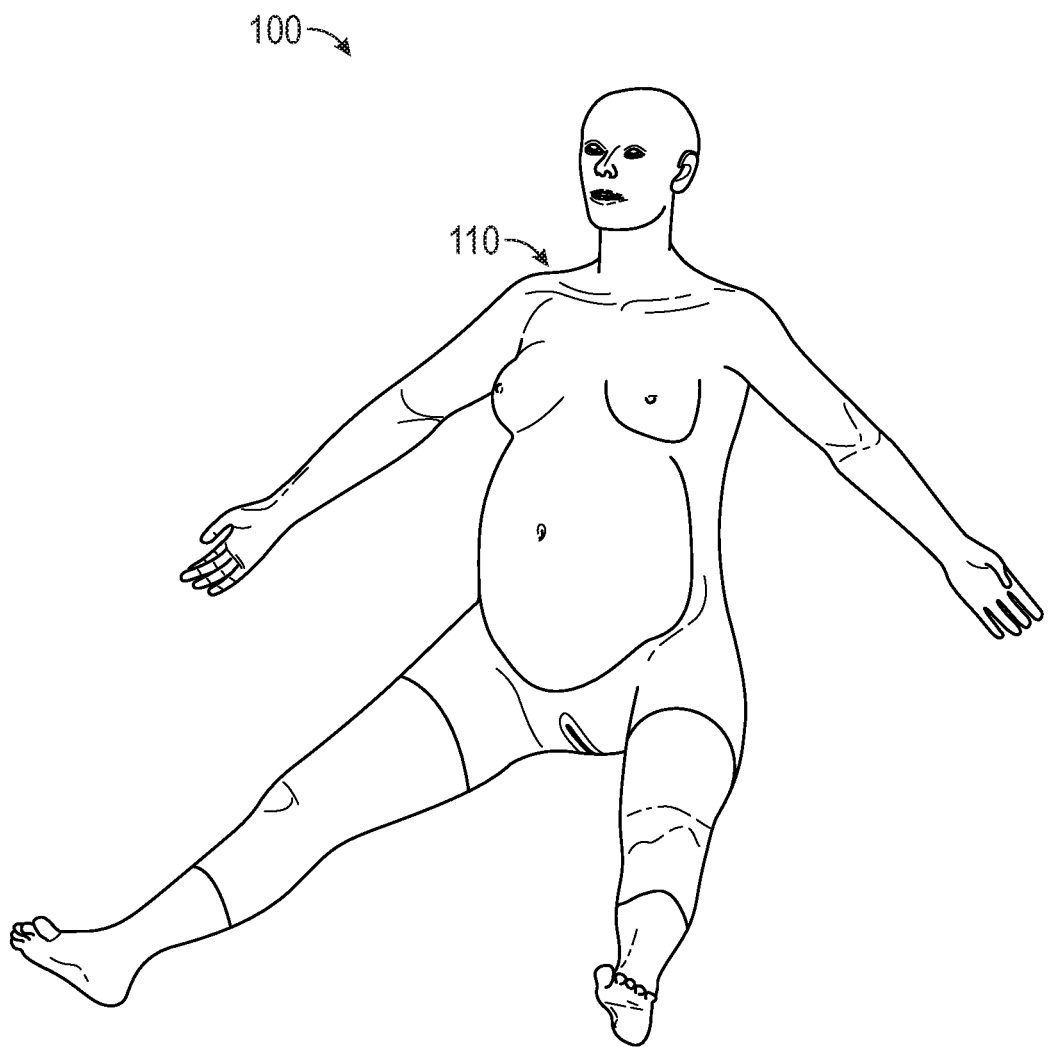
FIG. 1 is a perspective view of an exemplary maternal patient simulator according to an embodiment of the present disclosure.

FIG. 1 is a perspective view of a patient simulator system 100 according to one embodiment of the present disclosure. The patient simulator system 100 includes a maternal patient simulator 110. The maternal patient simulator 110 includes or is configured to interface with a fetal patient simulator, as discussed below, to simulate birthing scenarios. In some embodiments, the patient simulator 110 is tetherless. That is, the patient simulator 110 is functional without wired or tubular connection to other devices outside of the body and, therefore, does not require wires, tubes, or other lines extending from the patient simulator 110 in order to be fully functional. Rather, the patient simulator 110 is self-contained. Thus, the patient simulator 110 can include an internal power supply, such as a rechargeable power cell, and all pneumatic and fluid connections are made to the corresponding compressors or other devices within the patient simulator 110. As the patient simulator 110 is self-contained, it is not only portable, but can be in use while being transported between different locations. Further, in such embodiments, the patient simulator 110 may communicate with other devices, such as a control interface, through wireless communication. Thus, the entire simulator system can be functional up to the limits of the wireless communication. Further, in some embodiments the patient simulator 110 connects wirelessly to a processing system, which in some instances includes a computer or network system, which then connects to other remote devices via a wired or wireless network, making the functional distance of the patient simulator system 100, and in particular the patient simulator 110, virtually limitless. In alternative embodiments, the patient simulator 110 is operable in tethered and tetherless configurations.

Figure 2:
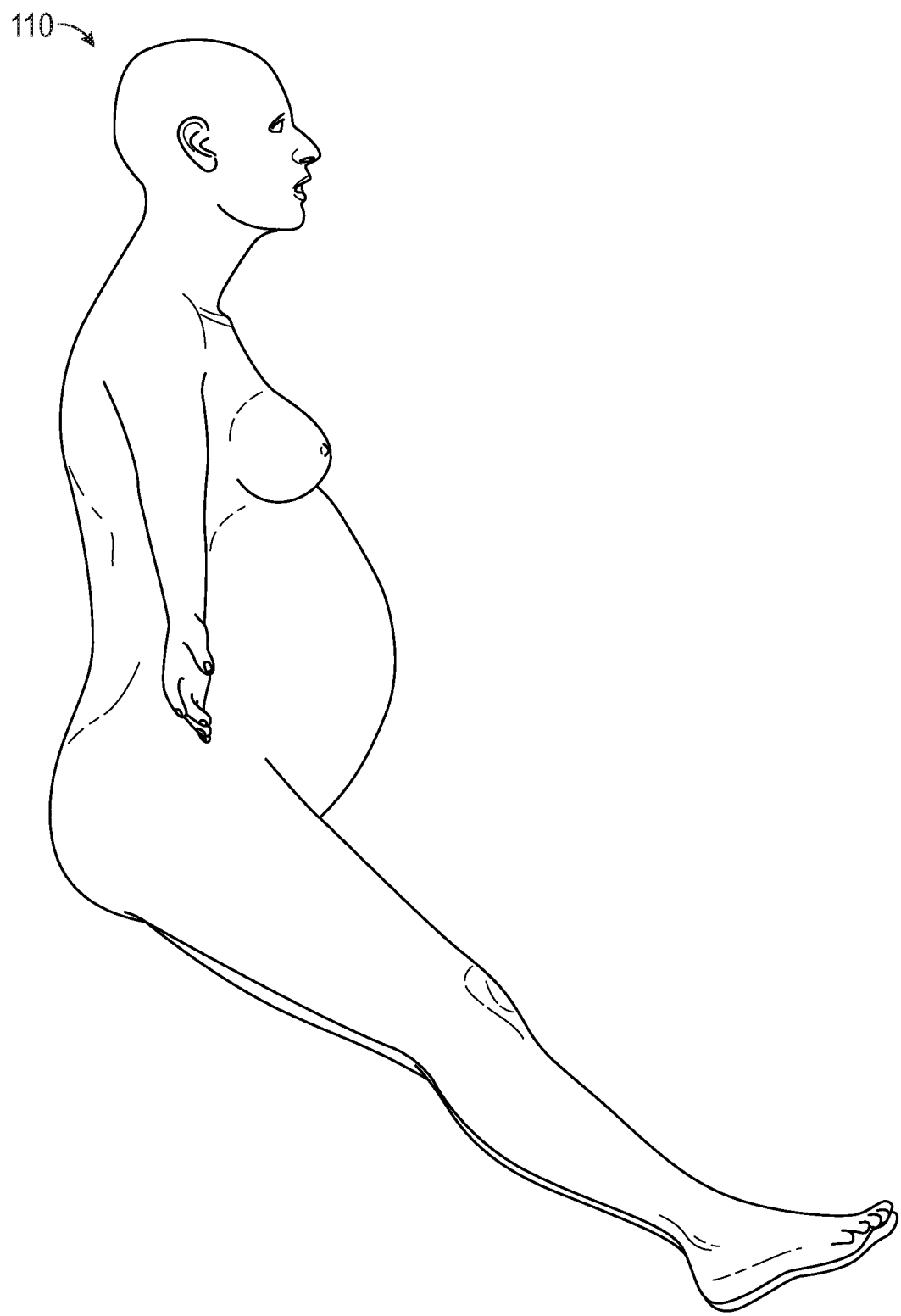
FIG. 2 is a side view of the maternal patient simulator of FIG. 1.
Figure 3:
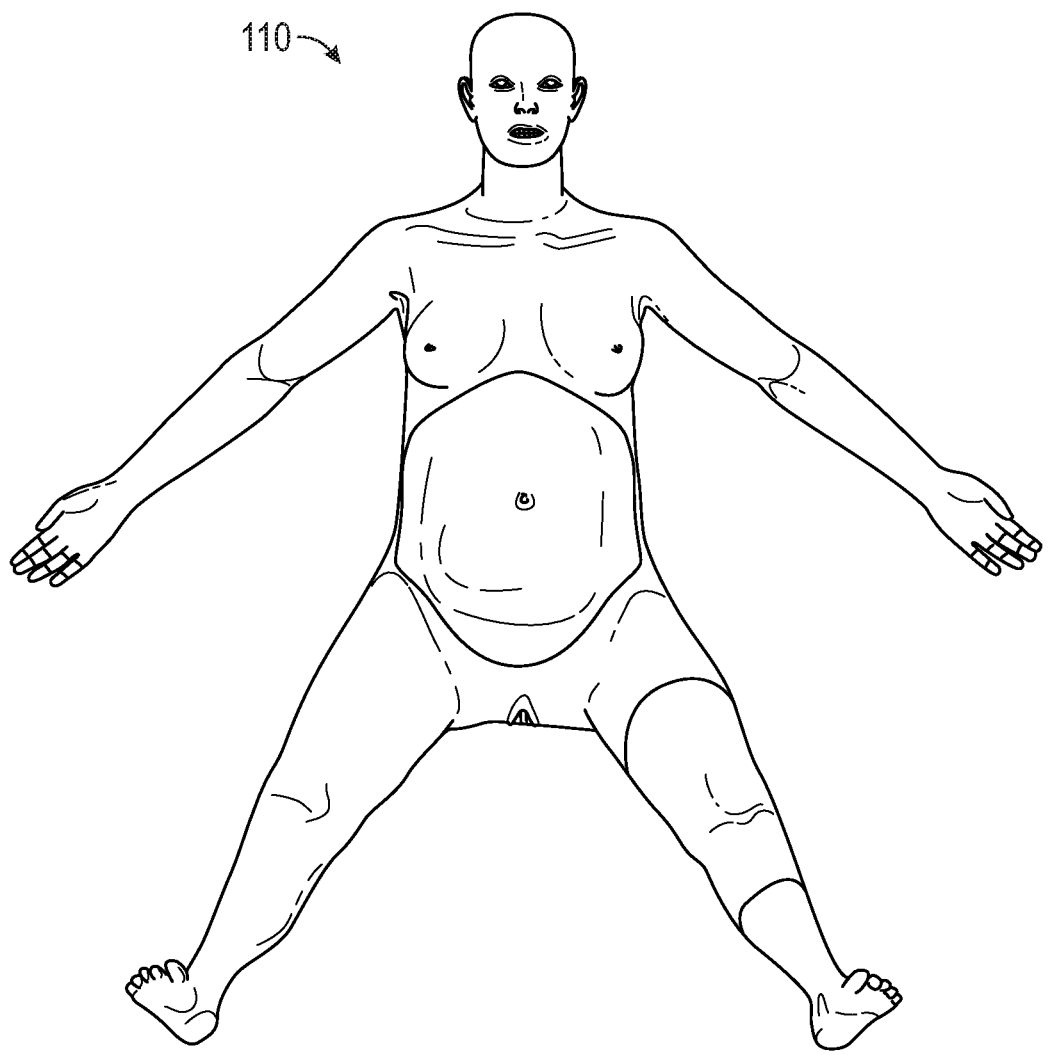
FIG. 3 is a front view of the maternal patient simulator of FIGS. 1 and 2.

As shown in FIGS. 1-3, the maternal patient simulator 110 comprises a female patient simulator. It is understood that the illustrated embodiment of the maternal patient simulator 110 is sized and shaped to represent a pregnant female carrying a fetus with a gestational age between about 20 weeks and 42 weeks. In that regard, the patient simulator can take a variety of forms, including a manikin sized and shaped to represent patients of any size, age, nationality, and/or health. Further, the maternal patient simulator 110 may include only a portion of the simulated patient (e.g., specific body parts or combinations of body parts). For example, in some implementations, the maternal patient simulator includes a torso without a head, arms, and/or legs. Generally, the combination of anatomical parts may be selected based on the particular type(s) of training that the patient simulator is intended to be used for. In that regard, while it is generally desirable to have a full patient simulator to enhance realism, due to portability, costs, and/or other factors in some implementations task trainers having only the most necessary anatomical parts are utilized.

Further, in some instances, the maternal patient simulator 110 includes a simulated circulatory system, a simulated respiratory system, and/or other simulated aspects. In that regard, the maternal patient simulator 110 is in communication with a control system configured to control the circulatory system, respiratory system, and/or other aspects of the patient simulator. For example, in some instances, the control system is configured to adjust parameters associated with the circulatory system, respiratory system, and/or other aspects of the maternal patient simulator 110 in accordance with a simulation scenario and/or a user's application of treatment to the maternal patient simulator 110 based on the simulation scenario. Further, in some instances the circulatory system, respiratory system, and/or other aspects of the maternal patient simulator are affected by the circulatory system, respiratory system, and/or other aspects of the fetal patient simulator.

To that end, in some embodiments the processing system provides physiological algorithms that are modeled on concurrent differential equations to provide autonomous or semi-autonomous control of the maternal and/or fetal patient simulators' vital signs. In that regard, in many instances the physiological modeling is executed without the need for substantial input or direction from the facilitator or user in control of the simulator system 100. Rather, in many instances, the facilitator or user in control of the simulator need only actuate a particular scenario through a user-interface (e.g., clicking on a simulated button for the particular physiological scenario on a display associated with a computing device) and the physiological models will automatically control the vital signs of the simulators based on the selected scenario and/or the user's interaction with the simulators (e.g., treatments applied to the simulator(s)). In this regard, aspects of the present disclosure are configured for use with the simulators and the related features disclosed in U.S. patent application Ser. No. 13/031,087, which is hereby incorporated by reference in its entirety.

In some instances, a computer system provides a scenario-based learning platform on which core surgical competencies can be taught, perfected, and tested. In some instances, the computer system utilizes an interactive software package containing the scenarios. In some instances, the patient simulator system 100 includes a workbook of advanced scenarios that are pre-programmed in the interactive software package, thereby providing a platform on which team-building scenarios can be performed for the development of OB/GYN skills and general patient safety. Scenarios can be as simple or complex as desired and can cover an entire procedure, starting from patient presentation, to assessment, to delivery, and ending in the recovery room. Scenarios may be either pre-programmed or self-constructed (i.e., self-designed). Through the use of either pre-programmed or self-constructed scenarios, the patient simulator system (including the maternal patient simulator and/or fetal patient simulator) responds appropriately to interventions and procedures. In some instances, the scenario can cover an entire procedure. In other instances, the scenarios can cover a portion of a single procedure or multiple portions of various procedures. In other instances, the scenarios can cover a series of complete procedures.

To that end, the patient simulator systems of the present disclosure may include hardware, software, and/or communication features similar to those described in one or more of U.S. Provisional Patent Application No. 61/757,143, U.S. patent application Ser. No. 13/752,242, U.S. patent application Ser. No. 13/223,020, U.S. patent application Ser. No. 13/031,116, U.S. patent application Ser. No. 13/031,087, U.S. patent application Ser. No. 13/031,102, U.S. patent application Ser. No. 12/856,903, U.S. patent application Ser. No. 12/708,682, U.S. patent application Ser. No. 12/708,659, U.S. patent application Ser. No. 11/952,606, U.S. patent application Ser. No. 11/952,669, U.S. Pat. No. 8,016,598, U.S. Pat. No. 7,976,313, U.S. Pat. No. 7,976,312, U.S. Pat. No. 7,866,983, U.S. Pat. No. 7,114,954, U.S. Pat. No. 7,192,284, U.S. Pat. No. 7,811,090, U.S. Pat. No. 6,758,676, U.S. Pat. No. 6,503,087, U.S. Pat. No. 6,527,558, U.S. Pat. No. 6,443,735, U.S. Pat. No. 6,193,519, and U.S. Pat. No. 5,853,292, and U.S. Pat. No. 5,472,345, each herein incorporated by reference in its entirety.

Further, in some instances, the patient simulator system 100 includes one or more features as provided in medical simulators and associated systems provided by Gaumard Scientific Company, Inc. based out of Miami, Fla., including but not limited to the following models: S1000 Hal®, S1020 Hal®, S1030 Hal®, S3000 Hal®, S3000 Susie®, S221 Clinical Chloe, S222 Clinical Chloe, S222.100 Super Chloe, S303 Code Blue®, S304 Code Blue®, S100 Susie®, S100 Simon®, S300 Susie®, S300 Simon®, S201 Susie®, S201 Simon®, S203 Susie®, S204 Simon®, S205 Simple Simon®, S206 Simple Susie®, S3004 Pediatric Hal®, S3005 Pediatric Hal®, S3009 Premie Hal®, S3010 Newborn Hal®, S110 Mike®, S110 Michelle®, S150 Mike®, S150 Michelle®, S107 Multipurpose Patient Care and CPR Infant Simulator, S117 Multipurpose Patient Care and CPR Pediatric Simulator, S157 Multipurpose Patient Care and CPR Pediatric Simulator, S575 Noelle®, S565 Noelle®, S560 Noelle®, S555 Noelle®, S550 Noelle®, S550.100 Noelle, and/or other patient simulators.

Figure 4:
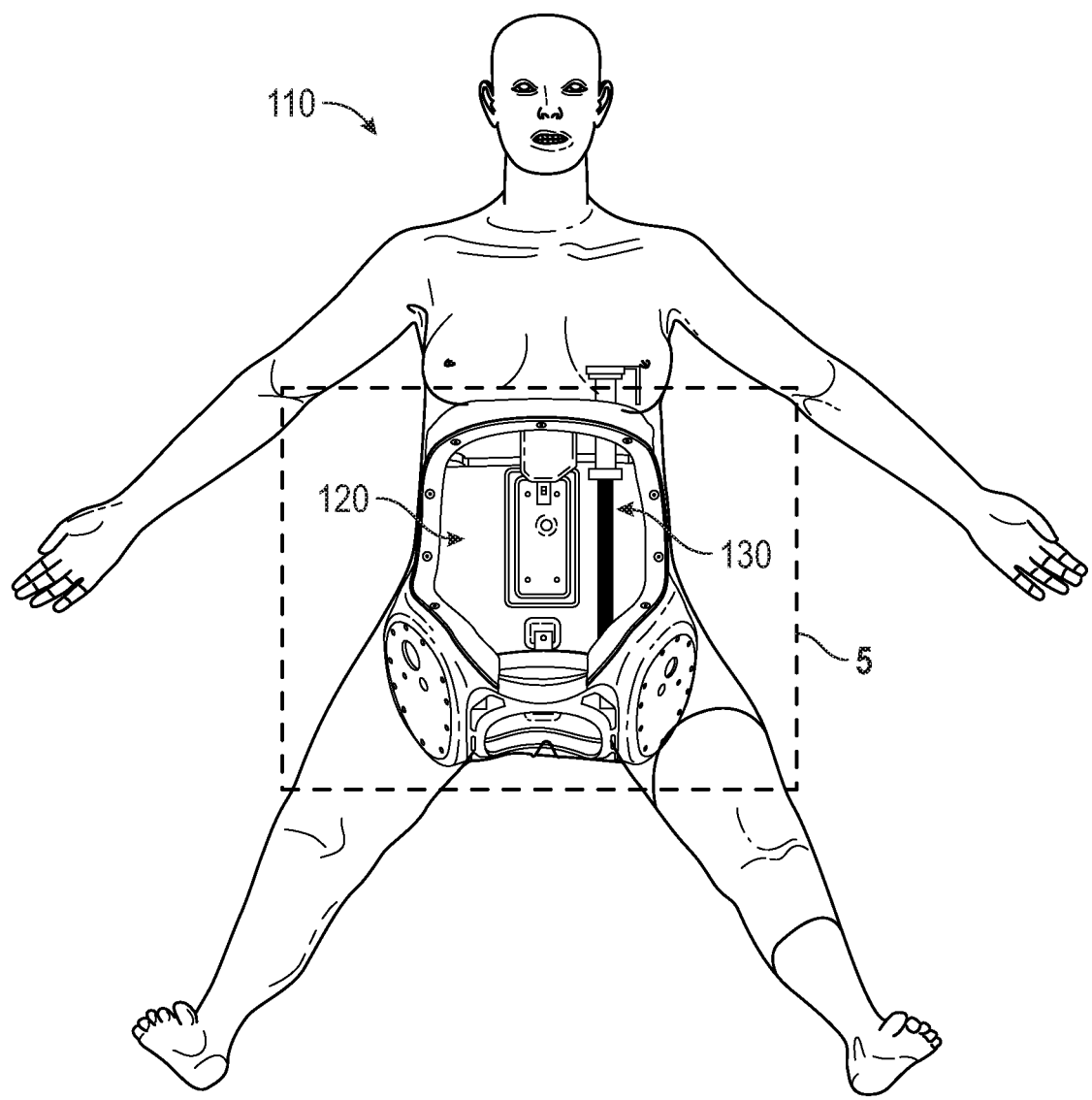
FIG. 4 is a front view of the maternal patient simulator of FIGS. 1-3, but with an outer section of simulator removed to reveal an internal chamber.
Figure 5:
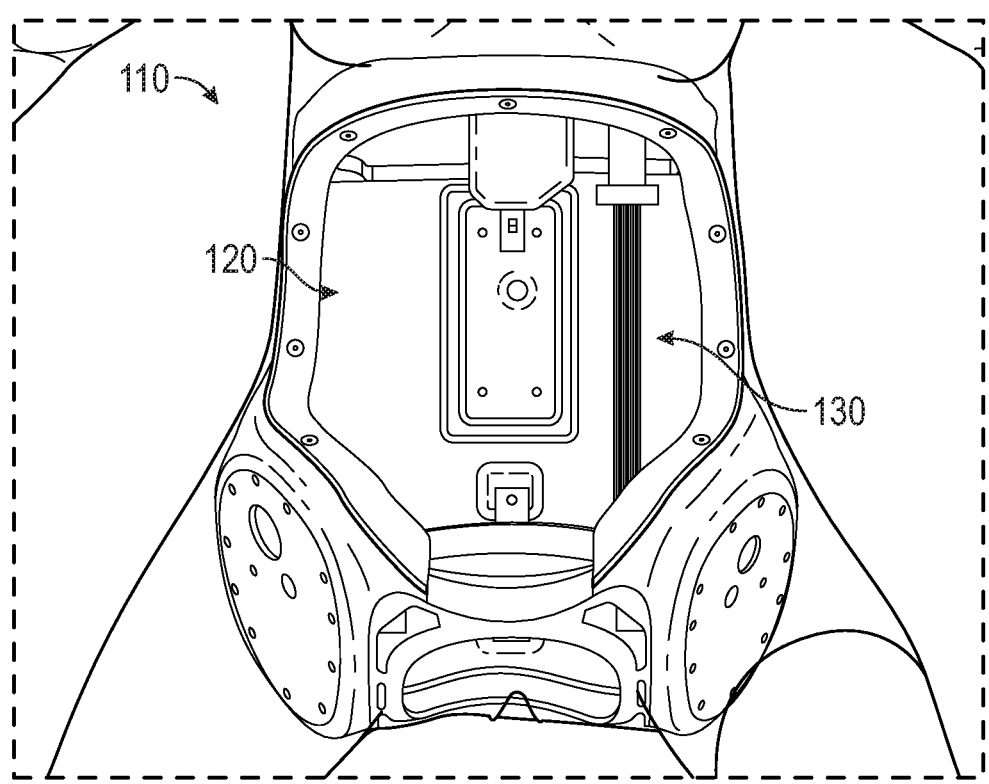
FIG. 5 is a close up front view of the maternal patient simulator of FIGS. 1-4 with the outer section of simulator removed to reveal the internal chamber.
Figure 6:
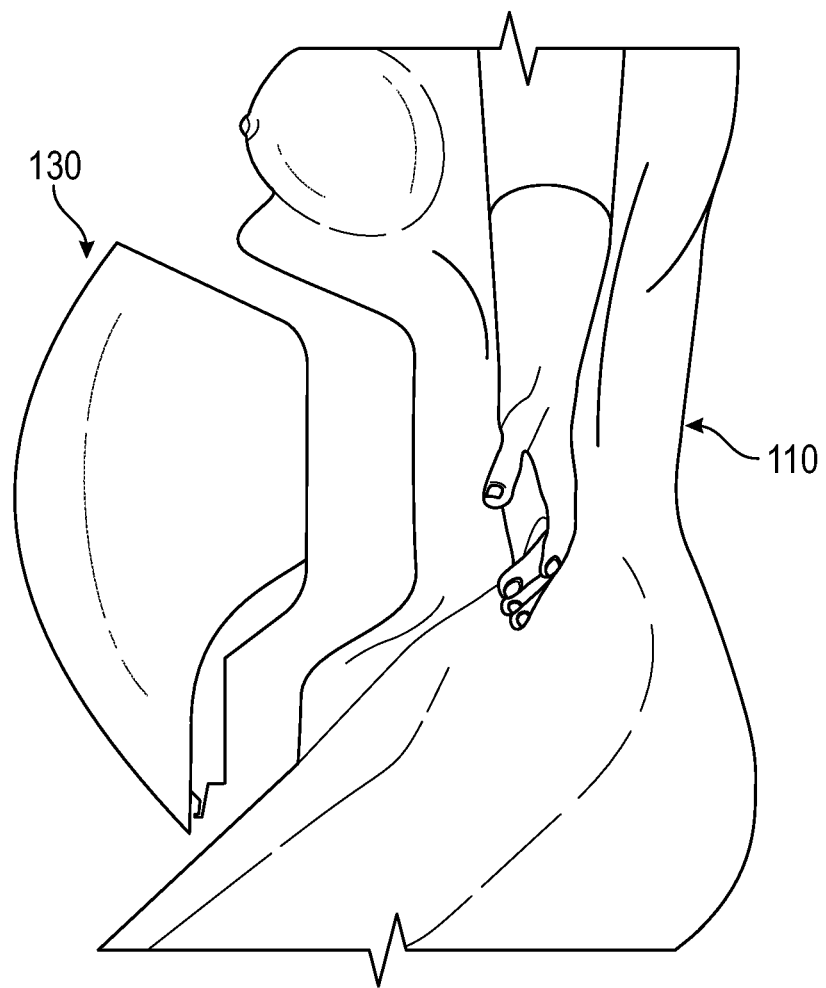
FIG. 6 is a side view of a portion of the maternal patient simulator of FIGS. 1-5, but showing a tummy cover of the simulator removed.

FIGS. 4 and 5 provide front views of the maternal patient simulator 110 with an outer section, such as a tummy cover, removed to reveal an internal chamber 120. In that regard, the maternal patient simulator 110 can include one or more exchangeable tummy covers. For example, FIG. 6 shows a removable tummy cover 130 spaced from the torso of the maternal patient simulator 110. The tummy cover 130 can include various features to simulate one or more medical scenarios. For example, in some implementations the tummy cover 130 is configured for contraction training, c-section training, Leopold maneuver training, post-partum hemorrhage training, gynecological training, and/or other training techniques.

Figure 7:
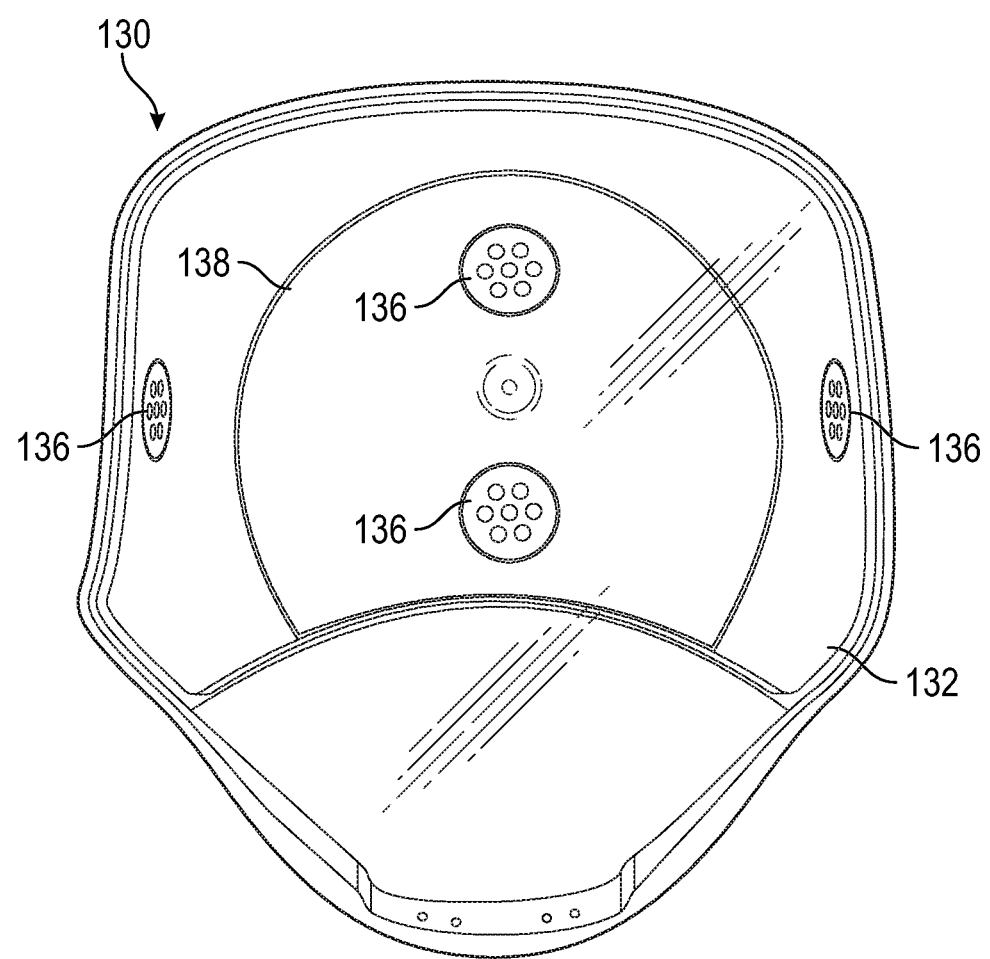
FIG. 7 is a front view of a tummy cover according to an embodiment of the present disclosure.
Figure 8:
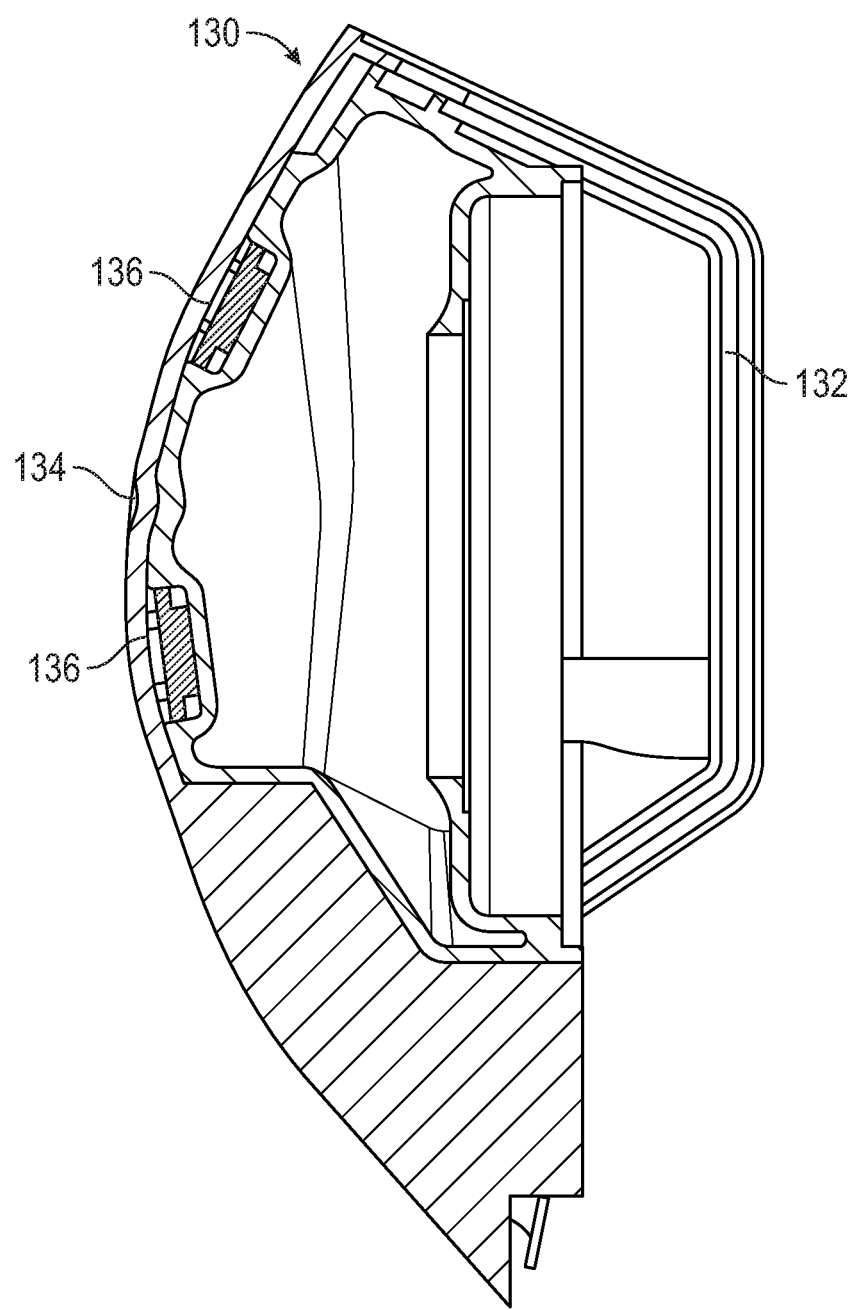
FIG. 8 is a cross-sectional side view of the tummy cover of FIG. 7.

As shown in FIGS. 7 and 8, a tummy cover 130 configured for contraction training and fetal heart rate monitoring is provided in some instances. In that regard, the tummy cover 130 is configured to work with standard contraction monitors and fetal heart rate monitors in some instances. For example, the tummy cover 130 includes an inner support structure 132, an outer skin layer 134, and speakers 136. One or more of the speakers 136 is configured to produce a fetal heart rate for detection by a fetal heart rate monitor, including ultrasound based monitors. In other instances, one or more of the speakers 136 is replaced with a fluid pump system that is likewise configured to produce a fetal heart rate for detection. Further, the tummy cover 130 includes one or more flexible bags or reservoirs 138 positioned between the skin layer 134 and the inner support structure 132. In that regard, selective inflation and deflation of the bag/reservoir 138 with air or a fluid can be utilized to simulate contractions. For example, in some instances the air or fluid is removed from the bag/reservoir 138 such that the underlying support structure 132 formed of a more rigid material simulates a contraction. By controlling the amount of air/fluid in the bag/reservoir 138 the corresponding strength of the contraction can be varied to simulate different scenarios. The control system of the simulator 100 can synchronize the contractions and fetal heart provided by the tummy cover to correspond to various simulation scenarios. The lower section of the tummy cover 130 can include a soft silicone insert with a sensor embedded that allows palpation procedures.

Figure 9:
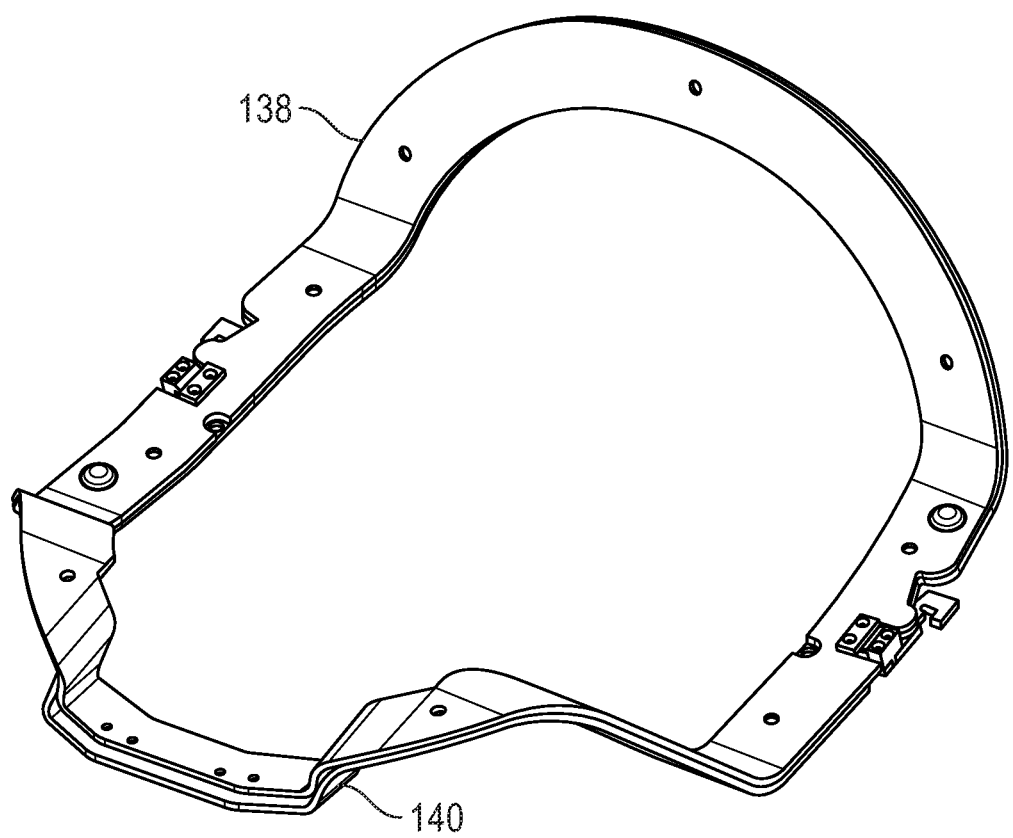
FIG. 9 is a perspective view of engagement frames for a tummy cover and a torso of the maternal simulator according to an embodiment of the present disclosure.
Figure 10:
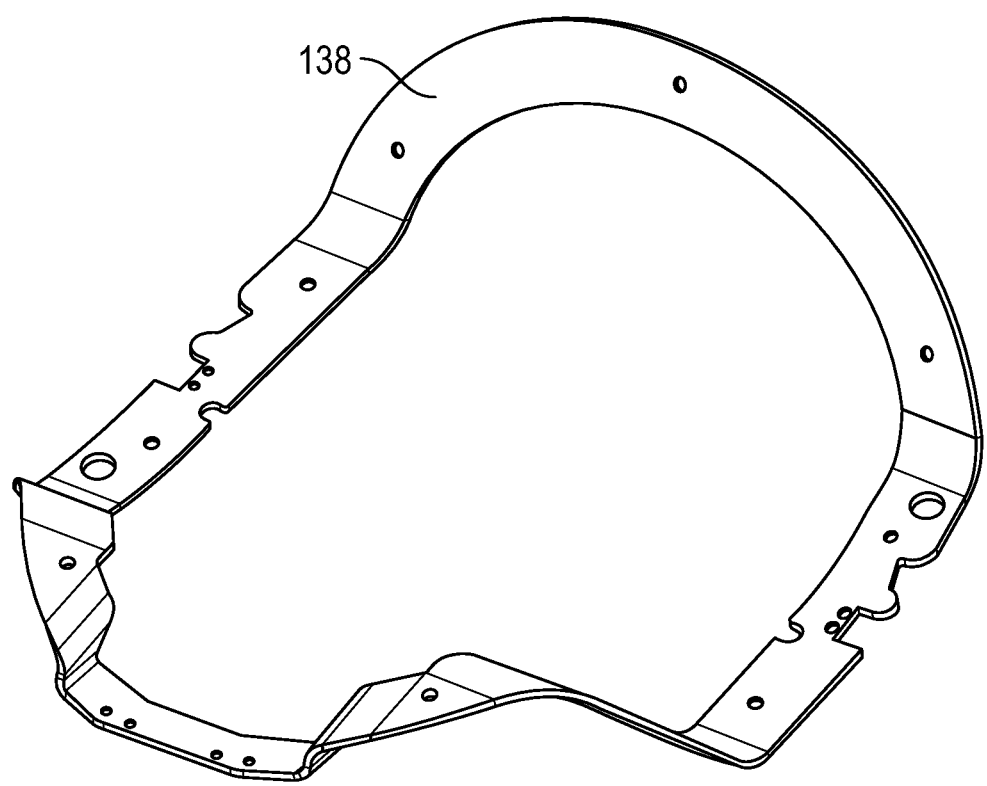
FIG. 10 is a perspective view of an engagement frame for a tummy cover according to an embodiment of the present disclosure.
Figure 11:
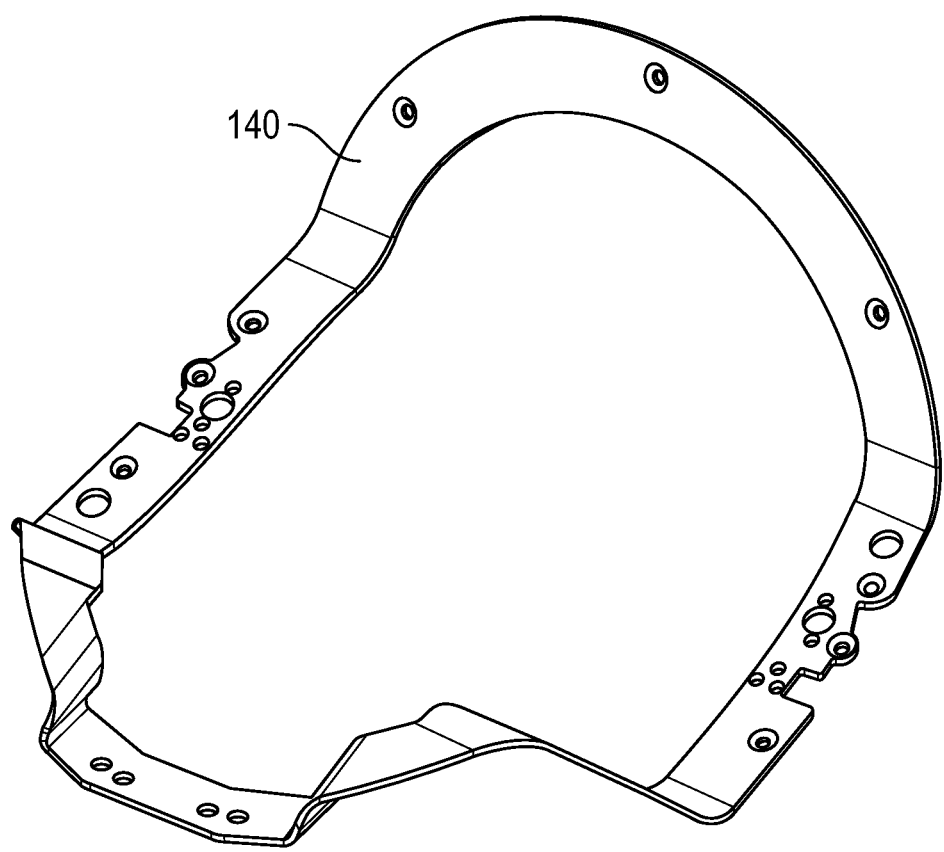
FIG. 11 is a perspective view of an engagement frame for a torso of a maternal simulator according to an embodiment of the present disclosure.
Figure 12:
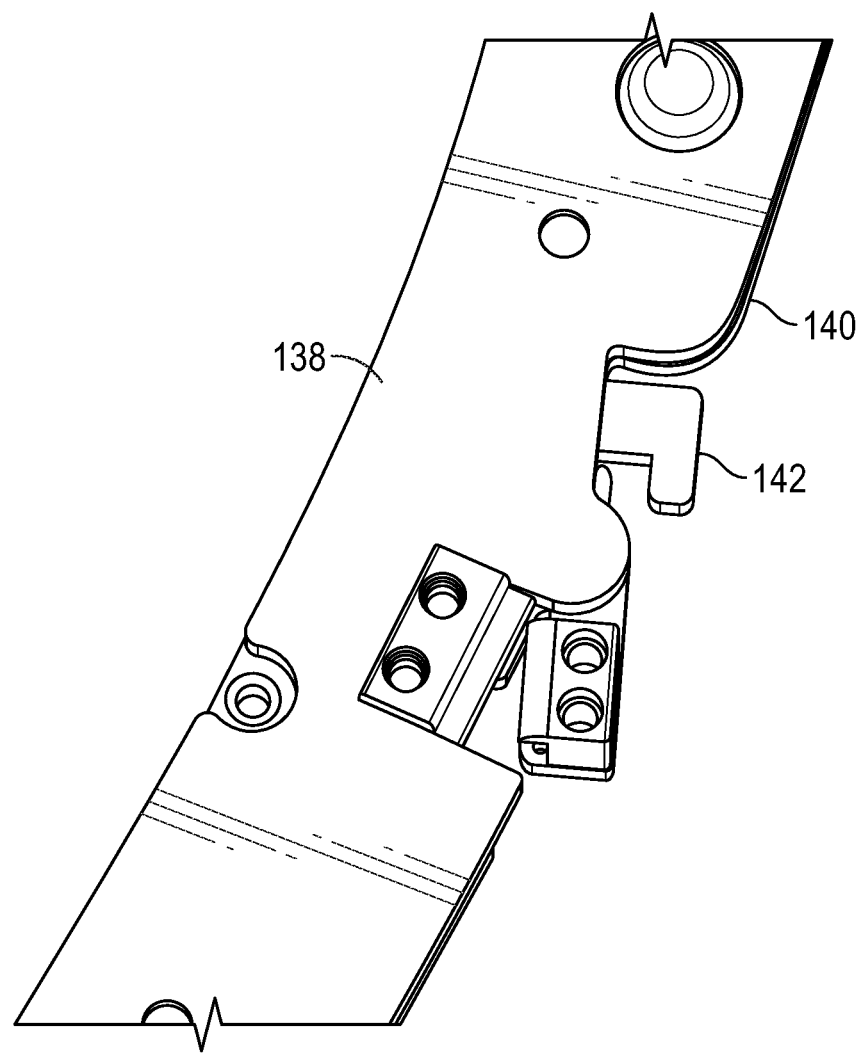
FIG. 12 is a close up view of the engagement frames of FIGS. 9-11 shown with a locking feature in an unlocked position according to an embodiment of the present disclosure.
Figure 13:
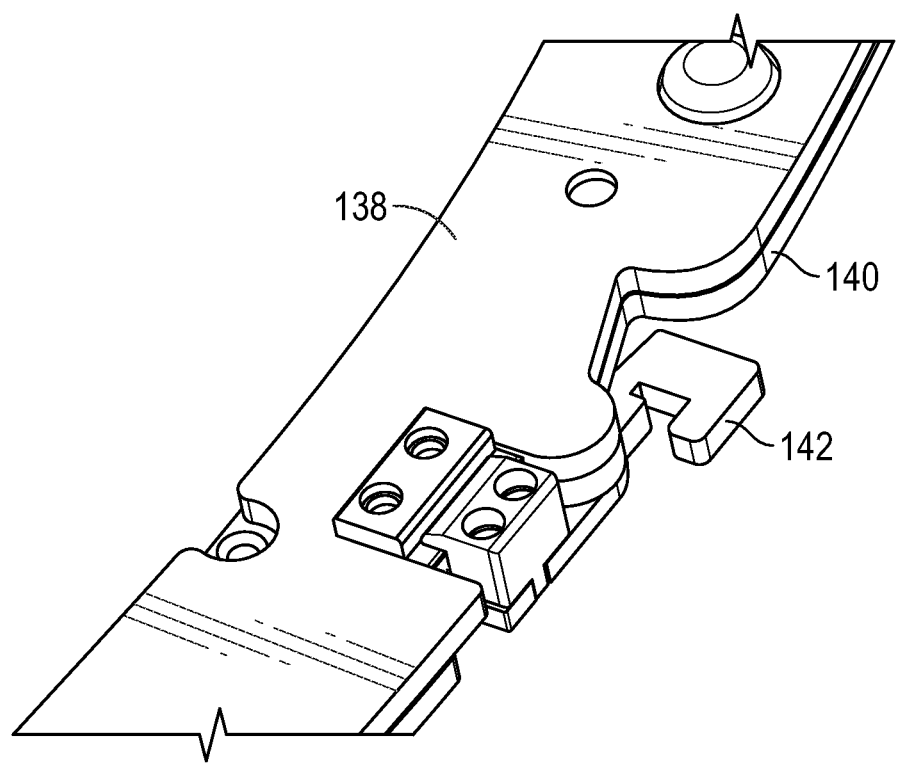
FIG. 13 is a close up view of the engagement frames of FIGS. 9-11 shown with a locking feature in a locked position according to an embodiment of the present disclosure.

Referring now to FIGS. 9-13, in order to facilitate secure coupling of the tummy cover 130 to the torso of the maternal patient simulator 110 in an aligned manner, the tummy cover 130 and the torso can include mating frame assemblies 138 and 140. In that regard, FIG. 9 shows the engagement frames 138 and 140 coupled together. FIG. 10 shows the frame 138 for the tummy cover 130, while FIG. 11 shows the frame 140 for the torso of the maternal patient simulator 110. As shown, the engagement frames 138 and 140 are sized and shaped for mating engagement to ensure proper alignment of the tummy cover 130 with respect to the torso of the maternal patient simulator 110. Further, a locking mechanism 142 can be utilized to fixedly secure the engagement frames 138 and 140 together. In that regard, by locking the frames 138 and 140 together, it is ensured that the tummy cover 130 will remain in place during maneuvering of the maternal patient simulator 110. FIG. 12 shows the locking mechanism in an unlocked position, allowing removal of the tummy cover (e.g., to replace with a different tummy cover), while FIG. 13 shows the locking mechanism in a locked position, securing the tummy cover 130 to the torso of the maternal patient simulator 110. The rigid frames 138 and 140 help to ensure that the skin boundaries of the tummy cover 130 and the lower torso are concealed. Further, the frames 138 and 140 also provide a secure and repetitive way to attach the interchangeable tummy covers. In some instances, the locking mechanism 142 is a hybrid electro-pneumatic connector that provides a quick way to swap between different tummy covers.

As noted above, various tummy covers can be used with the maternal patient simulator. For example, a c-section tummy cover can include a vinyl endoskeleton with a cutout for an interchangeable insert. The cutout contains a recessed boundary that traps the skin in combination with a rigid frame. The insert can include multiple layers to simulate the anatomical tissues. A harder silicone conceals the boundary of the insert with the tummy skin. The insert is held in place securely using snaps. The endoskeleton contains a cavity that can house a full term baby with umbilical cord and placenta immersed in an equivalent of amniotic fluid. The c-section tummy cover allows users to cut through the different layers of the insert and deliver the baby. In another example, a leopold maneuver tummy cover is provided that contains a baby encapsulated in a cryovac bag filled with a saline based gel. The cryovac bag is placed over a plastic platform and covered by a silicone skin. A layer of foam is placed between the silicone skin and the bag to reduce friction and sounds.

In another example, a post-partum hemorrhage tummy cover is provided that contains an integrated birth canal so that fluids can only flow out through the vaginal opening. The birth canal is anatomically correct. The post-partum hemorrhage tummy cover is compatible with the Bakri postpartum balloon and can contain one or more sensors to detect fundal massage. A hybrid electro/pneumatic connector provides a quick way to swap the belly. A reservoir inside the post-partum hemorrhage tummy cover contains the fluid to simulate hemorrhaging. The bleeding rate can respond automatically to actions performed by the user. Finally, a non-pregnant tummy cover can be used in conjunction with the maternal patient simulator 110 to simulate various gynecological complications. In some instances, the tummy cover 130 includes features similar to those described in U.S. patent application Ser. No. 14/164,429, which is hereby incorporated by reference in its entirety.

Figure 14:
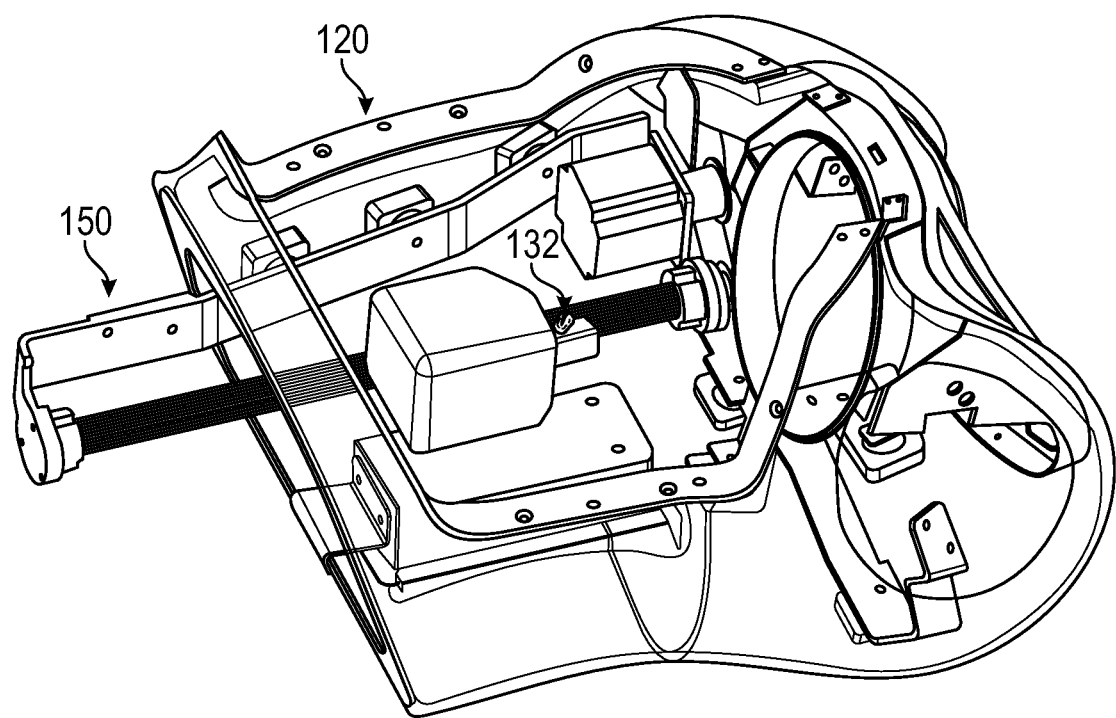
FIG. 14 is a perspective, partially transparent view of a portion of the maternal patient simulator of FIGS. 1-5 showing aspects of a birthing mechanism disposed within the internal chamber of the maternal patient simulator according to an embodiment of the present disclosure.

Referring again to FIGS. 4 and 5, the internal chamber 120 of the maternal patient simulator 110 is sized and shaped to receive a fetal patient simulator. In that regard, as shown in FIGS. 4 and 5, the internal chamber 120 also includes a birthing mechanism 150 configured to interface with the fetal patient simulator. In that regard, the birthing mechanism 150 is configured to impart translational and rotational movement to the fetal patient simulator in order to simulate a birthing sequence. As best seen in FIG. 14, components of the birthing mechanism 150 are mounted to a sidewall of the torso of the maternal patient simulator 110. In some instances, such as the illustrated embodiment, the components of the birthing mechanism 150 are mounted in this fashion to allow room for an epidural insert chamber to be defined in the central portion of the internal chamber 120 adjacent to the back of the maternal patient simulator 110. Further, in some instances the maternal patient simulator 110 includes a rectum suppository receptacle with automatic recognition of application of a suppository.

Figure 15:
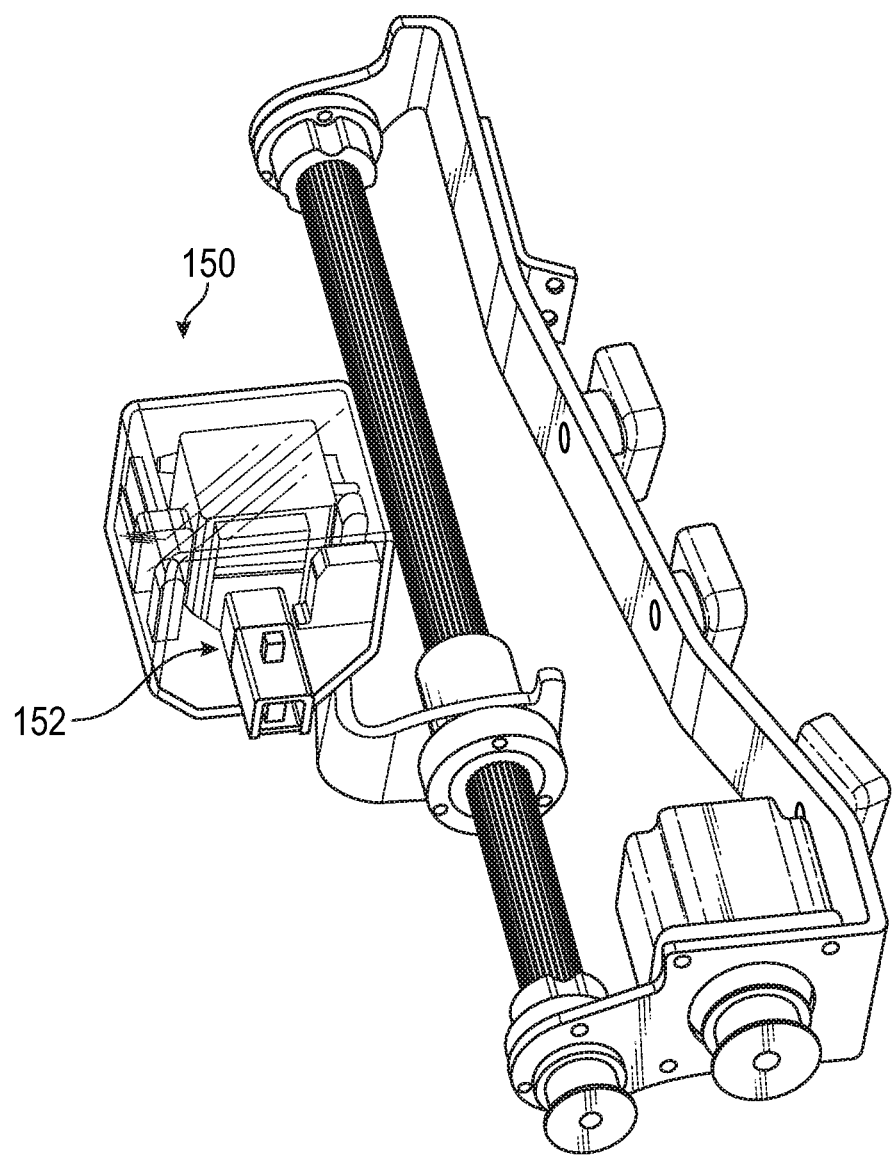
FIG. 15 is a perspective view of the birthing mechanism of FIG. 14.
Figure 16:
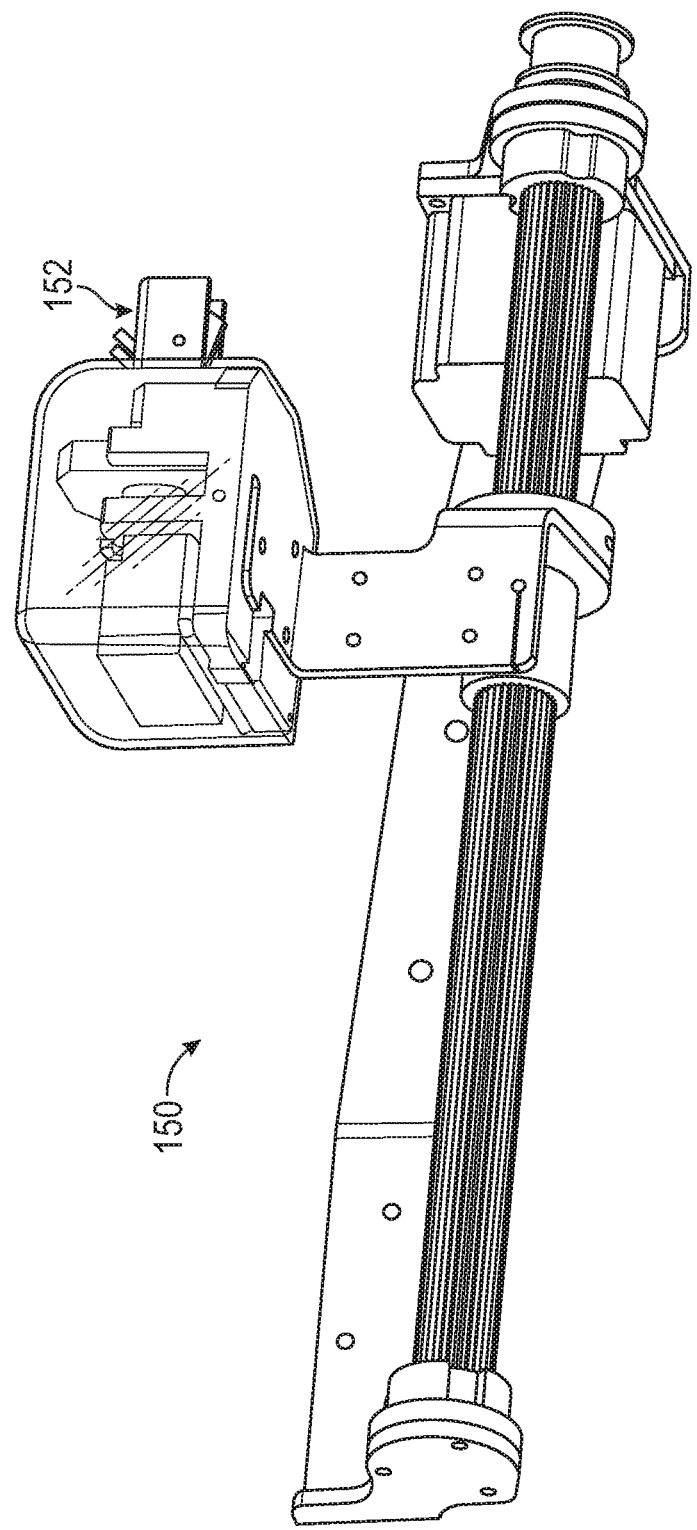
FIG. 16 is another perspective view of the birthing mechanism of FIGS. 14 and 15.
Figure 17:
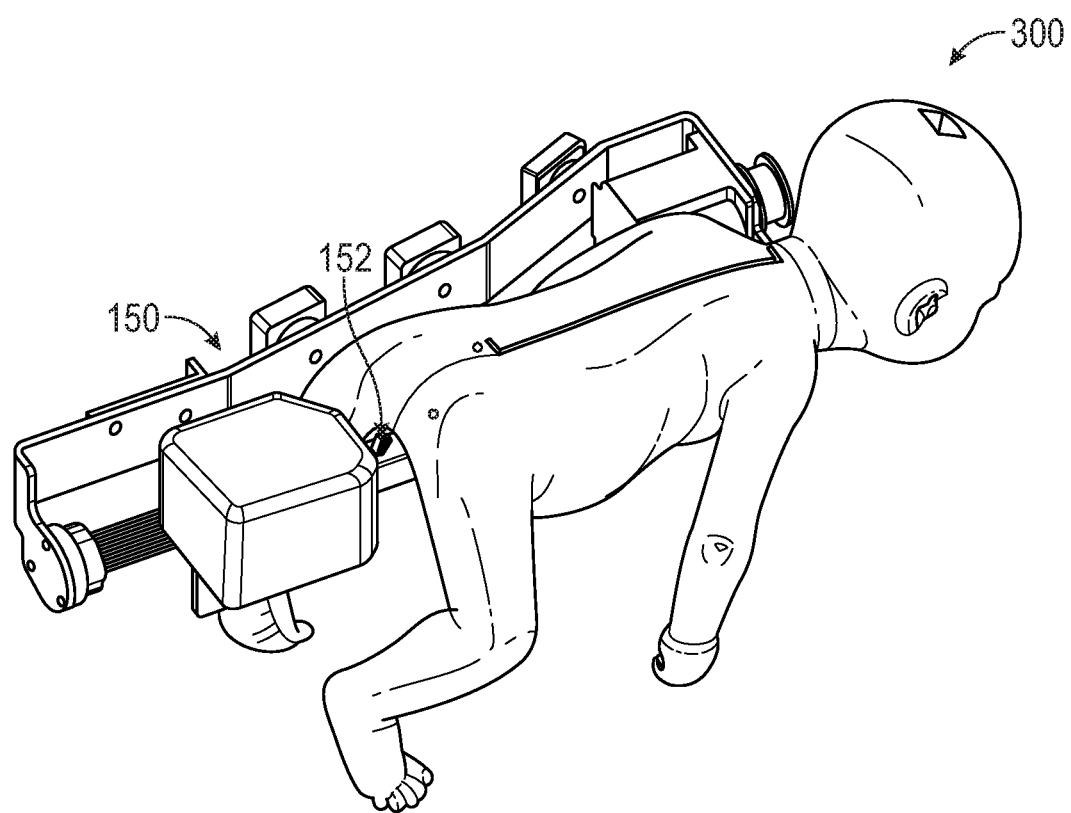
FIG. 17 is a perspective view of a fetal patient simulator engaged with the birthing mechanism of FIGS. 14-16 according to an embodiment of the present disclosure.
Figure 18:
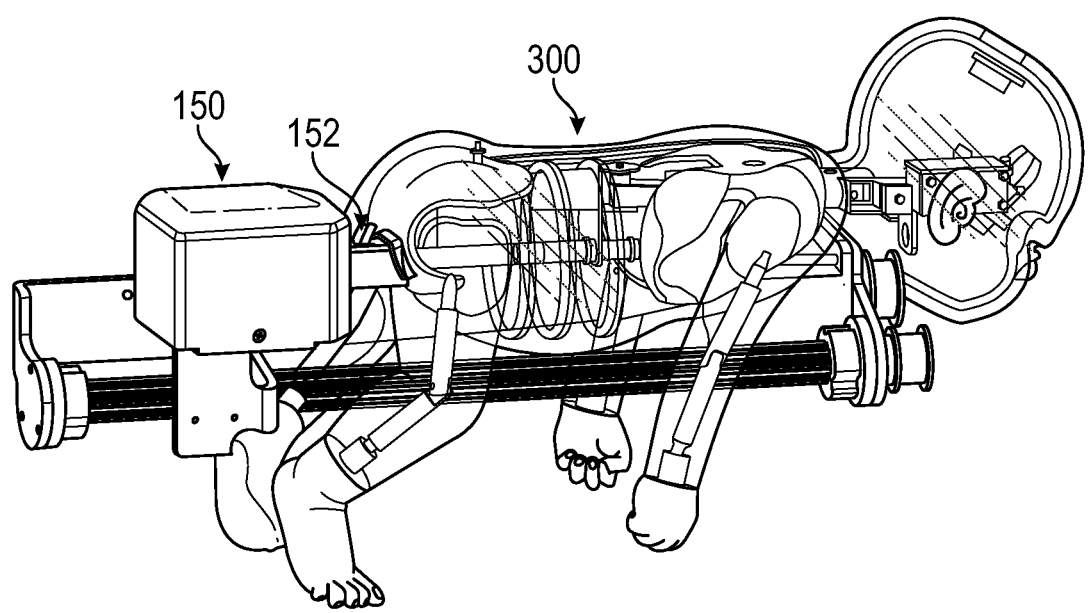
FIG. 18 is a perspective, partially transparent view of the fetal patient simulator of FIG. 9 engaged with the birthing mechanism of FIGS. 14-17.
Figure 19:
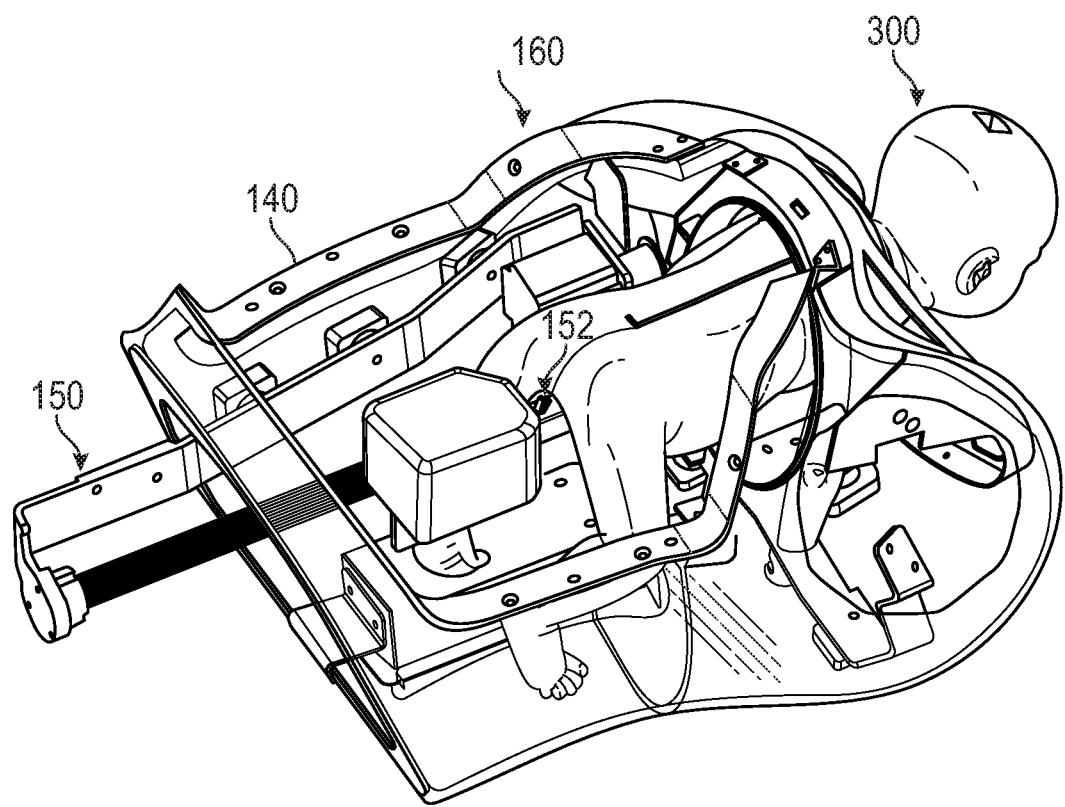
FIG. 19 is a perspective view of the fetal patient simulator engaged with the birthing mechanism and disposed within the internal chamber of the maternal patient simulator according to an embodiment of the present disclosure.

FIGS. 15 and 16 show additional features of the birthing mechanism 150. As shown, the birthing mechanism 150 is an electro-mechanical system configured to impart rotation and translational movement. Further, as shown in FIGS. 17-19, the birthing mechanism is configured to engage with a fetal patient simulator 300. More specifically, in the illustrated embodiments the birthing mechanism 150 includes a locking feature 152 that is configured to fixedly engage a stiffening rod. As will be discussed in greater detail below, the stiffening rod is configured to impart a rigidity to the spinal structure of the fetal patient simulator 300 to allow it to be translated and rotated by the birthing mechanism. In that regard, some of the fetal patient simulators of the present disclosure present highly flexible body structure, simulating a natural newborn, such that the stiffening rod is necessary to facilitate a realistic birthing simulation because without the stiffening rod the conformal nature of the fetal patient simulator can result in damage to the fetal patient simulator and/or an unrealistic birthing presentation/sequence.

In some instances, the locking mechanism 152 is a spring-loaded lever that engages a recess or detent of the stiffening rod to provide a mechanical, locking engagement. To that end, in some implementations the stiffening rod is inserted into and engaged with a locking mechanism of the fetal patient simulator 300, as described in greater detail below, then the fetal patient simulator 300 and the stiffening rod are inserted into the internal chamber 120 and a portion of the stiffening rod extending from the fetal patient simulator 300 is engaged with the locking mechanism 152. With the fetal patient simulator 300 engaged with the locking mechanism 152 in this manner, a birthing simulation can begin and the birthing mechanism can impart translational and rotational motion to the fetal patient simulator to simulate a natural birth scenario. In that regard, the actual parameters of the birthing scenario are defined by the control system in some instances.

Figure 20:
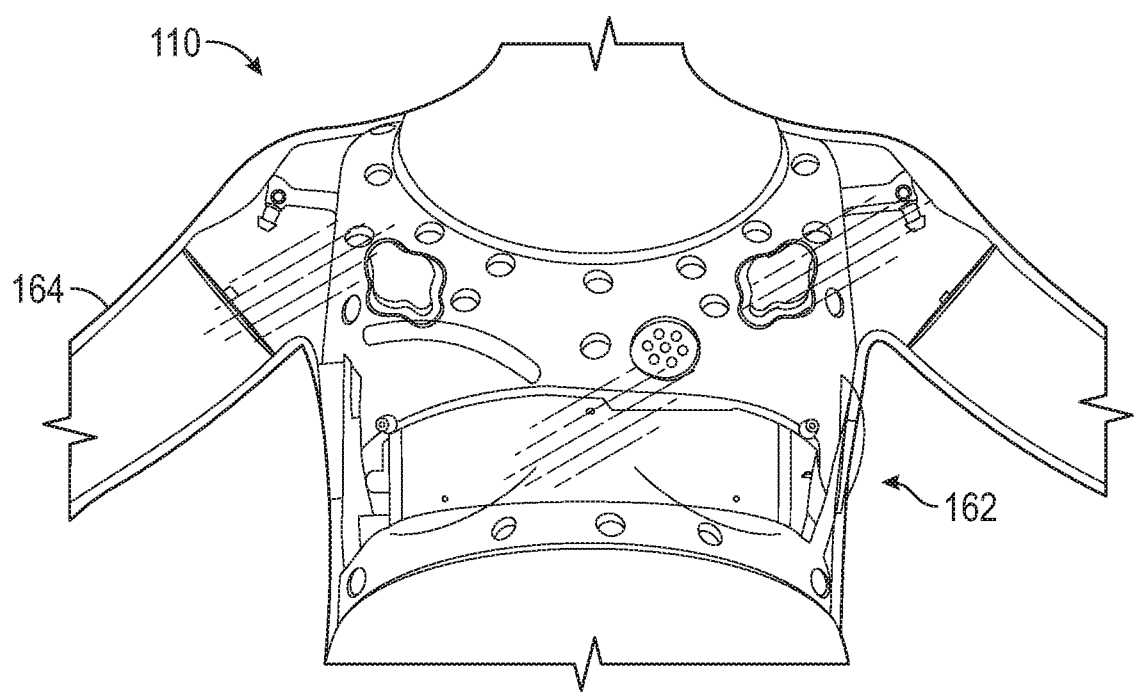
FIG. 20 is a perspective, partially transparent view of an upper torso portion of the maternal patient simulator of FIGS. 1-5 according to an embodiment of the present disclosure.
Figure 21:
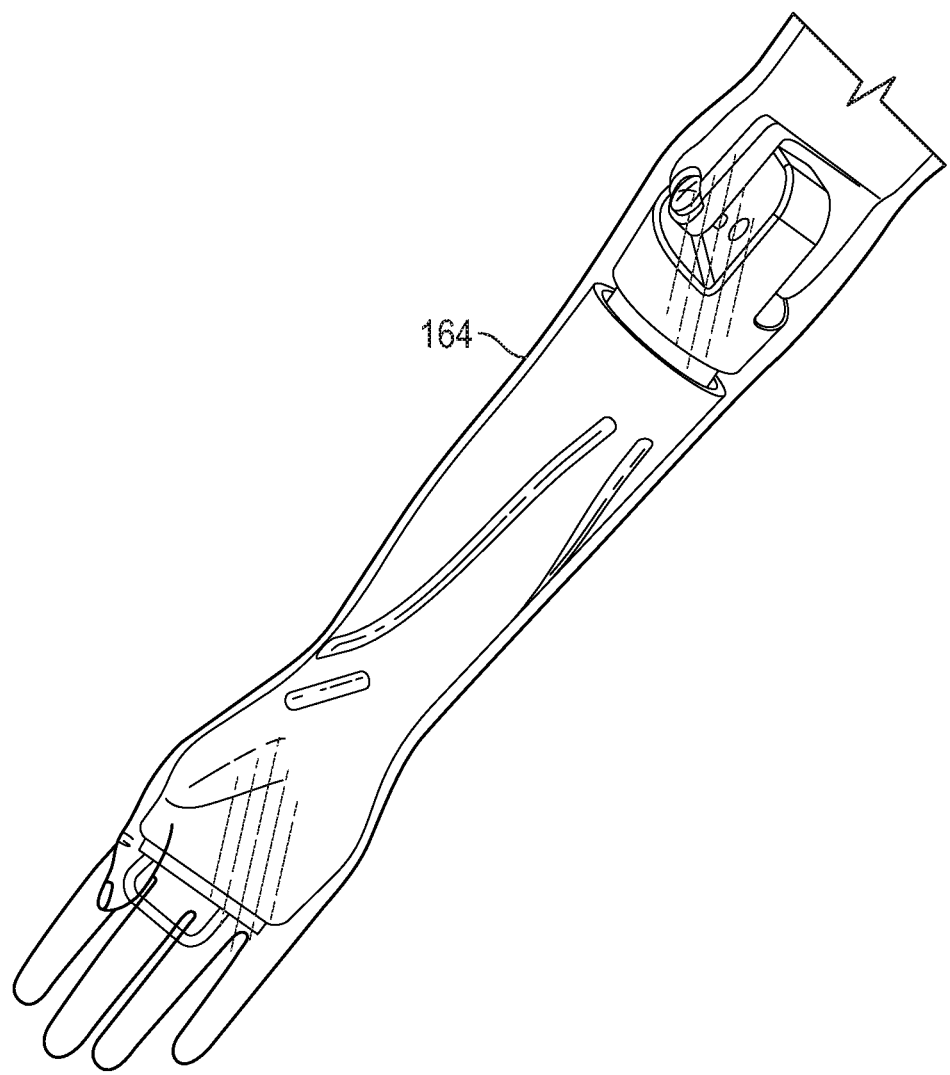
FIG. 21 is a perspective, partially transparent view of an arm portion of the maternal patient simulator of FIGS. 1-5 according to an embodiment of the present disclosure.
Figure 22:
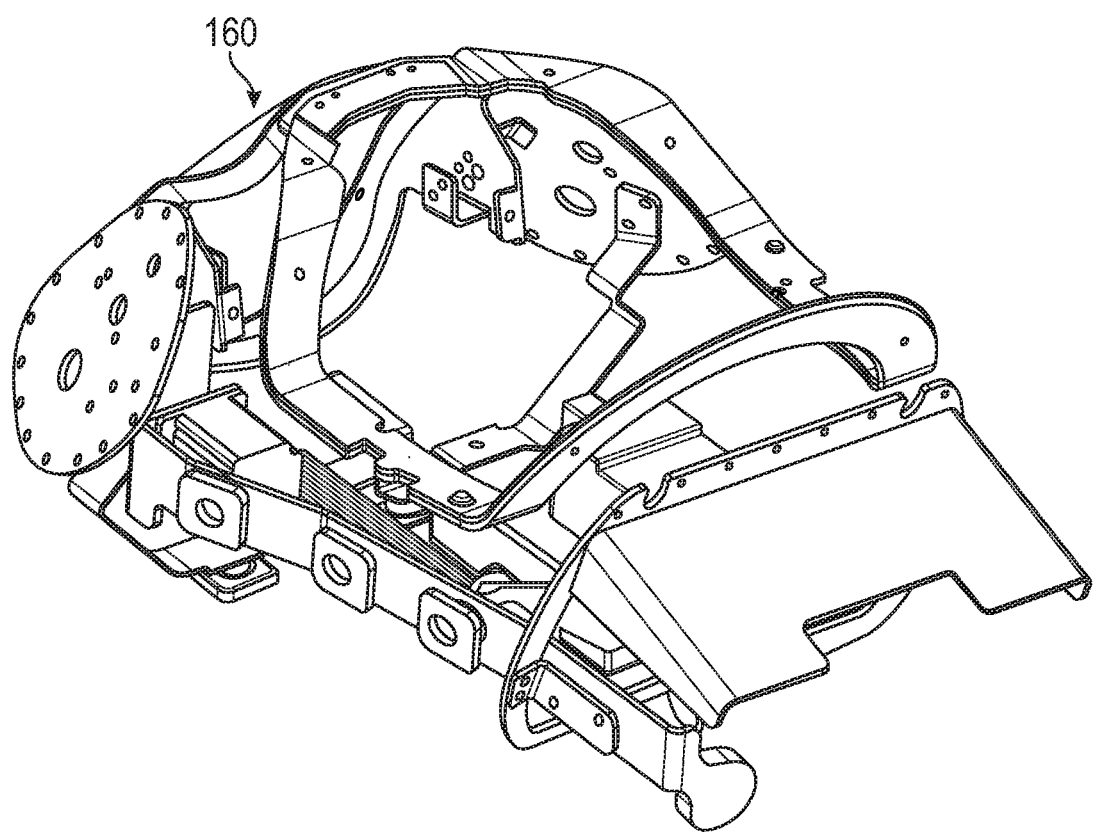
Figure 23:
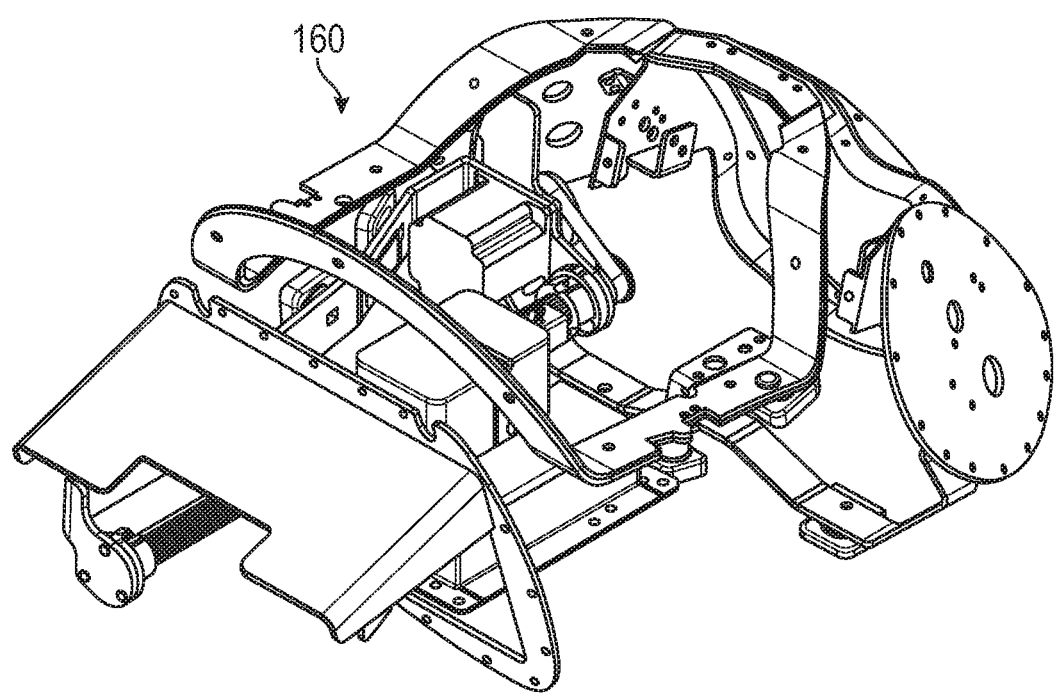
Figure 24:
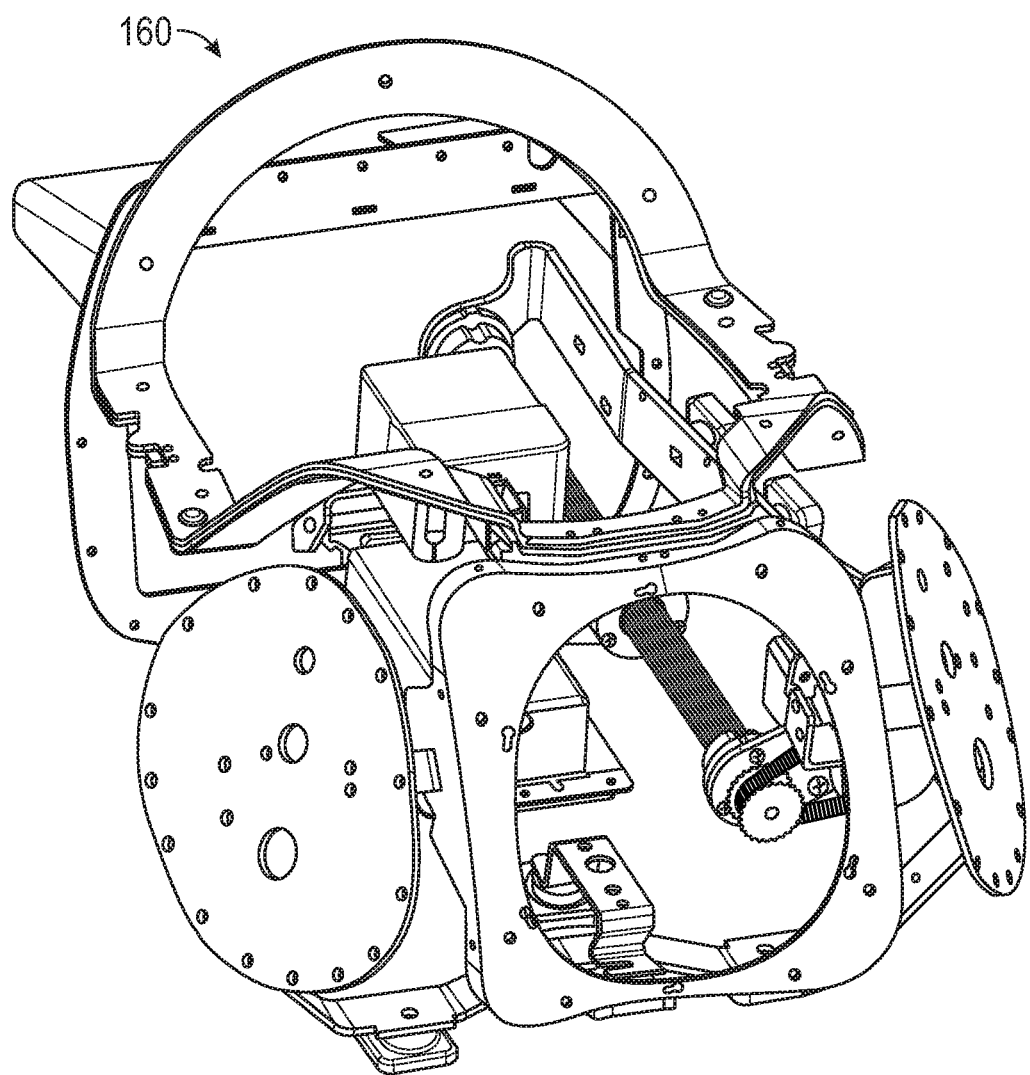
Figure 25:
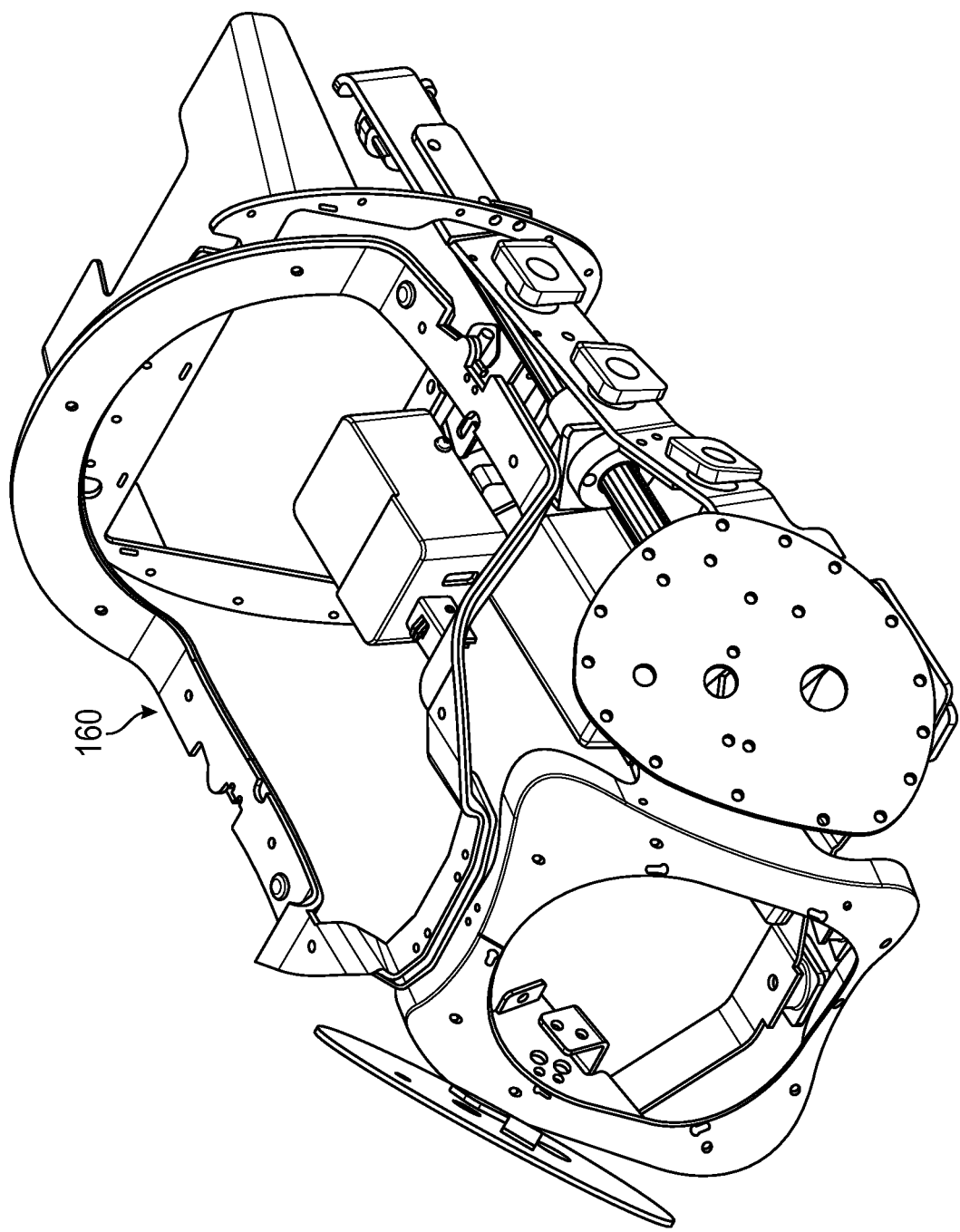
Figure 26:
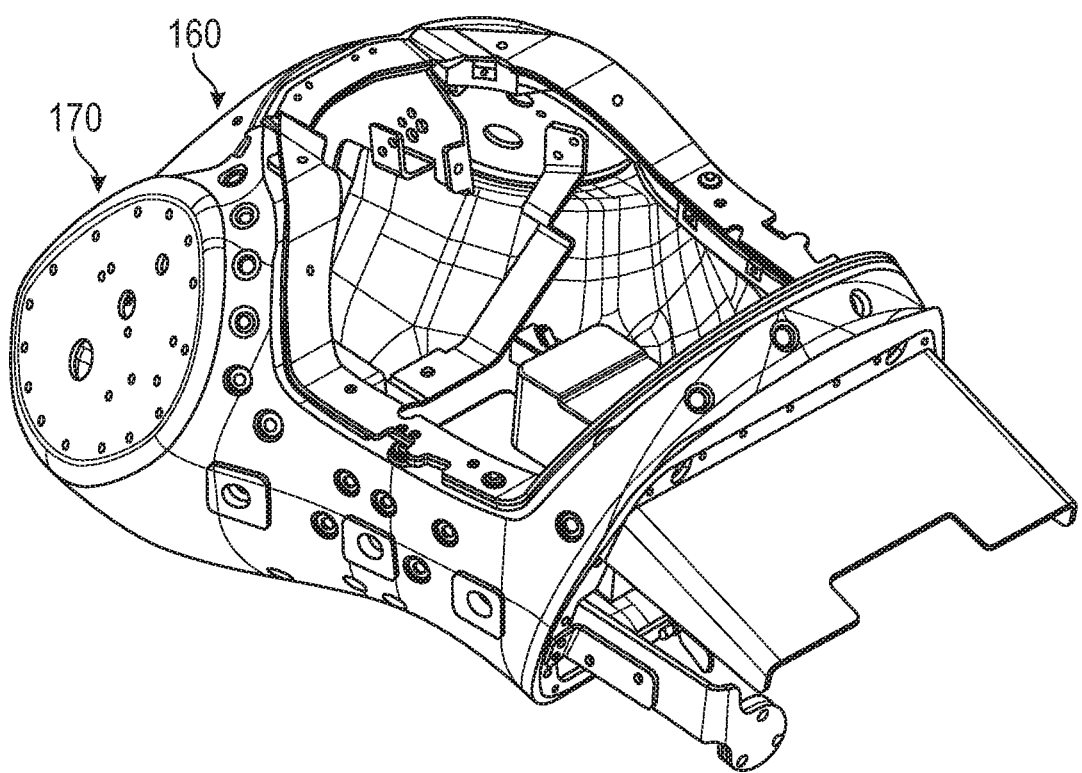
Figure 27:
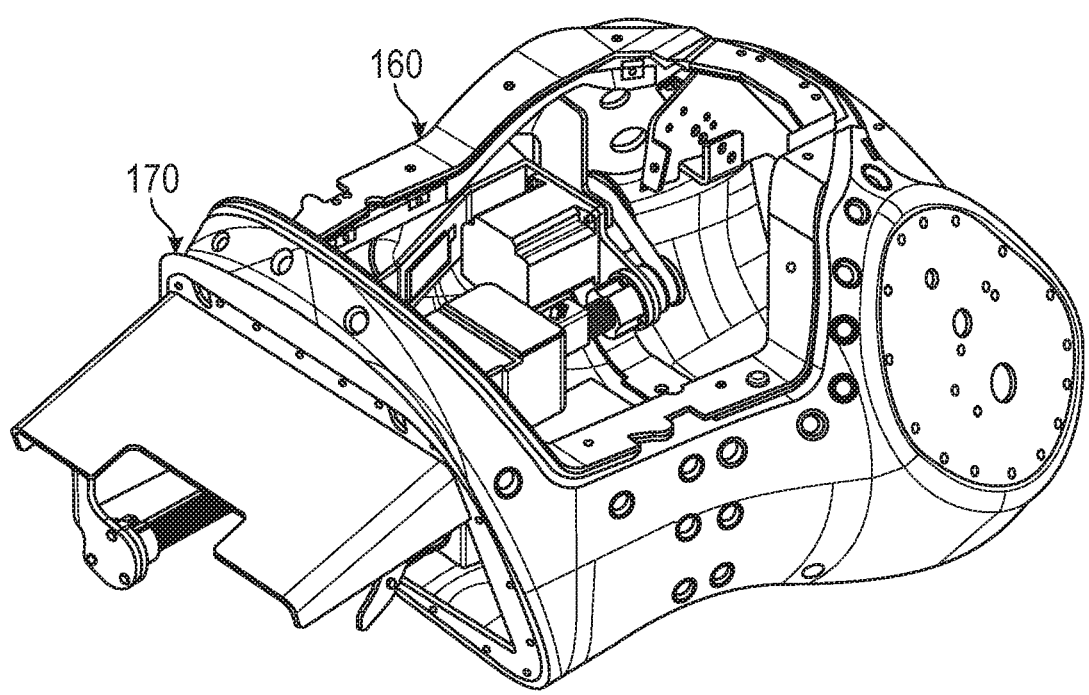
Figure 28:
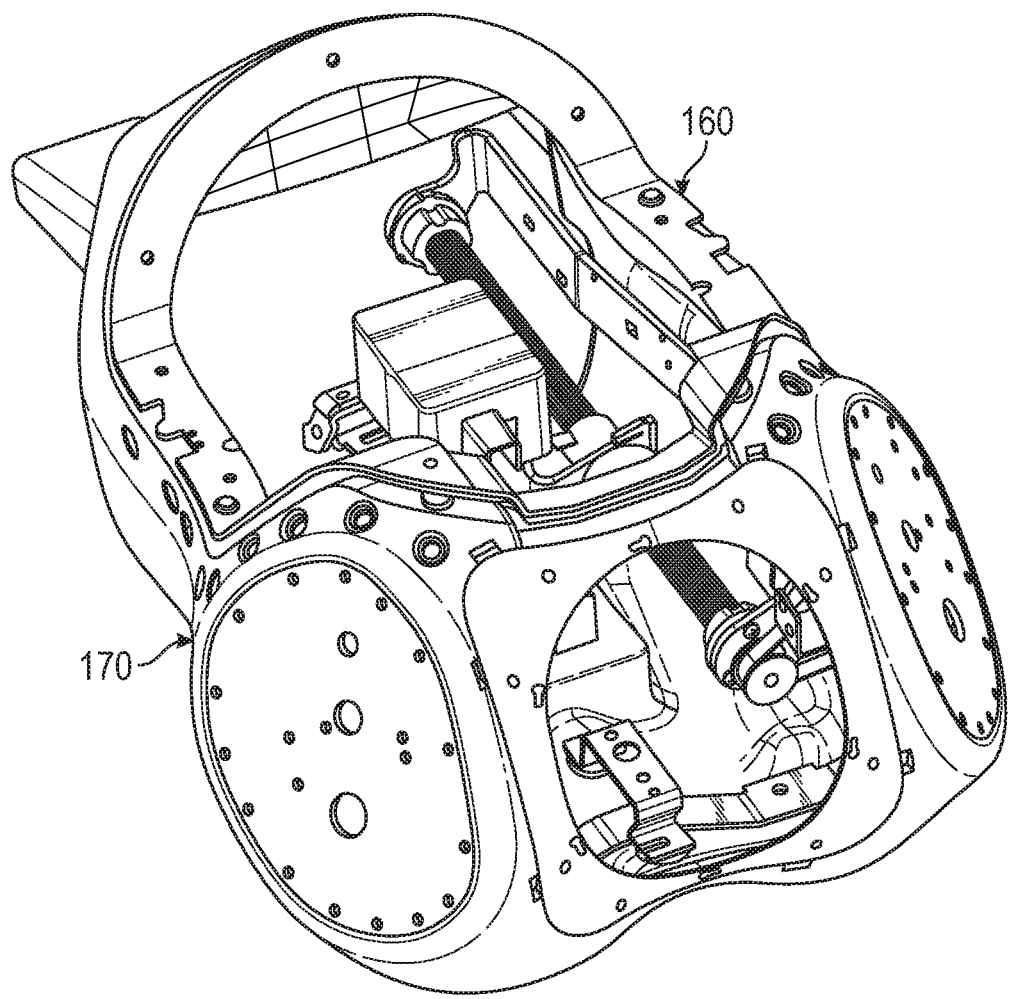
Figure 29:
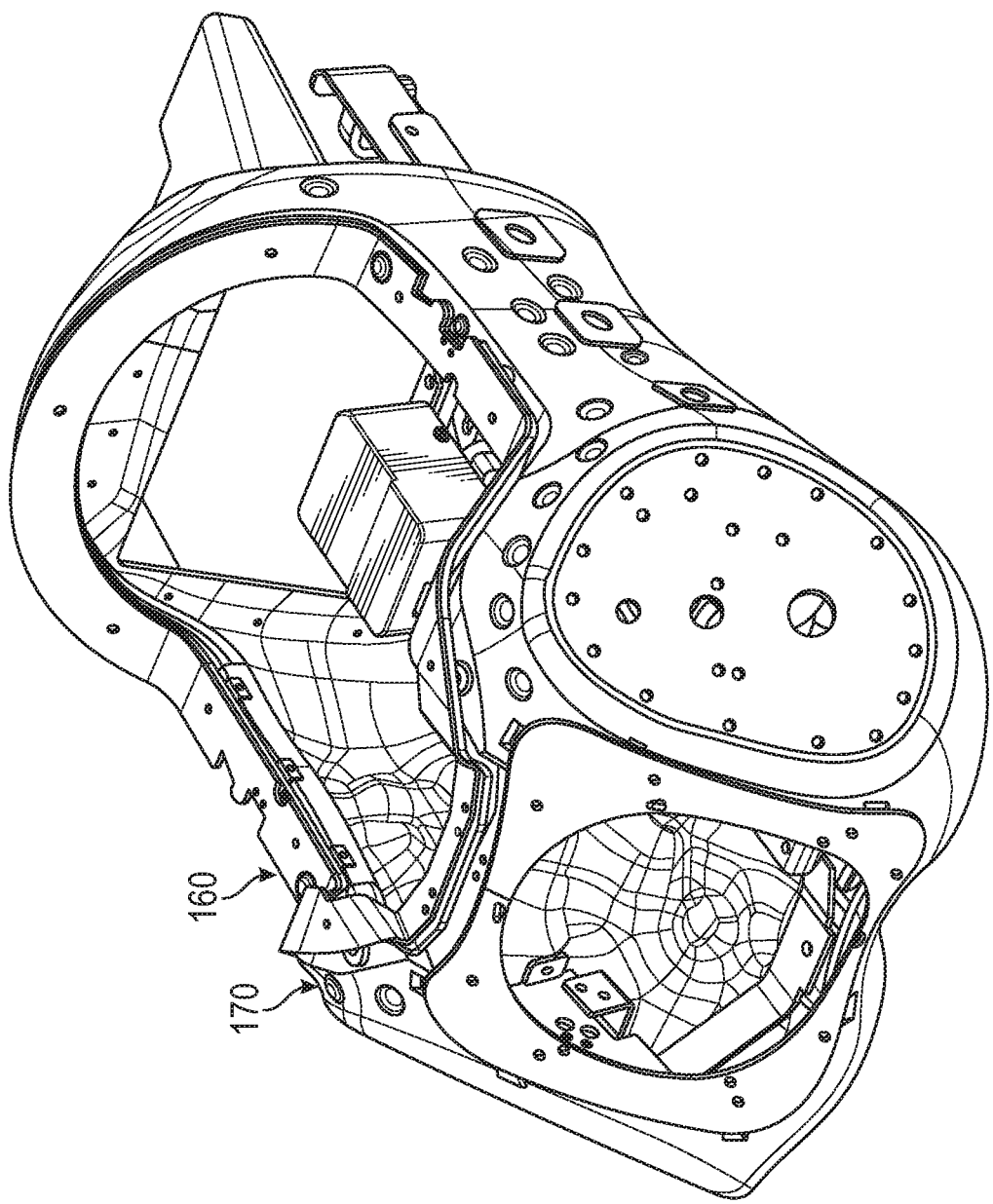

FIG. 20 is a perspective, partially transparent view of an upper torso portion 162 of the maternal patient simulator 110. The upper torso portion 162 can include features to simulate respiratory and/or circulatory aspects of the maternal patient simulator. In this regard, the maternal patient simulator 110, including upper torso portion 162, can include various features from the patents, applications, and products incorporated by reference above. FIG. 21 is a perspective, partially transparent view of an arm portion 164 of the maternal patient simulator 110. In some instances, the arm portion 164 includes features to simulate circulatory aspects of the maternal patient simulator 110, such as allowing placement of an IV and/or drawing blood. Again, the maternal patient simulator 110, including arm portion 164, can include various features from the patents, applications, and products incorporated by reference above. In some implementations, a vein of the arm is a disposable component that is replaceable.

Referring now to FIGS. 22-25, shown therein is a structural framework 160 of the maternal patient simulator 110 according to an embodiment of the present disclosure. In that regard, as some embodiments of the maternal patient simulator 110 utilize soft silicon outer layers to define a realistic skin layer (e.g., using materials from one or more of the patents and patent applications incorporated by reference above), the maternal patient simulator 110 has a high degree of flexibility and give, simulating a natural human body. However, in order to provide a repeatable and reliable birthing simulation, the maternal patient simulator 110 also includes structural framework 160 formed of a rigid material (e.g., metal (aluminum, stainless steel, sheet metal, etc.) or rigid plastic). In that regard, the structural framework 160 provides a rigid structure to which the other components of the maternal patient simulator 110 can be attached to and/or aligned with. In particular, in some implementations the structural framework 160 is utilized to align the birthing mechanism 150 with the birth canal of the maternal patient simulator 110. Having the birthing mechanism 150 properly aligned prevents unwanted wear and/or stress on the birthing mechanism 150 and/or the fetal patient simulator 300 that results from the increased friction, stress, and/or bending associated with misalignment.

Referring now to FIGS. 26-29, shown therein is the structural framework 160 with another sub-layer 170 of the maternal patient simulator 110 engaged therewith. In the illustrated embodiment, the sub-layer 170 is formed vinyl and provides a structural support and/or alignment features for the soft silicon skin layers and/or other components of the maternal patient simulator 110. For example, in some instances the sub-layer 170 includes openings, recesses, projections, and/or other structural features to facilitate the alignment and assembly of various components of the maternal patient simulator. Further, in some instances the sub-layer 170 is formed of a material that is softer than that of the structural framework 160 and that provides a more realistic feel to internal structures of a natural human body than that of the structural framework 160. In areas of large skin deformations where gaps may exist in the structural framework 160 and/or the sub-layer 170, "flappers" or space fillers formed out of a suitable material, such as silicone, are used to prevent unrealistic deformations of the skin layer. Further, hollow silicone inserts can be utilized to preserve anatomical landmarks and allow proper range of motion of the maternal patient simulator 110.

The structural framework 160 and/or the sub-layer 170 can be used to secure anchoring or fastening components in desired locations. The anchoring or fastening components can be used to accurately secure numerous parts to the structural framework 160 and/or the sub-layer 170 in a desired orientation in a repeatable manner. Further, such an approach also allows the anchoring or fastening components to be secured and aligned to the external surface of rotated vinyl parts. For example, in some instances a male or female component of the snap structure 240 described in the context of FIGS. 47-49 is embedded and/or secured to the structural framework 160 and/or the sub-layer 170 and the mating female or male component is embedded and/or secured to a component to be connected to the framework 160 and/or the sub-layer 170, such as the skin layer. The anchoring or fastening components can also include other structures such as nuts, bolts. In some instances, the anchoring or fastening components are secured within a cavity that allows a slight amount of movement to facilitate proper alignment of the different elements being coupled together even when, due to manufacturing tolerances or otherwise, there is not a perfect fit.

Referring now to FIGS. 30-32, shown therein are aspects of an internal cover 180 positioned within the chamber 120 of the maternal patient simulator 110 according to an embodiment of the present disclosure. In that regard, the internal cover 180 can be utilized to separate the chamber 120 into different portions. In particular, the internal cover 180 can separate many of the working components (e.g., electronics, wiring, actuators, etc.) of the maternal patient simulator 110 from the area in which the fetal simulator 300 will be placed for birthing simulations. For example, the cross-sectional side view of FIG. 32 shows how the internal cover 180 extends over and separates portions of the birthing mechanism 150 from where the fetal patient simulator 300 will coupled to the locking feature 152. In this manner, a cleaner and simpler presentation to the user when coupling the fetal simulator 300 to the birthing mechanism 150, while also preventing accidental damage to the working components during repeated loading of the fetal simulator.

As also shown in FIGS. 30 and 31, the maternal patient simulator 110 includes a cervix 190. In some implementations, the cervix 190 is a distensible cervix that can be controlled independently of the position of the fetal simulator. In that regard, previous birthing simulators have relied upon the descent of the fetal simulator to cause the cervix to dilate. However, to more realistically simulate various birthing scenarios, the maternal patient simulator 110 includes a cervix where dilation can be controlled separately from the position of the fetal simulator. For example, in some implementations the cervix is defined by a flexible material (e.g., silicon) that includes an opening. In that regard, the size of the opening defines the amount of dilation of the cervix.

Accordingly, by selectively increasing (or decreasing) the size of the opening the simulated dilation of the cervix is changed. To that end, in some instances a cord is disposed within the material surrounding the opening such that tensioning the cord can be utilized to selectively expand or contract the opening defined by the material. For example, in some instances at least one end of the cord is coupled to a motor such that when the motor is actuated in a first direction the cord is tensioned, retracted, and wrapped around a pulley or other member to increase/decrease the size of the opening. When the motor is actuated in a second direction (opposite of the first direction) and/or the cord is otherwise released from the tensioned, retracted, or wrapped position, the size of the opening decreases/increases accordingly. By selectively controlling actuation of the motor (or other control mechanism) dilation of the cervix can be controlled. Accordingly, in some instances the control system defines the amount of dilation of the cervix for a particular scenario independent of the descent of the fetal simulator along the birth canal.

Referring now to FIG. 33-39, shown therein are aspects of a birth canal 200 for use with the maternal patient simulator 110 according to present disclosure. The birth canal can be formed from two different materials. For example, in the illustrated embodiment a soft silicone satisfies the elasticity requirements for birthing and is used for a majority of the birth canal 200, including a flexible central portion 202. In that regard, the birth canal 200 contains lateral walls formed of the soft silicone that are in close proximity but easily expand to facilitate passage of the fetal patient simulator 300 during a birthing simulation. A harder silicone is used around the boundary 204 of the birth canal 200 to provide structural integrity that ensures the birth canal matches up with the lower torso skin. In that regard, a groove around the harder silicone boundary section 204 can be utilized to secure the birth canal 200 to the structural framework 160 and/or the sub-layer 170. For example, FIGS. 34-39 show the birth canal 200 coupled to a frame structure 206. The frame structure 206 is a component of the structural framework 160 in some instances. Further, as described above, snaps or other fastening features can be used as an additional attachment between the birth canal 200 and the structural framework 160 and/or the sub-layer 170. The birth canal assembly contains all necessary anatomical landmarks (Coccyx, Ischeal spines, etc.). Further, in some instances an integrated birth canal lubrication system is provided and used to simulate amniotic fluid discharge during the birthing process. The cervix 190 is an independent component used in conjunction with the birth canal 200 that can be easily changed out by the user. In that regard, the cervix 190 is coupled to the frame structure 206 in some instances.

Referring now to FIGS. 40-46, shown therein are aspects of a hip joint 210 of the maternal patient simulator 110 according to an embodiment of the present disclosure. As shown, the hip joint 210 of the maternal patient simulator 110 includes a plate 212 that is secured to the torso of the maternal patient simulator 110 and, in particular, the structural framework 160 and/or the sub-layer 170 in some instances. To provide a realistic hip motion, a flexible tubular member 216 connects the plate 212 attached to the torso of the maternal patient simulator 110 to a plate 214 attached to a leg of the maternal patient simulator 110. In that regard, the flexible tubular member 216 is hydraulic tubing in some instances. For example, in some instances the flexible tubular member 216 is rubber tubing with metal reinforcing mesh to provide sufficient structural rigidity along the axial length of the tubing to prevent collapsing, but sufficient flexibility to simulate the ball-and-socket motion of a natural hip joint. In the illustrated embodiment, each end of the flexible tubular member 216 is engaged with barbs 230, 232. In particular, the barbs 230, 232 are positioned within the inner lumen of the tubular member 216. In some instances, a clamp or collar 224 is positioned around the flexible tubular member 216 and the barb 230, 232 to further secure the flexible tubular member 216 to the barb 164.

In order to limit the range of motion of the hip joint to a more natural range of motion than the flexible tubular member 216 alone would provide, the hip joint includes one or more tethered connections between the plate 212 and a portion of the leg. For example, as shown in FIGS. 41-44 three cables 218 are connected between the plates 212 and 214. The lengths of the cables 218 are selected to provide a realistic range of motion to the hip joint in the various directions. Stopper sleeves 220 can be utilized to secure the cables 218 to the plates 212 and 214. The hip joint 226 can include one or more sensors to monitor the position of the hip joint 210 and/or the forces being applied to the hip joint. In the illustrated embodiment, the hip joint 210 includes a potentiometer 226 that is mounted to plate 212 via a mounting bracket 228. In that regard, the potentiometer 226 is configured to monitor the motion of a rotating base plate 222 that is coupled to the plate 212. FIG. 46 shows various views of the rotating base plate 222. In this manner, the potentiometer 226 can be utilized to monitor the relative position of the hip joint 210, which in some instances can be further utilized to evaluate the effectiveness of a user's treatment on the maternal patient simulator 110. A similar approach to that described above for the hip joint 210 can be utilized to form the shoulder joints of the maternal patient simulator 110.

Referring now to FIGS. 47-49, shown therein are aspects of a snap structure 240 according to the present disclosure. As shown, the snap structure 240 is a two-part mechanism that includes a male component 242 and a female component 244. The snap structure 240 can be utilized to secure the skin layer of the maternal patient simulator 110 and/or the fetal patient simulator 300 to the underlying endoskeleton structures. This can be especially important near the skin boundaries to ensure realistic skin folding and texture. In that regard, overlapped skin flanges can also be used on the skin boundaries to guarantee that independent skin sections match to form a relatively seamless and continuous outer skin layer. In some instances, rubber bands or other flexible tensioning members are embedded in the skin layer to secure the boundary to the underlying endoskeleton. This can be particularly useful in areas of high tension for the skin. In that regard, recesses in the endoskeleton, such as the sub-layer 170 of the maternal simulator), can also be utilized trap and secure the skin near the skin boundaries. Likewise, rigid flanges can be glued to the skin sections near the boundaries to more securely anchor the skin to the endoskeleton. In such instances, fasteners can used between the flange and the endoskeleton instead of and/or in addition to the snap structures 240.

Referring now to FIGS. 50-76, aspects of the fetal patient simulator 300 according to embodiments of the present disclosure will be described. In that regard, in addition to the features specifically described below, it is understood that the fetal patient simulator 300 may include features similar to those described with respect to the fetal and/or newborn patient simulators in the patents, patent applications, and products incorporated by reference above, especially the respiratory and/or circulatory features. However, for sake of brevity these various features will not be described in detail below.

FIG. 50 provides a front view of the fetal patient simulator 300, while FIG. 51 provides a perspective view of the fetal patient simulator of FIG. 50. As shown, the fetal simulator 300 includes a continuous, flexible outer skin layer that covers the internal components of the fetal simulator. More specifically, in some instances the entire outer skin layer other than that associated with the hands and feet of the fetal patient simulator are formed of a single, continuous piece of silicon. In some instances, an opening in the single, continuous piece of silicon that is utilized to insert the internal components of the fetal patient simulator is bonded, glued, and/or otherwise secured together along the back or spine of the patient such that the outer skin layer provides a realistic, continuous skin layer over all but the hands and feet of the patient simulator. To that end, the hands and feet of the patient simulator are formed of the same or similar material as the majority of the outer skin layer in some instances. In some instances, the hands and/or feet are formed of a slightly harder material than the majority of the outer skin layer to increase the durability of those portions of the fetal patient simulator.

Referring now to FIG. 52-55, shown therein are aspects of the internal components of the fetal patient simulator. More specifically, as shown the fetal patient simulator 300 includes an internal structural framework 301 that includes an articulating spine 302 formed or a plurality of pivoting joints, articulating arms and legs 320, and a moveable head assembly 305. Further, similar to the maternal patient simulator 110, the fetal patient simulator 300 includes a sub-layer 304. In the illustrated embodiment, the sub-layer 304 is formed vinyl and provides a structural support and/or alignment features for the soft silicon skin layers and/or other components of the fetal patient simulator 300. For example, in some instances the sub-layer 304 includes openings, recesses, projections, and/or other structural features to facilitate the alignment and assembly of various components of the fetal patient simulator and/or to simulate anatomical landmarks of a fetus. Further, in some instances the sub-layer 304 is formed of a material that is softer than that of the structural framework 301 and that provides a more realistic feel to internal structures of a natural human body than that of the structural framework 301.

FIGS. 55-59 illustrate aspects of the spine assembly 302. In that regard, FIG. 55 provides a cross-sectional side view of the inner components of the fetal patient simulator, including the spine assembly 302; FIG. 56 is a perspective view of the spine assembly 302; FIG. 57 is a side view of the spine assembly 302; FIG. 58 is a front view of a joint of the spine assembly 302 that includes an encoder; and FIG. 59 is a front view of a joint of the spinal assembly 302 that does not include an encoder. As shown, the spine assembly 302 includes a plurality of pivoting joints 306 connected together to define ranges of motion that mimic that of an infant spine, which is highly flexible and/or floppy in some instances. In order to monitor the relative position(s) of the joints some of the joints include an angle or position encoder 307, as shown in FIG. 58. Further, in some instances one or more of the joints includes force or pressure sensor(s) to monitor the forces being applied to the joints of the fetal patient simulator. The information from the angle/position encoder(s) and/or the force/pressure sensor(s) can be supplied to the control system and utilized in evaluation of the treatment being applied by the user. For example, if the user is putting too much force on the fetal simulator's neck or spine as a resulting trying to pull the fetal simulator out prematurely and/or improperly attempting to rotate the fetal simulator, then the readings from these sensors will reflect that. Further, the angle/position sensors can be utilized to depict a 3-D representation of the fetal simulator on a display of the control system for current and/or later evaluation by a teacher and/or the user.

As shown in FIGS. 56-58, 60, and 61, the spine assembly 302 includes a plurality of structures 308 that define openings extending along the length of the spine that are sized and shaped to receive a stiffening rod 310. In that regard, because of the highly flexible nature of the spine assembly 302 of the fetal patient simulator 300, a stiffening rod 310 is inserted through the openings in the spine assembly 302 to provide rigidity and alignment to the spine assembly 302 during a birthing simulation. In that regard, the stiffening rod 310 provides sufficient structural rigidity to the fetal simulator 300 to allow the birthing mechanism 150 of the maternal simulator 110 to birth the fetal simulator 300 through the birth canal of the maternal simulator 110. To that end, the openings in the spine assembly of the fetal patient simulator 300 are aligned (or alignable) with an opening in the bottom of the fetal patient simulator 300 that is configured to receive the stiffening rod. To that end, FIGS. 52-55 show the stiffening rod 310 received within the fetal patient simulator 300, while FIGS. 62-64 show aspects of a locking mechanism 312 of the fetal patient simulator 300 that is configured to selectively engage the stiffening rod 310. More specifically, as shown in FIGS. 62-64, the locking mechanism 312 includes a spring-biased lever 314 that rotates about pivot pin 316 with a projection sized and shaped to engage a recess or detent formed in the outer profile of the stiffening rod 310 such that when the projection is engaged with the recess or detent (FIG. 63 shows this best) the locking mechanism 312 and, thereby, the fetal simulator 300 is fixedly engaged with the stiffening rod 310. In some instances, a portion of the stiffening rod 310 will extend outside of the fetal simulator 300 for engagement with the locking mechanism 150 of the maternal simulator 110 (as described above).

The locking mechanism 312 of the fetal patient simulator 300 is electronically controlled to selectively release the fetal patient simulator 300 from engagement with the stiffening rod. In that regard, by maintaining engagement of the fetal patient simulator 300 with the stiffening rod 310 a user is prevented from prematurely pulling the fetal patient simulator 300 from the birth canal during a birthing simulation. Instead, any excess force applied by the user in attempts to prematurely remove the fetal simulator 300 will be registered by the force/pressure sensor(s) and/or position/angle encoder(s) of the fetal simulator 300. Further, once the birthing sequence has progressed to a point where the fetal patient simulator 300 can be removed from the maternal simulator 110, then the lever 314 of the locking mechanism 312 of the fetal patient simulator 300 is removed from engagement with the recess or detent of the stiffening rod 310. With the locking mechanism of the fetal patient simulator 300 disengaged from the stiffening rod 310 (and the locking mechanism of the maternal simulator 110 still engaged with the stiffening rod), the fetal patient simulator 300 can be removed from the maternal simulator 110 at which point the stiffening rod 310 will pass through the openings in the spine assembly 302 and out the bottom of the fetal simulator 300, such that the spine assembly 302 of the fetal simulator 300 is no longer held in the rigid, aligned position defined by the stiffening rod 310. As a result, the fetal simulator 300 exhibits the highly flexible spinal structure of a typical newborn upon birth. In this manner, the system provides sufficient structural definition to facilitate birthing of the fetal simulator 300 without compromising the realistic, highly flexible nature of the fetal simulator upon birth. In some instances, the stiffening rod 310 is manually detached from the locking mechanism 152 of the maternal simulator 110 and reinserted into the fetal simulator 300 prior to the next birthing simulation.

Referring now to FIGS. 65-68, shown therein are aspects of the articulating arms and legs 320 of the fetal patient simulator 300, including the shoulder, elbow, hip, and knee joints. In that regard, in some instances the shoulder and/or hip joints of the fetal patient simulator 300 are defined by at least in part by a flexible tubular member, similar to the hip joint of maternal simulator 110 described above. However, due to the highly flexible nature of fetal joints and the smaller mass associated with the components of the arm and legs of the fetal simulator 300, in some instances the hip and/or shoulder joints are solely defined by the flexible tubing, without the need for tethers to limit the range of motion. However, in other instances tethers are utilized in a similar manner to that described above for the maternal simulator. In the illustrated embodiments, the arms and legs 320 are connected to the torso of the fetal patient simulator by cables, tethers, or tubings 322.

As shown in FIGS. 67 and 68, the elbow and knee joints of the fetal patient simulator as defined by the arms and legs 320 are configured to provide a realistic range of motion. In that regard, each arm or leg 320 includes a first member 324 that is connected to a second member 326 about a pivot 328. The relative amount of motion between the members 324, 326 by the pivot 328 can be selected to represent a realistic range of motion of a newborn fetus, including healthy and/or abnormal ranges of motions. Each member 324 and 326 includes a barb 330 and 332, respectively, to facilitate connection of the arm or leg to additional components of the fetal patient simulator, including cables, tethers, and tubings as described above.

Referring now to FIGS. 69 and 70, shown therein are side, cross-sectional views of the head 305 of the fetal patient simulator 300. In that regard, the fetal patient simulator 300 includes an actuator 340 disposed within the head 305 to facilitate movement of the head 305. In particular, the actuator 340 is configured to selectively raise or lift the head 305 of the fetal patient simulator 300. To that end, FIG. 69 shows the head 305 in a neutral position. As shown, a cord or line 342 extends from a pulley 346 of the actuator 340 across the space within the head 305 and is secured to a structure 344 inside the head adjacent to the forehead. As shown in FIG. 70, the head 305 has been moved to raised or lifted position by the actuator 340. In that regard, the length of the cord or line 342 extending between the actuator pulley 346 and the structure 344 inside the head adjacent to the forehead has been shortened causing the head 305 to tilt up or back. In some instances, the actuator 340 is a motor and/or pulley system that is configured to selectively retract or wrap the cord/line to cause the head to tilt. By either releasing the cord/line or reversing operation of the actuator 340, the head 305 will return to the neutral position of FIG. 69.

In some instances, the tilting functionality of the head described above is utilized to simulate the rise of the fetus's head during a natural birth. In that regard, the birthing scenario implemented by the control system can cause the actuator 340 to selectively tilt the head 305 and/or return to the neutral position at the appropriate times during the birthing sequence to more realistically simulate the natural birthing sequence. In this manner, the natural rise of the fetal simulator 300 can be simulated without needing to account for complicated three-dimensional position control with the birthing mechanism 150. In other instances, an inflatable bag or other member positioned outside of the fetal simulator within the chamber 120 of the maternal simulator 110 can be selectively inflated or actuated to impart a tilt or rise of the head 305 of the fetal simulator 300 during the birthing sequence.

Referring now to FIGS. 71 and 72, shown therein are aspects of an attachable umbilical cord 350 for use with the fetal patient simulator 300. In that regard, in some implementations the umbilical cord 350 is similar one or more of the umbilical cords described in the patents, patent applications, and products incorporated by reference above, including various lumen structures and associated realistic materials. In the illustrated embodiment, the belly button 354 of the fetal patient simulator 300 includes a magnet therein and an end 352 of the umbilical cord 350 configured to be attached to the belly button includes a magnetically attractive material, such as suitable metal, such that the umbilical cord 350 can be magnetically attached to and detached from the belly button of the fetal simulator. FIG. 72 shows the umbilical cord 350 magnetically attached to the belly button 354 of the fetal simulator 300.

Referring now to FIGS. 73-76, shown therein are aspects of a foot 360 of the fetal patient simulator 300 according to an embodiment of the present disclosure. In particular, FIGS. 73-76 show aspects of a foot 360 that includes a communication and/or power port 364 disposed therein for use in communicating with, programming, updating, and/or charging the internal components of the fetal patient simulator 300. In that regard, FIG. 73 shows the foot in a fully assembled state with a plug cover 362 in place. As shown, the plug cover 362 provides a relative smooth and continuous bottom surface to the foot 360. However, the plug cover is removable (as shown in FIGS. 74 and 76 to provide access to the communication and/or power port 364 disposed within the foot 360 (as shown in FIG. 75). To that end, the communication and/or power port 364 is standard protocol port (e.g., USB) in some implementations. In other implementations, the communication and/or power port 364 is a custom connector. Further, in some instances, the communication and/or power port 364 includes a plurality of ports, which may be standard, custom, and/or combinations thereof. The communications and/or power port 364 is utilized to charge a battery or other power source of the fetal patient simulator in some instances. In some instances, the communications and/or power port 364 is utilized to reprogram and/or update aspects of the software or firmware executing inside of the fetal patient simulator 300. In other instances, wireless communication is utilized to facilitate communicating with, programming, updating, and/or charging the internal components of the fetal patient simulator 300.

Persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A patient simulator system, comprising:
   a fetal patient simulator having:
      an internal support structure that includes a head, spinal components, left arm components, right arm components, left leg components, and right leg components, wherein the internal support structure of the fetal patient simulator includes a plurality of openings for receiving a stiffening rod; and
      a continuous silicon skin layer covering the head, spinal components, left arm components, right arm components, left leg components, and right leg components of the internal support structure; and
   a maternal patient simulator having:
      an internal chamber sized to receive the fetal patient simulator; and
      a birthing mechanism disposed within the internal chamber, the birthing mechanism configured to translate and rotate the fetal patient simulator with respect to the maternal patient simulator to simulate a birth, wherein the birthing mechanism of the maternal patient simulator is configured to selectively engage a portion of the stiffening rod.

2. The patient simulator system of claim 1, wherein the spinal components of the internal support structure of the fetal simulator include a plurality of joints.

3. The patient simulator system of claim 2, wherein at least some of the plurality of joints include a motion encoder to detect a relative position of the joint.

4. The patient simulator system of claim 1, wherein the fetal patient simulator includes a force sensor for monitoring a force applied to the patient simulator.

5. The patient simulator system of claim 1, wherein the fetal patient simulator includes an actuator system for selectively raising the head of the fetal patient simulator.

6. The patient simulator system of claim wherein the actuator system includes a motorized pulley system.

7. The patient simulator system of claim 1, wherein the stiffening rod provide structural integrity to the spinal components of the fetal simulator during the birth simulation.

8. The patient simulator system of claim 1, wherein the maternal patient simulator includes a removable tummy cover.

9. The patient simulator system of claim 8, wherein the removable tummy cover is configured to simulate at least one of maternal contractions and a fetal heart rate.

10. The patient simulator system of claim 9, wherein the removable tummy cover includes at least one speaker for simulating the fetal heart rate.

11. The patient simulator system of claim 9, wherein the removable tummy cover includes at least one reservoir configured to receive fluid or air, wherein selective introduction and removal of the fluid or air into the at least one reservoir simulates the maternal contractions.

12. The patient simulator system of claim 1, Wherein the maternal patient simulator includes articulating hip joints.

13. The patient simulator system of claim 12, wherein the articulating hip joints include a first plate secured to a torso of the maternal patient simulator, a second plate secured to a leg of the maternal patient simulator, and a flexible tubular member extending between the first and second plates.

14. The patient simulator system of claim 13, Wherein the articulating hip joints further include a plurality of tethers extending between the first and second plates to limit relative motion.

15. The patient simulator system of claim 13, wherein the articulating hip joints further includes a sensor for monitoring relative movement of the hip joint.

16. The patient simulator system of claim 1, further comprising the stiffening rod.

17. The patient simulator system of claim 1, wherein the fetal patient simulator farther includes a locking mechanism for fixedly engaging the stiffening rod.

18. The patient simulator system of claim 17, wherein the locking mechanism includes a spring-loaded mechanism configured to engage a structure of the stiffening rod.

19. The patient simulator system of claim 17, wherein the locking mechanism is electronically controllable to selectively fixedly engage the stiffening rod.

* * * * *